(12) United States Patent
Kim et al.

(10) Patent No.: US 12,058,768 B2
(45) Date of Patent: *Aug. 6, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,112

(22) Filed: Dec. 27, 2021

(65) Prior Publication Data

US 2022/0124868 A1 Apr. 21, 2022

Related U.S. Application Data

(63) Continuation of application No. 16/576,579, filed on Sep. 19, 2019, now Pat. No. 11,212,867.

(30) Foreign Application Priority Data

Sep. 19, 2018 (KR) .......................... 10-2018-0112384
Aug. 16, 2019 (KR) .......................... 10-2019-0100629

(51) Int. Cl.
*H04W 76/30* (2018.01)
*H04W 76/19* (2018.01)
(Continued)

(52) U.S. Cl.
CPC ........... *H04W 76/30* (2018.02); *H04W 76/19* (2018.02); *H04L 69/321* (2013.01); *H04W 80/02* (2013.01)

(58) Field of Classification Search
CPC ..... H04W 76/30; H04W 76/19; H04W 80/02; H04L 69/321
(Continued)

(56) References Cited

U.S. PATENT DOCUMENTS

2009/0304184 A1 12/2009 Miyagawa
2015/0181461 A1 6/2015 Kim et al.
(Continued)

FOREIGN PATENT DOCUMENTS

CN 103858513 A 6/2014
CN 105103622 A 11/2015
(Continued)

OTHER PUBLICATIONS

European Patent Office, "Communication pursuant to Article 94(3) EPC," dated May 10, 2022, in connection with European Patent Application No. 19862678.0, 4 pages.
Ran2, "LS to RANS3 on Suspend-Resume agreements", 3GPP TSG-RAN WG3 #101, Aug. 20-24, 2018, R3-184482, 2 pages.
(Continued)

*Primary Examiner* — Obaidul Huq

(57) ABSTRACT

A method of performing communication, by a terminal, in a wireless communication system, the method including receiving a radio resource control (RRC) release message; identifying configuration information for suspending based on the received RRC release message; suspending bearers including a data radio bearer (DRB) and a signaling radio bearer (SRB), except an SRB0; and indicating a packet data convergence protocol (PDCP) suspend of the DRB.

18 Claims, 24 Drawing Sheets

(51) Int. Cl.
    *H04L 69/321*     (2022.01)
    *H04W 80/02*     (2009.01)

(58) Field of Classification Search
    USPC ........................................ 370/310, 328, 329
    See application file for complete search history.

(56) References Cited

U.S. PATENT DOCUMENTS

| | | | |
|---|---|---|---|
| 2017/0311375 | A1 | 10/2017 | Jung et al. |
| 2017/0339612 | A1* | 11/2017 | Quan .............. H04W 36/00835 |
| 2018/0092156 | A1 | 3/2018 | Kim et al. |
| 2018/0254948 | A1 | 9/2018 | Li et al. |
| 2018/0270699 | A1* | 9/2018 | Babaei .............. H04W 28/0278 |
| 2019/0037629 | A1 | 1/2019 | Ryu et al. |
| 2019/0141776 | A1 | 5/2019 | Kim et al. |
| 2020/0169899 | A1 | 5/2020 | Xiao et al. |
| 2020/0245393 | A1* | 7/2020 | Teyeb ................... H04W 76/25 |
| 2020/0337107 | A1 | 10/2020 | Mildh et al. |
| 2021/0204351 | A1 | 7/2021 | Rayavarapu et al. |
| 2023/0309137 | A1 | 9/2023 | Zhang et al. |

FOREIGN PATENT DOCUMENTS

| | | | |
|---|---|---|---|
| WO | 2014/098393 | A1 | 6/2014 |
| WO | 2017/126922 | A1 | 7/2017 |
| WO | 2017/188758 | A1 | 11/2017 |
| WO | 2020/091410 | A1 | 5/2020 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2 (Jun. 2018), 3 pages.
Notification of Transmittal of the International Search Report and the Written Opinion of the International Searching Authority, or the Declaration dated Dec. 26, 2019 in connection with International Patent Application No. PCT/KR2019/012141, 10 pages.
ETSI MCC, Report of 3GPP TSG RAN2#103 meeting, Gothenburg, Sweden, Aug. 20-24, 2018, R2-1813501, 253 pages.
LG Electronics Inc., "PDCP re-establishment at RRC Resume", 3GPP TSG-RAN WG2 #103, Aug. 20-24, 2018, R2-1811868, 6 pages.
LG Electronics Inc., "Correction to RB Suspension", Change Request, 3GPP TSG-RAN2 Meeting #62bis, Aug. 18-22, 2008, R2-084176, 2 pages.
Supplementary European Search Report dated Sep. 2, 2021 in connection with European Patent Application No. 19 86 2678, 12 pages.
European Patent Office, "Communication pursuant to Article 94(3) EPC," dated Jun. 5, 2023, in connection with European Patent Application No. 19862678.0, 4 pages.
Office Action issued Feb. 28, 2024, in connection with Chinese Patent Application No. 201980005814.5, 15 pages.
Communication under Rule 71(3) EPC dated Jun. 12, 2024, in connection with European Patent Application No. 19862678.0, 113 pages.

* cited by examiner

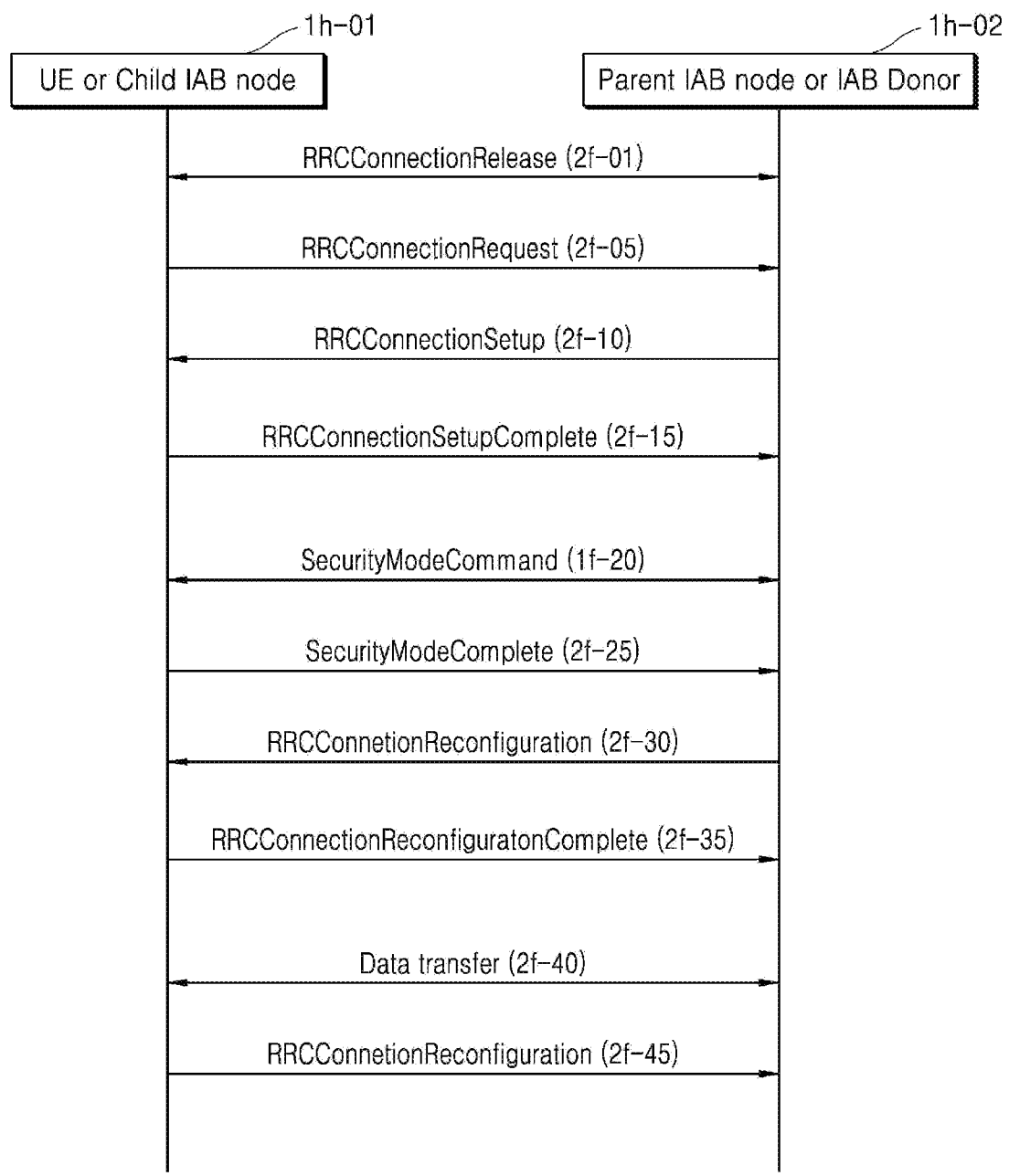

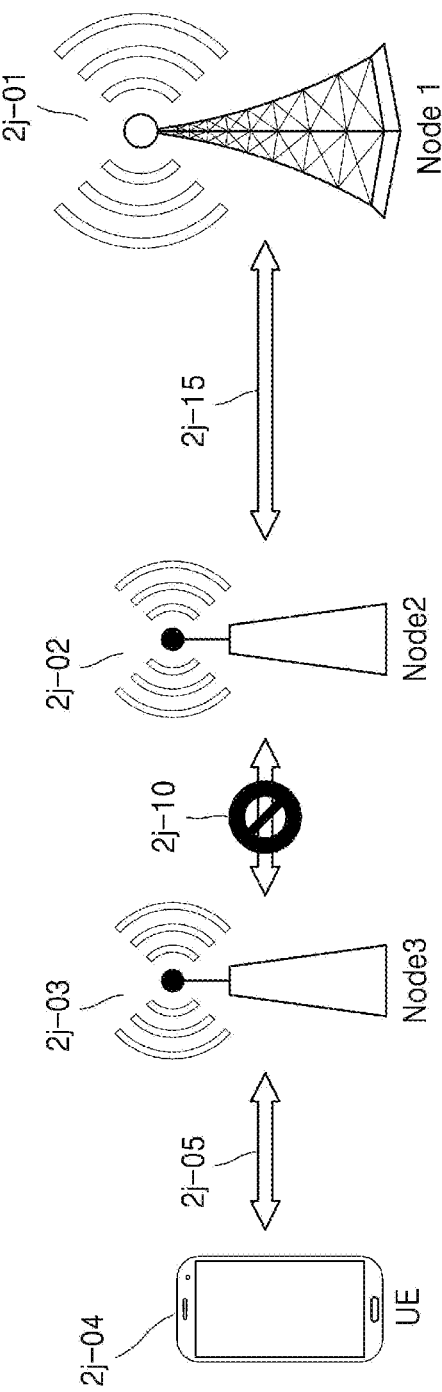

METHOD AND APPARATUS FOR TRANSMITTING AND RECEIVING DATA IN WIRELESS COMMUNICATION SYSTEM

CROSS-REFERENCE TO RELATED APPLICATION

This application is a continuation of U.S. patent application Ser. No. 16/576,579 filed on Sep. 19, 2019, which is based on and claims priority under 35 U.S.C. § 119 to Korean Patent Application No. 10-2018-0112384 filed on Sep. 19, 2018, and Korean Patent Application No. 10-2019-0100629 filed on Aug. 16, 2019, in the Korean Intellectual Property Office, the disclosures of which are herein incorporated by reference in their entirety.

BACKGROUND

1. Field

The disclosure relates to a method and apparatus for transmitting and receiving data in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of mobile communication systems, methods for effectively providing these services are required.

SUMMARY

Provided are a method and apparatus, according to embodiments of the disclosure, for efficiently providing a service in a wireless communication system.

Additional aspects will be set forth in part in the description which follows and, in part, will be apparent from the description, or may be learned by practice of the presented embodiments of the disclosure.

According to an embodiment of the disclosure, a method of performing communication, by a terminal, in a wireless communication system includes receiving a radio resource control (RRC) release message; identifying configuration information for suspending based on the received RRC release message; suspending bearers including a data radio bearer (DRB) and a signaling radio bearer (SRB), except a SRB0; and indicating a packet data convergence protocol (PDCP) suspend of the DRB.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2F illustrates a procedure in which an RRC connection configuration is performed when a UE establishes connection with a radio node (an integrated access backhaul (IAB) node or an IAB donor) or a child IAB node establishes connection with a parent IAB node (an IAB node or the IAB donor, in the IAB network in the NR or 5G communication system, according to some embodiments of the disclosure;

FIG. 2J illustrates a diagram for describing data loss that may occur in a radio node of the NR or 5G communication system supporting wireless backhaul, according to some embodiments of the disclosure;

DETAILED DESCRIPTION

Figure 1A:
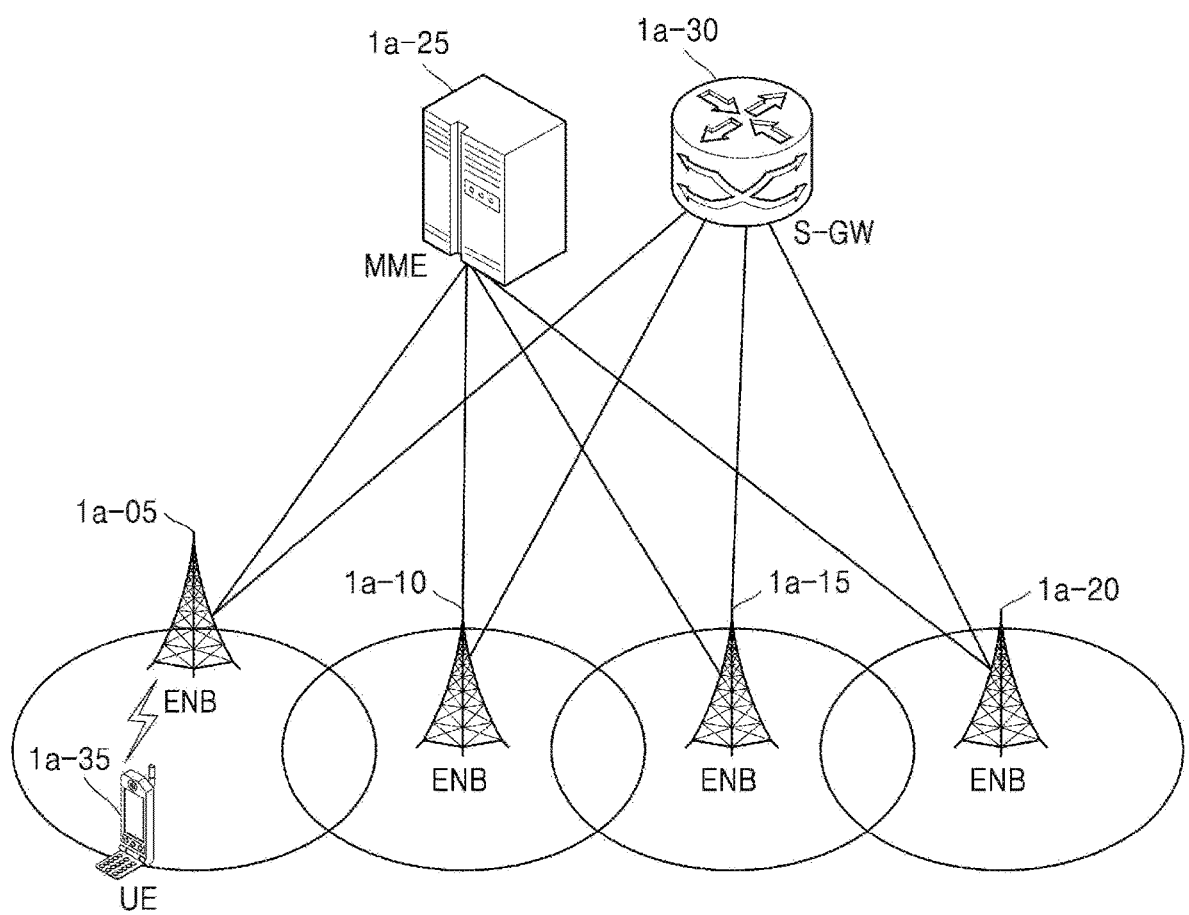
FIG. 1A illustrates a diagram of a configuration of a long term evolution (LTE) system, according to some embodiments of the disclosure.

FIGS. 1A through 2M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. In the disclosure, a controller may also be referred to as a processor.

Throughout the specification, a layer (or a layer apparatus) may also be referred to as an entity.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor.

In the following descriptions of the disclosure, well-known functions or configurations are not described in detail because they would obscure the disclosure with unnecessary details. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards. In the disclosure, an evolved node B (eNB) may be interchangeably used with a next-generation node B (gNB) for convenience of explanation. That is, a base station (BS) described by an eNB may represent a gNB.

In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples.

In particular, the disclosure is applicable to 3GPP new radio (NR) (or $5^{th}$ generation (5G)) mobile communication standards. The disclosure is applicable to intelligent services (e.g., smart home, smart building, smart city, smart car or connected car, healthcare, digital education, retail trade, security, and safety services) based on 5G communication technologies and Internet of things (IoT)-related technologies. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The UL refers to a radio link for transmitting data or a control signal from a UE (or a MS) to a base station (e.g., an eNB or a BS), and the DL refers to a radio link for transmitting data or a control signal from the base station to the UE. The above-described multiple access scheme may identify data and control information for each user by allocating and operating time-frequency resources on which the data or the control information is to be carried for each user, so that the time-frequency resources do not overlap each other, that is, so that orthogonality is established.

As post-LTE communication systems, 5G communication systems need to support services capable of simultaneously reflecting and satisfying various requirements of users, service providers, etc. Services considered for the 5G communication systems include enhanced mobile broadband (eMBB), massive machine-type communication (mMTC), and ultra-reliability low-latency communication (URLLC) services.

The eMBB service may be aimed to provide an enhanced data rate compared to a data rate supported by LTE, LTE-Advanced (LTE-A), or LTE-Pro. For example, the eMBB service in the 5G communication systems need to provide a peak data rate of 20 gigabits per second (Gbps) for a DL and provide a peak data rate of 10 Gbps for a UL in view of a single base station. At the same time, the 5G communication systems may provide an increased user perceived data rate. To satisfy these requirements, the 5G communication systems may require various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 gigahertz (GHz) or over 6 GHz compared to LTE systems currently using a transmission bandwidth of up to 20 MHz in a 2 GHz band.

At the same time, the mMTC service is considered for the 5G communication systems to support application services such as the Internet of things (IoT). The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$. In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced, and are not able to frequently replace batteries and thus require a very long battery lifetime, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band to ensure reliability of a communication link.

The above-described three services considered for the 5G communication systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

The disclosure provides a method and apparatus for efficiently supporting a radio link failure (RLF) of a secondary cell (Scell), and a method, performed by a terminal in a connected state, of generating and transmitting a message3 (Msg3) when performing a random access, in a next-generation mobile communication system.

In a wireless communication system, to support lower transmission latency and guarantee higher reliability, a packet duplication transmission technology may be applied to a UL and a DL. According to the packet duplication transmission technology, a same packet is transmitted in a duplicate manner through two radio link control (RLC) layers, and when a retransmission number with respect to certain data exceeds in an RLC layer from among the two RLC layers, the RLC layer being connected to an Scell, a Scell RLF is declared. That is, a UE may report, to an eNB, by using a radio resource control (RRC) message, that a maximum retransmission number with respect to certain data exceeds in the RLC layer connected to the Scell, and the report may be called the Scell RLF. According to some embodiments of the disclosure, provided is a method of preventing the Scell RLF from being unnecessarily triggered several times in a process of triggering and transmitting the Scell RLF, and efficiently managing variables for calculating a maximum retransmission number.

According to an embodiment of the disclosure, provided is a method, performed by the eNB, of receiving detail information about a most-recent successful random access by the UE from each of UEs so as to efficiently allocate (e.g., a number of random access channels) a random access channel to each of the UEs in a cell.

Hereinafter, the disclosure provides a method and apparatus for efficiently managing bearers and processing a protocol layer when an event occurs, in which the UE suspends the bearers and the protocol layer in a next-generation mobile communication system.

The disclosure also provides a method and apparatus for recovering data loss that may occur in radio nodes when the next-generation mobile communication system supports a network structure supporting wireless backhauls.

In the next-generation mobile communication system, an event may occur, in which a bearer or protocol layers (a Service Data Adaptation Protocol (SDAP) layer, a PDCP layer, an RLC layer, a Medium Access Control (MAC) layer, or a physical (PHY) layer) of the UE has to be suspended. In detail, when the UE has to transit to a Radio Resource Control (RRC) inactive mode due to an indication by a network or an RLF occurs, the UE is required to efficiently process the bearer or the protocol layers in response to the occurred event.

According to embodiments of the disclosure, in the next-generation mobile communication system, an event may occur, in which a bearer or protocol layers (a SDAP layer, a PDCP layer, an RLC layer, a MAC layer, or a PHY layer) of the UE has to be suspended. In detail, when the UE has to transit to an RRC inactive mode due to an indication by a network or an RLF occurs, the UE is required to efficiently process the bearer or the protocol layers in response to the occurred event. In a case where the UE has to transit to the RRC inactive mode due to the indication by the network, when the UE stores a plurality of items of data stored in the bearer or the protocol layer until reconnection is successful at a later time, unnecessary retransmission may occur and it is inefficient in terms of buffer management. Therefore, the UE has to perform a process of discarding the plurality of items of data stored in the bearer or the protocol layer, and resetting values of applied variables, by using a security key. Also, when data is received or a plurality of items of received data were not transferred to an upper layer, the UE may immediately transfer the data to the upper layer such that a transmission delay may be decreased. Also, the UE may suspend the bearer and thus may stop additional data transmission or reception. When an RLF occurs in the UE, additional data transmission or reception is not available, and thus, to prevent unnecessary data processing, the UE may suspend bearers (Signaling Radio Bearers (SRBs) or Data Radio Bearers (DRBs)), and may perform an RRC reconnection process.

FIG. 1A illustrates a diagram of a configuration of an LTE system, according to some embodiments of the disclosure.

Referring to FIG. 1A, a radio access network (RAN) of the LTE system includes a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 may be connected to the UE 1a-35 through wireless channels and may perform complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology such as OFDM at a bandwidth of 20 MHz to achieve a data rate of 100 Mbps. The eNB may also use adaptive modulation & coding (AMC) to determine a modulation scheme and a channel coding rate in accordance with a channel state of the UE 1a-35. The S-GW 1a-30 is an entity for providing data bearers and may establish and release the data bearers by the control of the MME 1a-25. The MME 1a-25 is an entity for performing a mobility management function and various control functions on the UE 1a-35 and is connected to the plurality of eNBs 1a-05, 1a-10, 1a-15, and 1a-20.

Figure 1B:
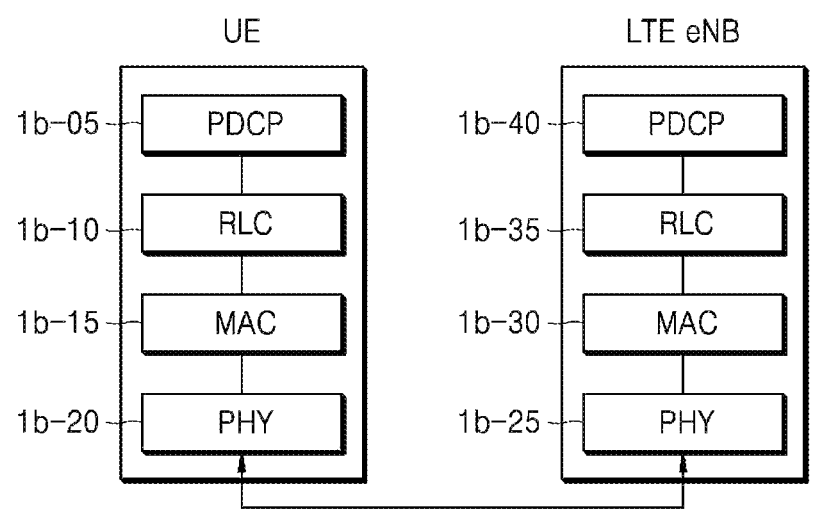
FIG. 1B illustrates a diagram of a radio protocol architecture of an LTE system, according to some embodiments of the disclosure.

FIG. 1B illustrates a diagram of a radio protocol architecture of an LTE system, according to some embodiments of the disclosure.

Referring to FIG. 1B, the radio protocol architecture of the LTE system may include Packet Data Convergence Protocol (PDCP) layers 1b-05 and 1b-40, RLC layers 1b-10 and 1b-35, and MAC layers 1b-15 and 1b-30 respectively for a UE and an eNB. The PDCP layer 1b-05 or 1b-40 may perform, for example, IP header compression/decompression. Main functions of the PDCP layer 1b-05 or 1b-40 are summarized as shown below. However, the functions thereof are not limited thereto.

- Header compression and decompression: robust header compression (ROHC) only
- Transfer of user data
- In-sequence delivery of upper layer packet data units (PDUs) at PDCP re-establishment procedure for RLC acknowledged mode (AM)
- For split bearers in DC (only support for RLC AM): PDCP PDU routing for transmission and PDCP PDU reordering for reception
- Duplicate detection of lower layer service data units (SDUs) at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLC layer 1b-10 or 1b-35 may perform an automatic repeat request (ARQ) operation by reconfiguring PDCP PDUs to appropriate sizes. Main functions of the RLC layer 1b-10 or 1b-35 may be summarized as shown below. However, the functions thereof are not limited thereto.

- Transfer of upper layer PDUs
- Error correction through ARQ (only for AM data transfer)
- Concatenation, segmentation and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below. However, the functions thereof are not limited thereto.

Mapping between logical channels and transport channels
    Multiplexing/demultiplexing of MAC SDUs belonging to one or different logical channels into/from transport blocks (TBs) delivered to/from the physical layer on transport channels
    Scheduling information reporting
    Error correction through hybrid ARQ (HARM)
    Priority handling between logical channels of one UE
    Priority handling between UEs by means of dynamic scheduling
    Multimedia broadcast/multicast service (MBMS) service identification
    Transport format selection
    Padding A PHY layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 1C:
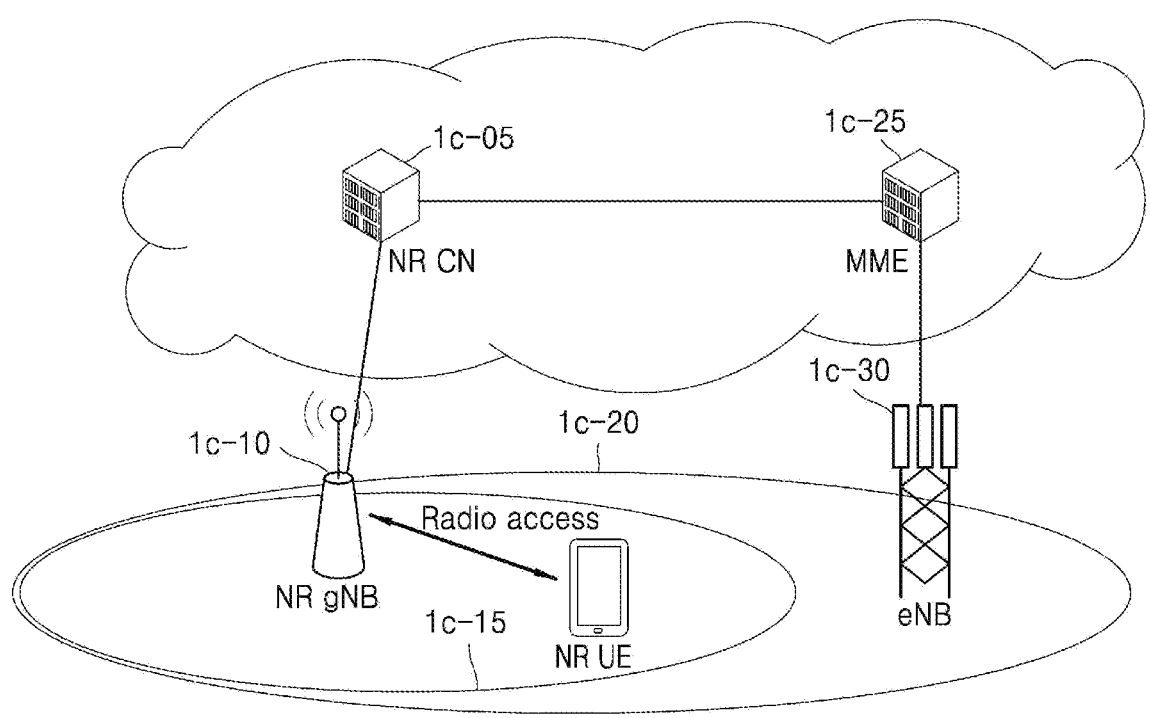
FIG. 1C illustrates a diagram of a next-generation mobile communication system, according to some embodiments of the disclosure.

FIG. 1C illustrates a diagram of a next-generation mobile communication system, according to some embodiments of the disclosure.

Referring to FIG. 1C, as illustrated, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an existing eNB of an LTE system. The NR gNB 1c-10 may be connected to the NR UE 1c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology.

According to some embodiments of the disclosure, the NR gNB 1c-10 may use AMC to determine a modulation scheme and a channel coding rate in accordance with a channel state of the NR UE 1c-15. The NR CN 1c-05 may perform functions such as mobility support, bearer configuration, and quality of service (QoS) configuration. The NR CN 1c-05 is an entity for performing a mobility management function and various control functions on the NR UE 1c-15 and is connected to a plurality of base stations. The NR or 5G mobile communication system may cooperate with the existing LTE system, and the NR CN 1c-05 may be connected to an MME 1c-25 through a network interface. The MME 1c-25 may be connected to an existing eNB 1c-30.

Figure 1D:
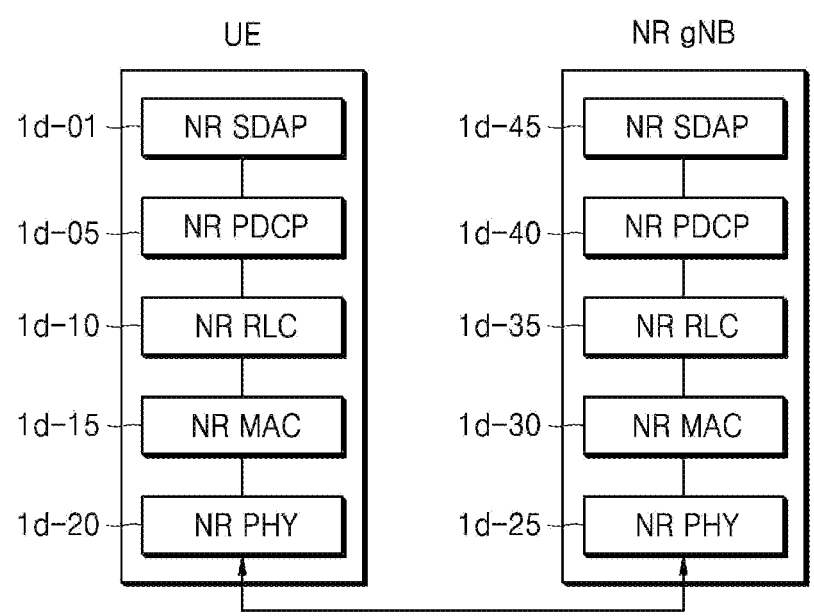
FIG. 1D illustrates a diagram of a radio protocol architecture of a new radio (NR) or $5^{th}$ generation (5G) mobile communication system, according to some embodiments of the disclosure.

Referring to FIG. 1D, the radio protocol architecture of the NR or 5G mobile communication system may include NR SDAP layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

According to some embodiments of the disclosure, main functions of the NR SDAP entity 1d-01 or 1d-45 may include some of the following functions. However, the functions thereof are not limited thereto.

Transfer of user plane data
    Mapping between a QoS flow and a DRB for both DL and UL
    Marking QoS flow identifier (ID) in both DL and UL packets
    Reflective QoS flow to DRB mapping for the UL SDAP PDUs With regard to a SDAP layer, information about whether to use a header of the SDAP layer or to use functions of the SDAP layer may be configured for the UE by using an RRC message per PDCP layer, per bearer, or per logical channel. When the SDAP header of the SDAP layer is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. According to some embodiments of the disclosure, the SDAP header may include QoS flow ID information indicating QoS. According to some embodiments of the disclosure, QoS information may be used as data processing priority information or scheduling information for appropriately supporting a service.

According to some embodiments of the disclosure, main functions of the NR PDCP layer 1d-05 or 1d-40 may include some of the following functions. However, the functions thereof are not limited thereto.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink According to some embodiments of the disclosure, the reordering function of the NR PDCP layer 1d-05 or 1d-40 may include at least one of a function of reordering PDCP PDUs received from a lower layer, on a PDCP sequence number (SN) basis, a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

According to some embodiments of the disclosure, main functions of the NR RLC layer 1d-10 or 1d-35 may include some of the following functions. However, the functions thereof are not limited thereto.

Transfer of upper layer PDUs
    In-sequence delivery of upper layer PDUs
    Out-of-sequence delivery of upper layer PDUs
    Error correction through ARQ
    Concatenation, segmentation and reassembly of RLC SDUs Re-segmentation of RLC data PDUs
Reordering of RLC data PDUs
Duplicate detection
Protocol error detection
RLC SDU discard
RLC re-establishment According to some embodiments of the disclosure, the in-sequence delivery function of the NR RLC layer 1d-10 or 1d-35 may include at least one of a function of delivering RLC SDUs received from a lower layer, to an upper layer in order, a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires The NR RLC layer 1d-10 or 1d-35 may process the RLC PDUs in order of reception and deliver the RLC PDUs to the NR PDCP layer 1d-05 or 1d-40 regardless of SNs (out-of-sequence delivery), and when a segment is received, the NR RLC layer 1d-10 or 1d-35 may reassemble the segment with other segments stored in a buffer or subsequently received, into a whole RLC PDU and may deliver the RLC PDU to the NR PDCP layer 1d-05 or 1d-40. According to some embodiments of the disclosure, the NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include at least one of a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

According to some embodiments of the disclosure, the NR MAC layer 1d-15 or 1d-30 may be connected to a plurality of NR RLC layers configured for one UE, and main functions of the NR MAC layer 1d-15 or 1d-30 may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer. However, the functions thereof are not limited thereto.

Figure 1E:
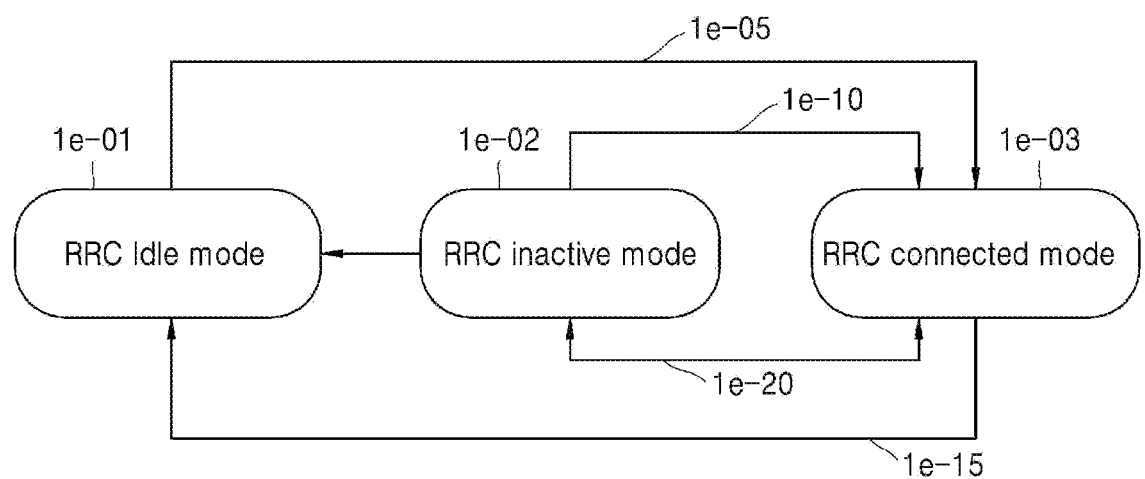
FIG. 1E illustrates a diagram of modes in which a user equipment (UE) may stay in the NR or 5G communication system, according to some embodiments of the disclosure.

FIG. 1E illustrates a diagram of modes in which a UE may stay in the NR or 5G communication system, according to some embodiments of the disclosure.

Referring to FIG. 1E, the UE may stay in an RRC connected mode 1e-03, an RRC inactive mode 1e-02, or an RRC idle mode 1e-01, and may go through a procedure 1e-05, 1e-10, 1e-15, 1e-20, or 1e-25 for transiting to a different mode.

That is, when the UE in the RRC idle mode 1e-01 receives a paging message because data to be transmitted to a UL is generated or DL data is received, or when the UE needs to transmit and receive data by establishing connection with a network so as to update (periodically or when exiting from a tracking area) the tracking area or a RAN paging area, the UE may transit to the RRC connected mode 1e-03 (the procedure 1e-05). When the UE updates the RAN paging area, the UE may perform the update by exchanging messages while staying in the RRC inactive mode 1e-02.

After data is received or transmitted, when data is not generated for a predefined time, the UE in the RRC connected mode 1e-03 may transit to the RRC idle mode 1e-01 by the network (the procedure 1e-15). Also, when data is not generated for a predefined time, the UE in the RRC connected mode 1e-03 may change its mode by the network or by itself (e.g., when a timer value set by the network is expired) so as to decrease battery consumption and support fast connection, and thus may transit to the RRC inactive mode 1e-02 (the procedure 1e-20). When the UE in the RRC inactive mode 1e-02 receives a paging message because data to be transmitted to a UL is generated or DL data is received, or when the UE needs to transmit and receive data by establishing connection with the network so as to update (periodically or when exiting from a tracking area) the tracking area or the RAN paging area, the UE may transit to the RRC connected mode 1e-03 (the procedure 1e-10). The UE in the RRC inactive mode 1e-02 may transit to the RRC idle mode 1e-01 (the procedure 1e-25) by an indication by the network, by a predefined setting, or by itself (e.g., when a timer value set by the network is expired).

When many UEs in an RRC inactive mode exist in the network, a signaling overhead of the network may increase due to frequent RAN notification area update processes, and thus, to prevent the increase, transition from the RRC inactive mode 1e-02 to the RRC idle mode 1e-01 may be an operation requiring support by the network. A UE having a predefined objective may transmit data in the RRC inactive mode 1e-02 without transiting to the RRC connected mode 1e-03, and may repeat transition between the RRC inactive mode 1e-02 and the RRC idle mode 1e-01, in response to an indication by the network and may transit to the RRC connected mode 1e-03 only when required. The UE in the RRC inactive mode 1e-02 may have a very short transmission delay by transmitting data in the RRC inactive mode 1e-02, and may have a very small signaling overhead. The predefined objective may correspond to a case in which, when the UE attempts to transmit only small data, the UE transmits the data in an intermittent manner or a periodic manner based on a long time period. The UE in the RRC idle mode 1e-01 may directly transit to the RRC inactive mode 1e-02 by the network, or may transit to the RRC connected mode 1e-03 and then may transit to the RRC inactive mode 1e-02 (the procedure 1e-20).

When the UE transits between modes, an additional active timer may be configured and driven in the UE so as to solve a problem of a state mismatch between a mode of the UE that is detected by the network and an actual mode of the UE. Also, an additional timer may be driven in a gNB.

Figure 1F:
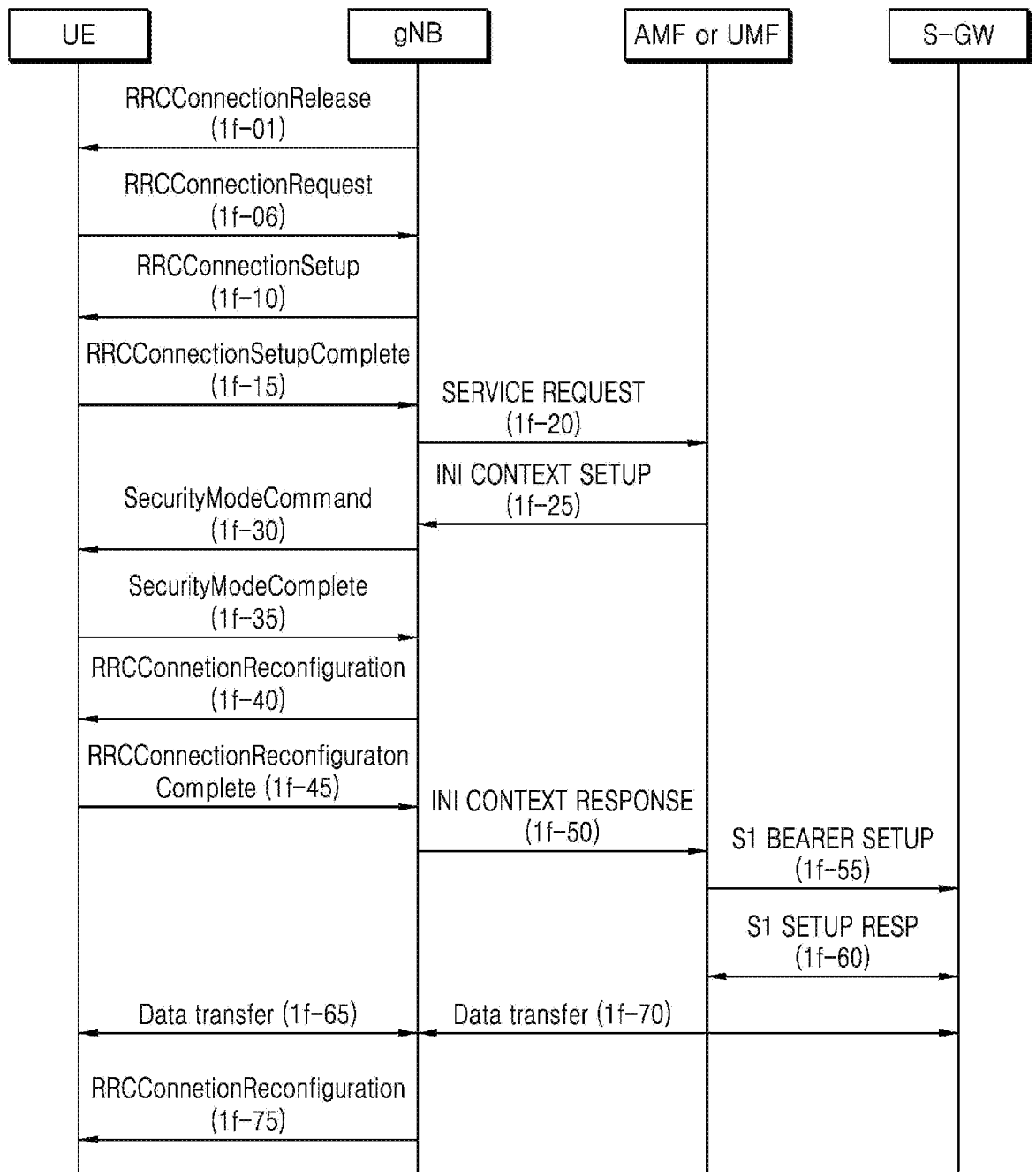
FIG. 1F illustrates a diagram for describing processes, performed by a UE, of transiting from a radio resource control (RRC) connected mode to an RRC idle mode and transiting from the RRC idle mode to the RRC connected mode, according to some embodiments of the disclosure.

FIG. 1F illustrates a diagram for describing processes, performed by a UE, of transiting from an RRC connected mode to an RRC idle mode and transiting from the RRC idle mode to the RRC connected mode, according to some embodiments of the disclosure.

Referring to FIG. 1F, when the UE configured to transmit and receive data in the RRC connected mode does not transmit or receive data due to a predefined reason or for a predefined time, a gNB may transmit an RRCConnection-Release message to the UE so as to allow the UE to transit to the RRC idle mode (1f-01). Afterward, when the UE that is not currently configured for connection (hereinafter, also referred to as the idle-mode UE) has data to be transmitted, the UE may perform an RRC connection establishment process on the gNB.

The UE establishes inverse direction transmission synchronization with the gNB through a random access process, and transmits an RRCConnectionRequest message to the gNB (1f-05). The RRCConnectionRequest message may include an identifier of the UE, an establishment cause or the like.

The gNB transmits an RRCConnectionSetup message to allow the UE to establish RRC connection (1f-10). The RRCConnectionSetup message may include RRC connection configuration information, or the like. The RRC connection is also referred to as an SRB, and is used in transmitting and receiving an RRC message that is a control message between the UE and the gNB.

The UE that set up the RRC connection transmits an RRCConnetionSetupComplete message to the gNB (1f-15). The RRCConnetionSetupCompletem message includes a control message of SERVICE REQUEST requesting, by the UE, an MME for bearer setup for a certain service. The gNB transmits the control message of SERVICE REQUEST included in the RRCConnetionSetupCompletem message to the MME (1f-20), and the MME determines whether to provide the service requested by the UE. As a result of the determination, when the MME determines to provide the service requested by the UE, the MME transmits an INITIAL CONTEXT SETUP REQUEST message to the gNB (1f-25). The INITIAL CONTEXT SETUP REQUEST message may include QoS information to be applied to configuration of a DRB, security information (e.g., a security key, a security algorithm, or the like) to be applied to the DRB, or the like.

The gNB exchanges a SecurityModeCommand message (1f-30) and a SecurityModeComplete message (1f-35) with the UE so as to configure security. When the configuration of the security is completed, the gNB transmits an RRCConnectionReconfiguration message to the UE (1f-40). The RRCConnectionReconfiguration message includes configuration information about a DRB to process user data, and the UE configures the DRB by using the configuration information about the DRB and transmits an RRCConnection-ReconfigurationComplete message to the gNB (1f-45). After the gNB completes the configuration of the DRB with the UE, the gNB transmits an INITIAL CONTEXT SETUP COMPLETE message to the MME (1f-50), and upon reception of the message, the MME exchanges a S1 BEARER SETUP message and a S1 BEARER SETUP RESPONSE message (1f-55 and 1f-60) with a S-GW so as to configure a S1 bearer. The S1 bearer indicates connection for data transmission established between the S-GW and the DRB, and corresponds to the DRB on a one-to-one basis. When the aforementioned processes are completed, the UE transmits and receives data to/from the gNB via the S-GW (1f-65 and 1f-70). As described above, the general data transmission procedure broadly consists of 3 steps that are RRC connection configuration, security configuration, and DRB configuration. The gNB may transmit an RRCConnectionReconfiguration message to newly allocate, add, or change configuration with respect to the UE (1f-75).

In the bearer setup, a bearer may include an SRB and a DRB, wherein the SRB indicates a Signaling Radio Bearer configured to transmit a control message (e.g., an RRC message), and the DRB indicates a Data Radio Bearer configured to transmit data. A UM DRB indicates a DRB configured to use an RLC layer operating in an unacknowledged mode (UM), and an acknowledged mode (AM) DRB indicates a DRB configured to use an RLC layer operating in an AM.

Many signaling processes are required for transition from an RRC idle mode to an RRC connected mode. Therefore, the NR or 5G communication system may newly define an RRC inactive mode, and in a new mode, the UE and the gNB may store context of the UE and may maintain a S1 bearer when required, such that an access may be achieved by fewer signaling processes.

Figure 1G:
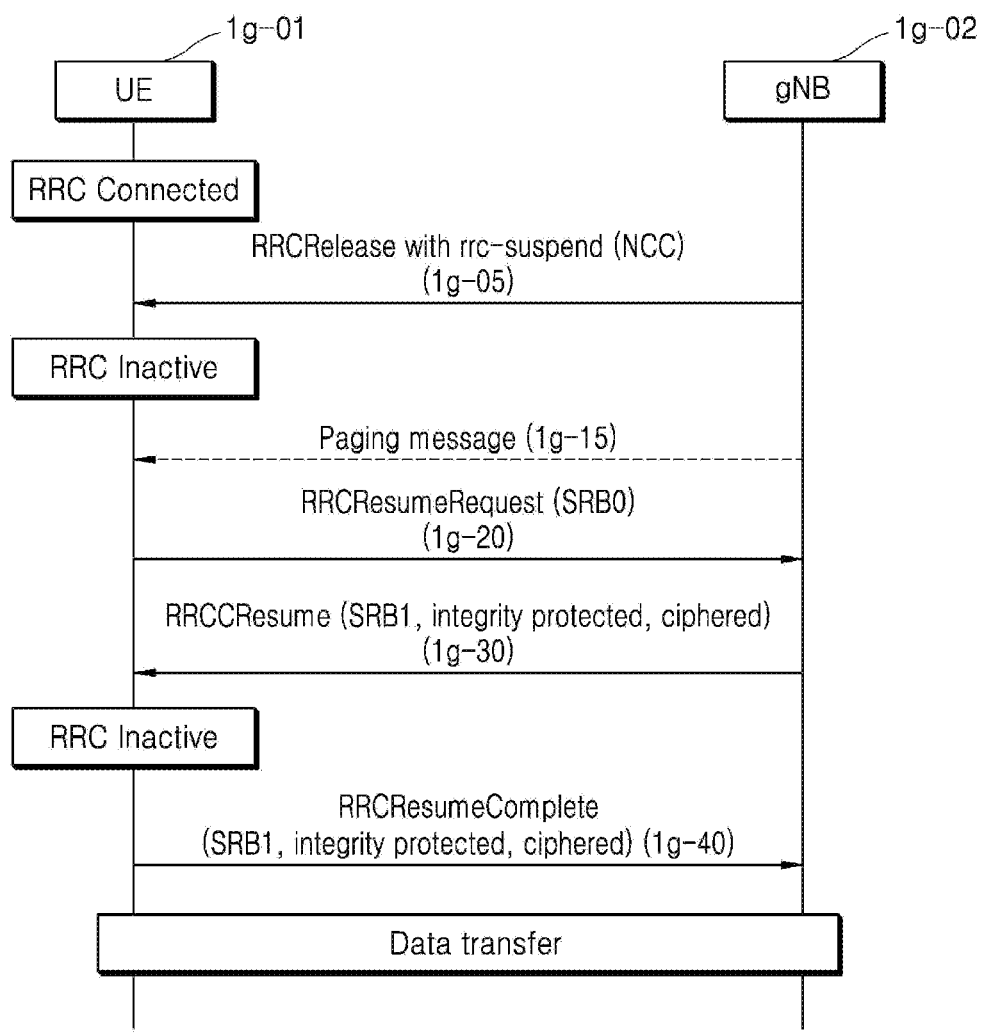
FIG. 1G illustrates a diagram of efficient operations of each of protocol layers when a UE in an RRC inactive mode resumes connection with a network because the UE receives a paging message or data to be transmitted to an uplink (UL) is generated, according to some embodiments of the disclosure.

FIG. 1G illustrates a diagram of efficient operations of each of protocol layers when a UE 1g-01 in an RRC inactive mode resumes connection with a network because the UE 1g-01 receives a paging message or data to be transmitted to a UL is generated, according to some embodiments of the disclosure.

In the disclosure, a first embodiment with respect to efficient operations of a protocol layer of the UE 1g-01 in the RRC inactive mode is as below.

Referring to FIG. 1G, a gNB 1g-02 may transit the UE 1g-01 from an RRC connected mode to the RRC inactive mode by transmitting an RRC message 1g-05 to the UE 1g-01 due to a predefined cause. According to some embodiments of the disclosure, the predefined cause may occur due to scheduling for efficiently using transmission resources of a network, and may occur when DL data or UL data with respect to the UE 1g-01 has not been generated for a certain time or is expected not to be generated for a certain time. The RRC message 1g-05 may correspond to an RRCRelease message 1g-05 that indicates, by using an indicator such as rrc-suspend, transition to an RRC inactive mode.

The UE 1g-01 receives the RRCRelease message 1g-05, and when suspend-config configuration is included in the RRCRelease message 1g-05, the UE 1g-01 may perform some or all of processes to be described below (Upon the reception of RRCRelease with suspend-config).

A process of storing a connection resume identifier (a full connection resume identifier (full I-RNTI) or a short connection resume identifier (short I-RNTI)), a value for deriving a security key (NextchainingCount (NCC)), and a period value for calculating RAN paging.

A process of resetting a MAC layer so as to prevent unnecessary HARQ transmission of a plurality of items of data stored in a buffer of the MAC layer. A process of resetting the MAC layer may include discarding stored data (a MAC SDU or a MAC PDU), emptying and resetting a HARQ buffer, resetting a HARQ processor identifier or a related timer, or flushing a logical channel identifier.

Because the UE 1g-01 may receive an RRCResume message and transmit an RRCResumeComplete message through a SRB1 when re-connection is made to a network at a later time, a RLC re-establishment process may be performed on the SRB1 to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). Also, a RLC re-establishment process may be performed on other SRBs and DRBs to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). The RLC re-establishment process performed on the other SRBs and DRBs may be performed after the UE 1g-01 receives the RRCResume message when the UE 1g-01 attempts to reconnect with the network at a later time. However, to maximize efficiency in the buffer management, it is recommended to perform the RLC re-establishment process on the other SRBs and DRBs when the RRCResume message is received (the network may determine whether to perform the RLC re-establishment process on each of bearers, by using an indicator).

The UE 1g-01 may store current UE context. A UE context may include RRC configuration information, security configuration information, ROHC context of the PDCP layer, configuration information of the SDAP layer, cell identifier (C-RNTI), or the like.

When the aforementioned processes are completed, bearers (the SRB or the DRB) may be suspended, except for a SRB0 that is supposed to transmit a message at all times without a security process in a random access process.

To prevent unnecessary retransmission of a plurality of items of data stored in a buffer of a PDCP layer of an AM DRB to which an AM mode RLC layer is applied, a plurality of items of data (a PDCP SDU or a PDCP PDU) stored in a PDCP layer of a transmitter may be discarded. Also, to reset a COUNT value used for the security key and perform synchronization of variables with the gNB when reconnection is made with the network, a transmission window state variable (TX_NEXT) may be reset to an initial value, by a transmitting PDCP. The variable TX_NEXT indicates a count value of the next PDCP SDU to be transmitted. The initial value may be 0. Also, to fast transfer, to an upper layer, a plurality of items of data (a PDCP SDU or a PDCP PDU) received, while a PDCP reordering timer operates, by the PDCP layer of the AM DRB of the receiver to which the AM mode RLC layer is applied, when the PDCP reordering timer operates, the PDCP reordering timer may be stopped and reset, and a plurality of items of stored data may be transferred to the upper layer in an ascending order of COUNT values after decompressing header compression when the header compression was performed on the data, by a receiving PDCP. Then, to reset the COUNT value used for the security key and perform synchronization of variables with the gNB when reconnection is made with the network, reception window state variables (RX_NEXT and RX_DELIV) may be reset to initial values, by the receiving PDCP. The variable RX_NEXT indicates a count value of the next PDCP SDU expected to be received. The initial value may be 0. The variable RX_DELIV indicates a count value of the first PDCP SDU not delivered to the upper layers, but still waited for. The initial value may be 0. When the PDCP layer of the AM DRB of the receiver to which the AM mode RLC layer is applied receives a plurality of items of data through the RLC re-establishment process from a lower layer (the RLC layer), the PDCP layer may decipher the plurality of items of received data, may perform integrity verification on the data when required, may decompress header compression when required, may stop and reset the PDCP reordering timer, may order a plurality of items of data in an ascending order of COUNT values and transmit them to the upper layer (it is an operation that is efficient for a case of EN-DC (connected with a LTE base station and a NR base station) or a case in which the LTE base station uses an NR PDCP layer, i.e., when the NR PDCP layer is connected with a LTE RLC layer, and the LTE RLC layer is re-established).

When the processes are completed, disconnection of RRC connection is reported to an upper layer (an NAS layer), and the UE 1g-01 may transit to the RRC inactive mode.

The UE 1g-01 that transit to the RRC inactive mode may perform an RRC connection resume procedure with respect to the network due to a predefined cause. According to some embodiments of the disclosure, the predefined cause may correspond to a case in which the UE 1g-01 receives a paging message 1g-15 or UL data is generated in the UE 1g-01. To resume connection with the network, due to the predefined cause, the UE 1g-01 may perform some or all of operations below before, when, or after the UE 1g-01 transmits an RRC Resume Request message 1g-20 (Actions related to transmission of RRCResumeRequest message).

The UE 1g-01 inserts the stored connection resume identifier (the full connection resume identifier (full I-RNTI) or the short connection resume identifier (short I-RNTI)) into an RRCResumeRequest message, configures a cause of connection resume, derives a connection resume MAC-I by using a current configured security key, and inserts the connection resume MAC-I into the RRCResumeRequest.

The UE 1g-01 restores RRC configuration and security configuration from the stored UE context, derives a new security key by using an NCC value for deriving a security key, and applies the new security key to integrity protection and ciphering algorithm with respect to bearers (the other SRBs or DRBs) except for the SRB0.

The UE 1g-01 may restore PDCP configuration information (e.g., the ROHC context, etc.) of the PDCP layer, may transmit the RRCResumeRequest to the SRB0, may receive a response message thereto through the SRB1, and may perform a PDCP re-establishment process on the SRB1 so as to apply the derived new security key to perform integrity verification or a deciphering process.

It is configured that, when the security key is updated through the PDCP re-establishment process with respect to the SRB1, the SRB1 is to be resumed.

The UE 1g-01 may transmit an RRC Resume Request message 1g-20, and in response thereto, the gNB may transmit an RRC Resume message 1g-30 or an RRCRelease message including an rrc-suspend indicator to the UE 1g-01. In the disclosure, to enhance security when the gNB transmits the RRC message 1g-30, the gNB may perform a ciphering process on the RRC message 1g-30 by generating and updating the security key based on the NCC in the RRC message 1g-05 transmitted to the UE 1g-01, may perform an integrity protection process, and thus may transmit a message.

When the RRC Resume message 1g-30 is received from the gNB, the UE 1g-01 may perform some or all of processes below. (Reception of the RRCResume by the UE)

When the UE 1g-01 receives the RRCResume message 1g-30, the UE 1g-01 may restore a PDCP state of a SRB2 or all DRBs. The PDCP state may include context, security key information, or the like with respect to a header compression protocol (ROHC). Then, when the UE 1g-01 transmits an RRCResumeRequest message, the UE 1g-01 may perform a PDCP re-establishment process on the SRB2 or all DRBs so as to apply a key, which is newly derived the UE 1g-01, to ciphering and integrity protection algorithm.

Because the UE 1g-01 receives, as the RRCResume message 1g-30, a response indicating an access to the network is available, the UE 1g-01 discards the connection resume identifier or the stored UE context, except for RAN notification area information.

The SRB2 or all DRBs are resumed or restarted. The resume may mean that processing and transmission or reception of data is restarted, and the suspend may mean that processing and transmission or reception of data is suspended.

The UE 1g-01 may enter an RRC connected mode, and may indicate, to the upper layer, that suspended RRC connection is resumed.

The UE 1g-01 transmits an RRCResumeComplete message 1g-40 to the gNB and thus ends a connection resume process.

When the UE 1g-01 receives the RRC message 1g-30, the UE 1g-01 transits to the RRC connected mode, transmits the RRCResumeComplete message 1g-40 indicating completion of RRC connection establishment to the gNB, and resumes data transmission and reception to/from the gNB.

In the disclosure, a second embodiment with respect to efficient operations of a protocol layer of the UE 1g-01 in the RRC inactive mode is as below.

Referring to FIG. 1G, the gNB 1g-02 may transit the UE 1g-01 from an RRC connected mode to the RRC inactive mode by transmitting the RRC message 1g-05 to the UE 1g-01 due to a predefined cause. According to some embodiments of the disclosure, the predefined cause may occur due to scheduling for efficiently using transmission resources of the network, and may occur when DL data or UL data with respect to the UE 1g-01 has not been generated for a certain time or is expected not to be generated for a certain time. The RRC message 1g-05 may correspond to the RRCRelease message 1g-05 that indicates, by using an indicator such as rrc-suspend, transition to an RRC inactive mode.

The UE 1g-01 receives the RRCRelease message 1g-05, and when suspend-config configuration is included in the RRCRelease message 1g-05, the UE 1g-01 may perform some or all of processes to be described below (Upon the reception of RRCRelease with suspend-config).

A process of storing a connection resume identifier (a full connection resume identifier (full I-RNTI) or a short connection resume identifier (short I-RNTI)), a value for deriving a security key (NCC), and a period value for calculating RAN paging.

A process of resetting a MAC layer so as to prevent unnecessary HARQ transmission of a plurality of items of data stored in a buffer of the MAC layer. A process of resetting the MAC layer may include discarding stored data (a MAC SDU or a MAC PDU), emptying and resetting a HARQ buffer, resetting a HARQ processor identifier or a related timer, or flushing a logical channel identifier.

Because the UE 1g-01 may receive an RRCResume message and transmit an RRCResumeComplete message through the SRB1 when re-connection is made to a network at a later time, a RLC re-establishment process may be performed on the SRB1 to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). Also, a RLC re-establishment process may be performed on other SRBs and DRBs to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). The RLC re-establishment process performed on the other SRBs and DRBs may be performed after the UE 1g-01 receives the RRCResume message when the UE 1g-01 attempts to reconnect with the network at a later time. However, to maximize efficiency in the buffer management, it is recommended to perform the RLC re-establishment process on the other SRBs and DRBs when the RRCResume message is received (the network may determine whether to perform the RLC re-establishment process on each of bearers, by using an indicator).

The UE 1g-01 may store current UE context. The UE context may include RRC configuration information, security configuration information, ROHC context of the PDCP layer, configuration information of the SDAP layer, cell identifier (C-RNTI), or the like.

When the aforementioned processes are completed, bearers (the SRB or the DRB) may be suspended, except for the SRB0 that is supposed to transmit a message at all times without a security process in a random access process.

The UE 1g-01 triggers a PDCP layer reset process or PDCP layer suspend process on PDCP layers of the DRBs. The PDCP layer reset process or the PDCP layer suspend process may be applied only to the AM DRB. However, because processes of resetting variables and discarding data may be equally performed in advance on a UM DRB (or an SRB), the PDCP layer reset process or the PDCP layer suspend process may also be applied to the UM DRB (or the SRB) in an extended manner.

The PDCP layer reset process or the PDCP layer suspend process may be implemented as below, and some or all of processes below may be performed.

To reset a COUNT value used for the security key and perform synchronization of variables with the gNB when reconnection is made with the network, a transmission window state variable (TX_NEXT) may be reset to an initial value.

To prevent unnecessary retransmission of a plurality of items of data stored in the buffer of the PDCP layer of the AM DRB to which the AM mode RLC layer is applied, a plurality of items of data (a PDCP SDU or a PDCP PDU) stored in a PDCP layer of a transmitter may be discarded.

Also, to fast transfer, to an upper layer, a plurality of items of data (a PDCP SDU or a PDCP PDU) received, while a PDCP reordering timer operates, by the PDCP layer of the AM DRB of the receiver to which the AM mode RLC layer is applied, when the PDCP reordering timer operates, the PDCP reordering timer may be stopped and reset, and a plurality of items of stored data may be transferred to the upper layer in an ascending order of COUNT values after decompressing header compression when the header compression was performed on the data.

To reset the COUNT value used for the security key and perform synchronization of variables with the gNB when reconnection is made with the network, reception window state variables (RX_NEXT and RX_DELIV) may be reset to initial values.

When the PDCP layer of the AM DRB of the receiver to which the AM mode RLC layer is applied receives a plurality of items of data through the RLC re-establishment process from a lower layer (the RLC layer), the PDCP layer may decipher the plurality of items of received data, may perform integrity verification on the data when required, may decompress header compression when required, may stop and reset the PDCP reordering timer, may order a plurality of items of data in an ascending order of COUNT values and transmit them to the upper layer (it is an operation that is efficient for a case of EN-DC (connected with a LTE base station and a NR base station) or a case in which the LTE base station uses an NR PDCP layer, i.e., when the NR PDCP layer is connected with a LTE RLC layer, and the LTE RLC layer is re-established).

When the processes are completed, disconnection of RRC connection is reported to an upper layer (the NAS layer), and the UE 1g-01 may transit to the RRC inactive mode.

The UE 1g-01 that transit to the RRC inactive mode may perform an RRC connection resume procedure with respect to the network due to a predefined cause. According to some embodiments of the disclosure, the predefined cause may correspond to a case in which the UE 1g-01 receives the paging message 1g-15 or UL data is generated in the UE 1g-01. To resume connection with the network, due to the predefined cause, the UE 1g-01 may perform some or all of operations below before, when, or after the UE 1g-01 transmits the RRC Resume Request message 1g-20 (Actions related to transmission of RRCResumeRequest message).

The UE 1g-01 inserts the stored connection resume identifier (the full connection resume identifier (full I-RNTI) or the short connection resume identifier (short I-RNTI)) into an RRCResumeRequest message, configures a cause of connection resume, derives a connection resume MAC-I by using a current configured security key, and inserts the connection resume MAC-I into the RRCResumeRequest.

The UE 1g-01 restores RRC configuration and security configuration from the stored UE context, derives a new security key by using an NCC value for deriving a security key, and applies the new security key to integrity protection and ciphering algorithm with respect to bearers (the other SRBs or DRB s) except for the SRB0.

The UE 1g-01 may restore PDCP configuration information (e.g., the ROHC context, etc.) of the PDCP layer, may transmit the RRCResumeRequest to the SRB0, may receive a response message thereto through the SRB1, and may perform a PDCP re-establishment process on the SRB1 so as to apply the derived new security key to perform integrity verification or a deciphering process.

It is configured that, when the security key is updated through the PDCP re-establishment process with respect to the SRB1, the SRB1 is to be resumed.

The UE 1g-01 may transmit the RRC Resume Request message 1g-20, and in response thereto, the gNB may transmit an RRC Resume message 1g-30 or an RRCRelease message including an rrc-suspend indicator to the UE 1g-01. In the disclosure, to enhance security when the gNB transmits the RRC message 1g-30, the gNB may perform a ciphering process on the RRC message 1g-30 by generating and updating the security key based on the NCC in the RRC message 1g-05 transmitted to the UE 1g-01, may perform an integrity protection process, and thus may transmit a message.

When the RRC Resume message 1g-30 is received from the gNB, the UE 1g-01 may perform some or all of processes below. (Reception of the RRCResume by the UE)

When the UE 1g-01 receives the RRCResume message 1g-30, the UE 1g-01 may restore a PDCP state of the SRB2 or all DRBs. The PDCP state may include context, security key information, or the like with respect to a header compression protocol (ROHC). Then, when the UE 1g-01 transmits an RRCResumeRequest message, the UE 1g-01 may perform a PDCP re-establishment process on the SRB2 or all DRBs so as to apply a key, which is newly derived the UE 1g-01, to ciphering and integrity protection algorithm.

Because the UE 1g-01 receives, as the RRCResume message 1g-30, a response indicating an access to the network is available, the UE 1g-01 discards the connection resume identifier or the stored UE context, except for RAN notification area information.

The SRB2 or all DRBs are resumed or restarted. The resume may mean that processing and transmission or reception of data is restarted, and the suspend may mean that processing and transmission or reception of data is suspended.

The UE 1g-01 may enter an RRC connected mode, and may indicate, to the upper layer, that suspended RRC connection is resumed.

The UE 1g-01 transmits the RRCResumeComplete message 1g-40 to the gNB and thus ends a connection resume process.

As described above, when the UE 1g-01 receives the RRC message 1g-30, the UE 1g-01 transits to the RRC connected mode, transmits the RRCResumeComplete message 1g-40 indicating completion of RRC connection establishment to the gNB, and resumes data transmission and reception to/from the gNB.

In the disclosure, a third embodiment with respect to efficient operations of a protocol layer of the UE 1g-01 in the RRC inactive mode is as below.

Referring to FIG. 1G, the gNB 1g-02 may transit the UE 1g-01 from an RRC connected mode to the RRC inactive mode by transmitting the RRC message 1g-05 to the UE 1g-01 due to a predefined cause. According to some embodiments of the disclosure, the predefined cause may occur due to scheduling for efficiently using transmission resources of the network, and may occur when DL data or UL data with respect to the UE 1g-01 has not been generated for a certain time or is expected not to be generated for a certain time. The RRC message 1g-05 may correspond to the RRCRelease message 1g-05 that indicates, by using an indicator such as rrc-suspend, transition to an RRC inactive mode.

The UE 1g-01 receives the RRCRelease message 1g-05, and when suspend-config configuration is included in the RRCRelease message 1g-05, the UE 1g-01 may perform some or all of processes to be described below (Upon the reception of RRCRelease with suspend-config).

A process of storing a connection resume identifier (a full connection resume identifier (full I-RNTI) or a short connection resume identifier (short I-RNTI)), a value for deriving a security key (NCC), and a period value for calculating RAN paging.

A process of resetting a MAC layer so as to prevent unnecessary HARQ transmission of a plurality of items of data stored in a buffer of the MAC layer. A process of resetting the MAC layer may include discarding stored data (a MAC SDU or a MAC PDU), emptying and resetting a HARQ buffer, resetting a HARQ processor identifier or a related timer, or flushing a logical channel identifier.

Because the UE 1g-01 may receive an RRCResume message and transmit an RRCResumeComplete message through the SRB1 when re-connection is made to a network at a later time, a RLC re-establishment process may be performed on the SRB1 to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). Also, a RLC re-establishment process may be performed on other SRBs and DRBs to discard stored data (a RLC SDU, a RLC SDU segment, or a RLC PDU), when a RLC layer stores the data, so as to prevent unnecessary retransmission of the data and achieve efficiency in buffer management, and to reset RLC window state variables (transmission window variables or reception window variables). The RLC re-establishment process performed on the other SRBs and DRBs may be performed after the UE 1g-01 receives the RRCResume message when the UE 1g-01 attempts to reconnect with the network at a later time. However, to maximize efficiency in the buffer management, it is recommended to perform the RLC re-establishment process on the other SRBs and DRBs when the RRCResume message is received (the network may determine whether to perform the RLC re-establishment process on each of bearers, by using an indicator).

The UE 1g-01 may store current UE context. The UE context may include RRC configuration information, security configuration information, ROHC context of the PDCP layer, configuration information of the SDAP layer, cell identifier (C-RNTI), or the like.

When the aforementioned processes are completed, bearers (the SRB or the DRB) may be suspended, except for the SRB0 that is supposed to transmit a message at all times without a security process in a random access process.

The UE 1g-01 triggers a PDCP layer reset process or PDCP layer suspend process on PDCP layers of the DRBs. The PDCP layer reset process or the PDCP layer suspend process may be applied only to the AM DRB. However, because processes of resetting variables and discarding data may be equally performed in advance on the UM DRB (or the SRB), the PDCP layer reset process or the PDCP layer suspend process may also be applied to the UM DRB (or the SRB) in an extended manner.

The PDCP layer reset process or the PDCP layer suspend process may be implemented as below, and some or all of processes below may be performed.

To reset a COUNT value used for the security key and perform synchronization of variables with the gNB when reconnection is made with the network, a transmission window state variable (TX_NEXT) may be reset to an initial value.

To discard a plurality of items of old data for efficient buffer management, a plurality of items of data (a PDCP SDU or a PDCP PDU) stored in a PDCP layer of a transmitter may be discarded.

To fast transfer, to an upper layer, a plurality of items of data (a PDCP SDU or a PDCP PDU) while a PDCP reordering timer operates, when the PDCP reordering timer operates, the PDCP reordering timer may be stopped and reset, and a plurality of items of stored data may be transferred to the upper layer in an ascending order of COUNT values after decompressing header compression when the header compression was performed on the data.

To reset the COUNT value used for the security key and perform synchronization of variables with the gNB when reconnection is made with the network, reception window state variables (RX_NEXT and RX_DELIV) may be reset to initial values.

When the PDCP layer of the receiver receives a plurality of items of data through the RLC re-establishment process from a lower layer (the RLC layer), the PDCP layer may decipher the plurality of items of received data, may perform integrity verification on the data when required, may decompress header compression when required, may stop and reset the PDCP reordering timer, may order a plurality of items of data in an ascending order of COUNT values and transmit them to the upper layer (it is an operation that is efficient for a case of EN-DC (connected with a LTE base station and a NR base station) or a case in which the LTE base station uses an NR PDCP layer, i.e., when the NR PDCP layer is connected with a LTE RLC layer, and the LTE RLC layer is re-established).

When the processes are completed, disconnection of RRC connection is reported to an upper layer (the NAS layer), and the UE 1g-01 may transit to the RRC inactive mode.

The UE 1g-01 that transit to the RRC inactive mode may perform an RRC connection resume procedure with respect to the network due to a predefined cause. According to some embodiments of the disclosure, the predefined cause may correspond to a case in which the UE 1g-01 receives the paging message 1g-15 or UL data is generated in the UE 1g-01. To resume connection with the network, due to the predefined cause, the UE 1g-01 may perform some or all of operations below before, when, or after the UE 1g-01 transmits the RRC Resume Request message 1g-20 (Actions related to transmission of RRCResumeRequest message).

The UE 1g-01 inserts the stored connection resume identifier (the full connection resume identifier (full I-RNTI) or the short connection resume identifier (short I-RNTI)) into an RRCResumeRequest message, configures a cause of connection resume, derives a connection resume MAC-I by using a current configured security key, and inserts the connection resume MAC-I into the RRCResumeRequest.

The UE 1g-01 restores RRC configuration and security configuration from the stored UE context, derives a new security key by using an NCC value for deriving a security key, and applies the new security key to integrity protection and ciphering algorithm with respect to bearers (the other SRBs or DRB s) except for the SRB0.

The UE 1g-01 may restore PDCP configuration information (e.g., the ROHC context, etc.) of the PDCP layer, may transmit the RRCResumeRequest to the SRB0, may receive a response message thereto through the SRB1, and may perform a PDCP re-establishment process on the SRB1 so as to apply the derived new security key to perform integrity verification or a deciphering process.

It is configured that, when the security key is updated through the PDCP re-establishment process with respect to the SRB1, the SRB1 is to be resumed.

The UE 1g-01 may transmit the RRC Resume Request message 1g-20, and in response thereto, the gNB may transmit an RRC Resume message 1g-30 or an RRCRelease message including an rrc-suspend indicator to the UE 1g-01. In the disclosure, to enhance security when the gNB transmits the RRC message 1g-30, the gNB may perform a ciphering process on the RRC message 1g-30 by generating and updating the security key based on the NCC in the RRC message 1g-05 transmitted to the UE 1g-01, may perform an integrity protection process, and thus may transmit a message.

When the RRC Resume message 1g-30 is received from the gNB, the UE 1g-01 may perform some or all of processes below. (Reception of the RRCResume by the UE)

When the UE 1g-01 receives the RRCResume message 1g-30, the UE 1g-01 may restore a PDCP state of the SRB2 or all DRBs. The PDCP state may include context, security key information, or the like with respect to a header compression protocol (ROHC). Then, when the UE 1g-01 transmits an RRCResumeRequest message, the UE 1g-01 may perform a PDCP re-establishment process on the SRB2 or all DRBs so as to apply a key, which is newly derived the UE 1g-01, to ciphering and integrity protection algorithm.

Because the UE 1g-01 receives, as the RRCResume message 1g-30, a response indicating an access to the network is available, the UE 1g-01 discards the connection resume identifier or the stored UE context, except for RAN notification area information.

The SRB2 or all DRBs are resumed or restarted. The resume may mean that processing and transmission or reception of data is restarted, and the suspend may mean that processing and transmission or reception of data is suspended.

The UE 1g-01 may enter an RRC connected mode, and may indicate, to the upper layer, that suspended RRC connection is resumed.

The UE 1g-01 transmits the RRCResumeComplete message 1g-40 to the gNB and thus ends a connection resume process.

As described above, when the UE 1g-01 receives the RRC message 1g-30, the UE 1g-01 transits to the RRC connected mode, transmits the RRCResumeComplete message 1g-40 indicating completion of RRC connection establishment to the gNB, and resumes data transmission and reception to/from the gNB.

Figure 1H:
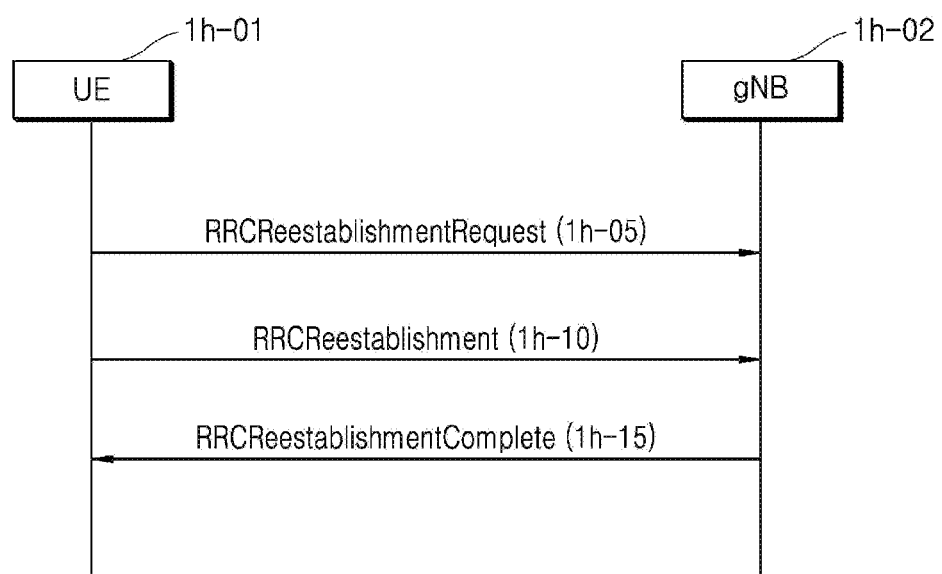
FIG. 1H illustrates a diagram of operations, performed by a protocol layer, of an RRC re-establishment process for processing occurrence of an event in which bearers are required to be suspended due to other predefined causes, according to some embodiments of the disclosure.

FIG. 1H illustrates a diagram of operations, performed by a protocol layer, of an RRC re-establishment process for processing occurrence of an event in which bearers are required to be suspended due to other predefined causes, according to some embodiments of the disclosure.

In the aforementioned first embodiment, second embodiment, or third embodiment, when the UE 1g-01 transits from an RRC connected mode to an RRC inactive mode, a process of suspending bearers is requested. However, there may be a case in which a process of suspending bearers is requested, except for when the UE 1g-01 transits from the RRC connected mode to the RRC inactive mode, such that operations of processing the case are provided below.

The process of suspending bearers of the UE 1g-01 is requested when one of events below occurs.

An event in which an RLF is triggered occurs. The RLF may be triggered when one of conditions below is satisfied.

An event in which a timer starts according to an out-of-sync indication indicating that Spcells are not sequentially synchronized, and the synchronization is not completed until the timer expires.

An event in which an indication indicating that a problem occurs in a random access process of a master cell group (MCG) MAC layer.

An event in which a retransmission number with respect to certain data reaches a maximum retransmission number in an MCG RLC layer.

An event in which an RLF occurs in MCG.

An event in which connection re-establishment is required because synchronization fails in MCG.

An event in which failure in integrity verification is indicated by an SRB.

An event in which RRC connection re-establishment is failed.

When one of the aforementioned events occurs, the UE 1g-01 suspends SRBs or DRBs, except for the SRB0. Then, the UE 1g-01 resets the MAC layer, releases current MCG cell information, releases dedicated configuration information that is configured through RRC not through system information, applies default MCG cell group configuration information, and performs a cell selection process. When a cell is selected, a fourth embodiment below is performed.

The fourth embodiment below of the disclosure is provided below.

The UE 1g-01 performs operations below when, before, or after an RRCReestablishmentRequest message is configured (1h-05).

The UE 1g-01 configures a cell identifier used in a PCell triggering an RRC re-establishment process, or a physical cell identifier, and calculates and configures MAC-I for integrity protection using a security key used in the PCell triggering the RRC re-establishment.

The UE 1g-01 configures a cause of RRC re-establishment as failure in reconfiguration.

The UE 1g-01 recovers RRC configuration and security context from stored UE context, recovers a PDCP state with respect to the SRB1, and performs a PDCP re-establishment process.

The UE 1g-01 performs an RLC re-establishment process on the SRB1.

The UE 1g-01 resumes the SRB1.

The UE 1g-01 transmits an RRCReestablishmentRequest message.

The UE 1g-01 transmits the RRCReestablishmentRequest message, and when the UE 1g-01 receives an RRCReestablishment message in response thereto, the UE 1g-01 performs operations below (1h-10).

The UE 1g-01 stores a security key value (nextHopChainingCount (NCC)) from the received RRCReestablishment message.

The UE 1g-01 derives new security keys (K_gNB, K_RRCenc, K_RRCint, K_UPint, K_UPenc, or the like) based on the stored NCC.

The UE 1g-01 performs integrity verification on the RRCReestablishment message by using a previous security key.

When the integrity verification is failed, the UE 1g-01 returns to an RRC idle state.

When the integrity verification is successful, the UE 1g-01 transfers the newly-derived security keys to a lower layer, and makes them applied to integrity protection and ciphering.

The UE 1g-01 completes an RRC re-establishment process by transmitting an RRCRestablishmentComplete message.

Figure 1I:
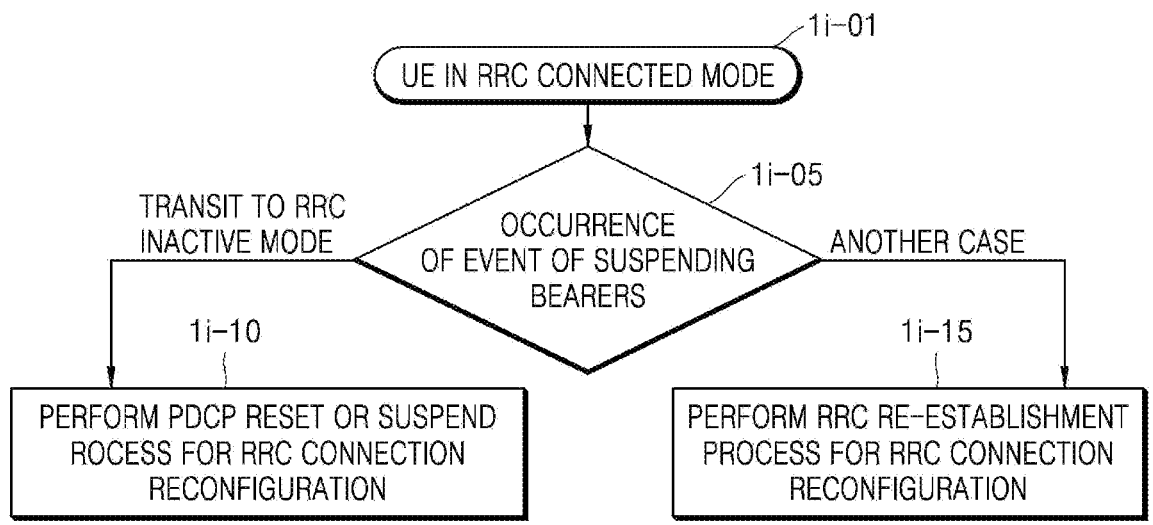
FIG. 1I illustrates a diagram of UE operations proposed when a bearer suspending event occurs, according to some embodiments of the disclosure.

FIG. 1I illustrates a diagram of UE operations proposed when a bearer suspending event occurs in the disclosure.

Referring to FIG. 1I, an event in which bearers are requested to be suspended may occur in a UE in an RRC connected mode (1i-01). In detail, an event in which the bearers except for a SRB0 are requested to be suspended may occur. As described above, when the UE receives an RRCRelease message and thus has to transit to an RRC inactive mode, or when an RLF is triggered, the aforementioned various event may occur.

When the event of suspending the bearers occurs in the UE in the RRC connected mode (1i-05), the UE first checks a cause of occurrence of the event of suspending the bearers. When the cause of occurrence of the event of suspending the bearers is due to transition to an RRC inactive mode or reception of suspend-config through the RRCRelease message, the UE performs the PDCP layer reset process or the PDCP layer suspend process proposed in the first embodiment, the second embodiment, or the third embodiment. Alternatively, the UE performs an operation in response to reception of suspend-config through the RRCRelease message (1i-10).

However, when the cause of occurrence of the event of suspending the bearers is due to triggering of the RLF or other events, not due to transition to the RRC inactive mode, the UE performs the aforementioned fourth embodiment that is the RRC re-establishment process (1i-15).

Figure 1J:
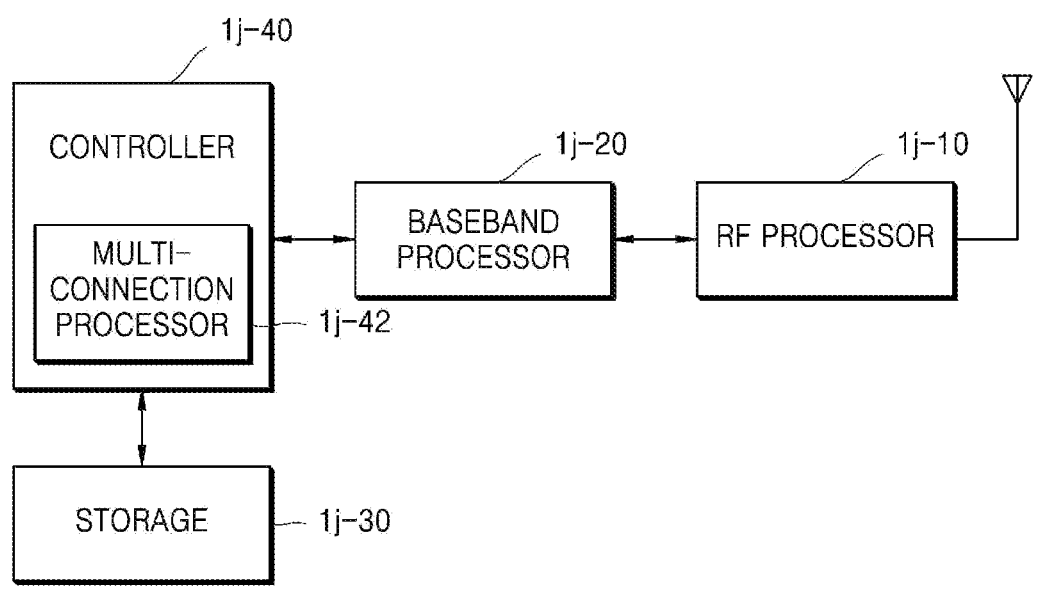
FIG. 1J illustrates a structure of a UE, according to some embodiments of the disclosure.

FIG. 1J illustrates a configuration of a UE, according to some embodiments of the disclosure.

Referring to FIG. 1J, the UE includes a radio frequency (RF) processor 1j-10, a baseband processor 1j-20, a storage 1j-30, and a controller 1j-40. However, the UE is not limited thereto and may include more or less elements compared to the elements illustrated in FIG. 1J.

The RF processor 1j-10 may perform functions for transmitting and receiving signals through wireless channels, e.g., band conversion and amplification of the signals. That is, the RF processor 1j-10 may up-convert a baseband signal provided from the baseband processor 1j-20, into an RF band signal and then may transmit the RF band signal through an antenna, and may down-convert an RF band signal received through the antenna, into a baseband signal. For example, the RF processor 1j-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1J, the UE may include a plurality of antennas. The RF processor 1j-10 may include a plurality of RF chains. The RF processor 1j-10 may perform beamforming. For beamforming, the RF processor 1j-10 may adjust phases and intensities of signals to be transmitted or received through a plurality of antennas or antenna elements. The RF processor 1j-10 may perform a MIMO operation and may receive data of a plurality of layers in the MIMO operation. The RF processor 1j-10 may perform received beam sweeping by appropriately configuring a plurality of antennas or antenna elements, or may adjust a direction and a beam width of a received beam to coordinate with a transmit beam, by the control of the controller 1j-40.

The baseband processor 1j-20 may convert between a baseband signal and a bitstream based on physical layer specifications of a system. For example, for data transmission, the baseband processor 1j-20 generates complex symbols by encoding and modulating a transmit bitstream. For data reception, the baseband processor 1j-20 may reconstruct a received bitstream by demodulating and decoding a baseband signal provided from the RF processor 1j-10. For example, according to an OFDM scheme, for data transmission, the baseband processor 1j-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1j-20 may segment a baseband signal provided from the RF processor 1j-10, into OFDM symbol units, may reconstruct signals mapped to subcarriers by performing fast Fourier transformation (FFT), and then may reconstruct a received bitstream by demodulating and decoding the signals.

The baseband processor 1j-20 and the RF processor 1j-10 transmit and receive signals as described above. The baseband processor 1j-20 and the RF processor 1j-10 may also be called a transmitter, a receiver, a transceiver, or a communicator. At least one of the baseband processor 1j-20 or the RF processor 1j-10 may include a plurality of communication modules to support a plurality of different radio access technologies. At least one of the baseband processor 1j-20 or the RF processor 1j-10 may include different communication modules to process signals of different frequency bands. For example, the different radio access technologies may include an LTE network, an NR network, or the like. The different frequency bands may include a super-high frequency (SHF) (e.g., 2.2 GHz, 2 GHz) band and a millimeter wave (mmWave) (e.g., 60 GHz) band. The UE may transmit and receive signals to and from a base station by using the baseband processor 1j-20 and the RF processor 1j-10, and the signals may include control information and data.

The storage 1j-30 stores basic programs, application programs, and data, e.g., configuration information, for operations of the UE. The storage 1j-30 may provide the stored data upon request by the controller 1j-40. The storage 1j-30 may include any or a combination of storage media such as read-only memory (ROM), random access memory (RAM), a hard disk, a compact disc (CD)-ROM, and a digital versatile disc (DVD). The storage 1j-30 may include a plurality of memories.

The controller 1j-40 controls overall operations of the UE. For example, the controller 1j-40 transmits and receives signals through the baseband processor 1j-20 and the RF processor 1j-10. The controller 1j-40 records and reads data on or from the storage 1j-30. In this regard, the controller 1j-40 may include at least one processor. For example, the controller 1j-40 may include a communication processor (CP) for controlling communications and an application processor (AP) for controlling an upper layer such as an application program. At least one element in the UE may be implemented as a chip.

Figure 1K:
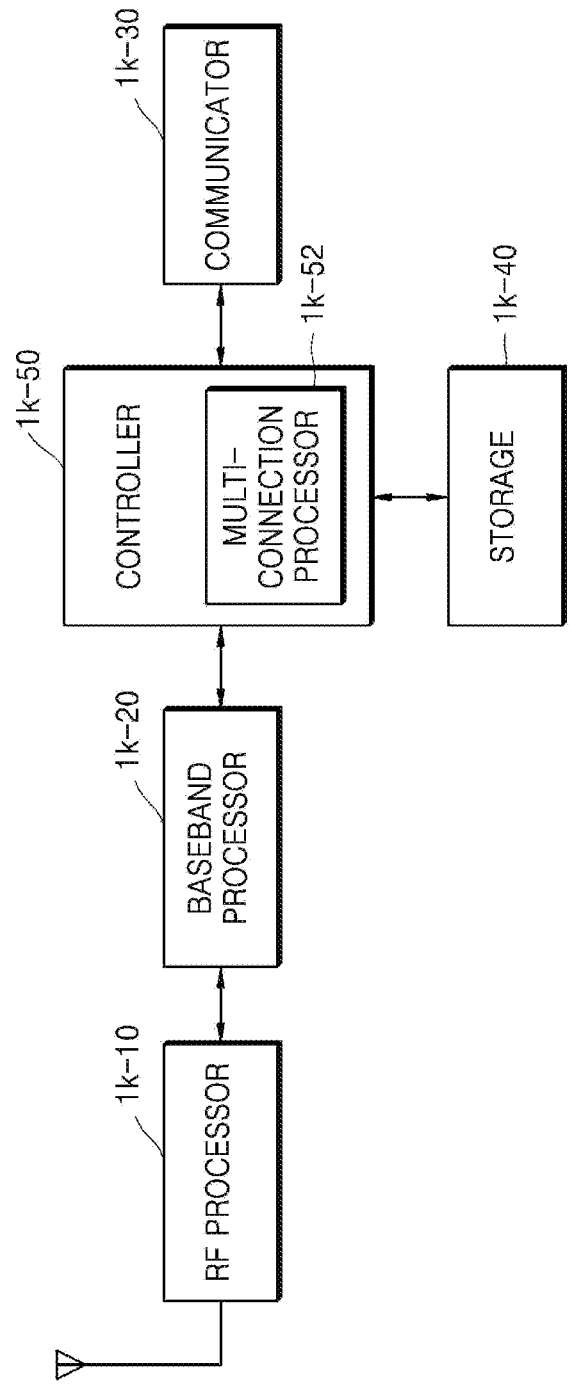
FIG. 1K illustrates a block diagram of a transmission/reception point (TRP) in a wireless communication system, according to some embodiments of the disclosure.

FIG. 1K illustrates a block diagram of a transmission/reception point (TRP) in a wireless communication system, according to some embodiments of the disclosure.

Referring to FIG. 1K, the TRP may include an RF processor 1k-10, a baseband processor 1k-20, a communicator 1k-30, a storage 1k-40, and a controller 1k-50. However, the TRP is not limited thereto and may include more or less elements compared to the elements illustrated in FIG. 1K.

The RF processor 1k-10 may perform functions for transmitting and receiving signals through wireless channels, e.g., band conversion and amplification of the signals. The RF processor 1k-10 may up-convert a baseband signal provided from the baseband processor 1k-20, into an RF band signal and then may transmit the RF band signal through an antenna, and may down-convert an RF band signal received through an antenna, into a baseband signal. For example, the RF processor 1k-10 may include a transmit filter, a receive filter, an amplifier, a mixer, an oscillator, a DAC, an ADC, or the like. Although only one antenna is illustrated in FIG. 1K, the RF processor 1k-10 may include a plurality of antennas. The RF processor 1k-10 may include a plurality of RF chains. In addition, the RF processor 1k-10 may perform beamforming. For beamforming, the RF processor 1k-10 may adjust phases and intensities of signals to be transmitted or received through a plurality of antennas or antenna elements. The RF processor 1k-10 may perform a DL MIMO operation by transmitting data of one or more layers The baseband processor 1k-20 may convert between a baseband signal and a bitstream based on physical layer specifications of a first radio access technology. For example, for data transmission, the baseband processor 1k-20 may generate complex symbols by encoding and modulating a transmit bitstream. For data reception, the baseband processor 1k-20 may reconstruct a received bitstream by demodulating and decoding a baseband signal provided from the RF processor 1k-10. For example, according to an OFDM scheme, for data transmission, the baseband processor 1k-20 may generate complex symbols by encoding and modulating a transmit bitstream, may map the complex symbols to subcarriers, and then may configure OFDM symbols by performing IFFT and CP insertion. For data reception, the baseband processor 1k-20 may segment a baseband signal provided from the RF processor 1k-10, into OFDM symbol units, may reconstruct signals mapped to subcarriers by performing FFT, and then may reconstruct a received bitstream by demodulating and decoding the signals. The baseband processor 1k-20 and the RF processor 1k-10 may transmit and receive signals as described above. As such, the baseband processor 1k-20 and the RF processor 1k-10 may also be called a transmitter, a receiver, a transceiver, a communicator, or a wireless communicator. The TRP may transmit and receive signals to and from the UE by using the baseband processor 1k-20 and the RF processor 1k-10, and the signals may include control information and data.

The communicator 1k-30 provides an interface for communicating with other nodes in a network. According to some embodiments of the disclosure, the communicator 1k-30 may be a backhaul communicator.

The storage 1k-40 stores basic programs, application programs, and data, e.g., configuration information, for operations of the TRP. In particular, the storage 1k-40 may store, for example, information about bearers assigned for a connected UE and measurement results reported from the connected UE. The storage 1k-40 may store criteria information used to determine whether to provide or release dual connectivity to or from the UE. The storage 1k-40 provides the stored data upon request by the controller 1k-50. The storage 1k-40 may include any or a combination of storage media such as ROM, RAM, a hard disk, a CD-ROM, and a DVD. The storage 1k-40 may include a plurality of memories. The controller 1k-50 controls overall operations of the TRP. For example, the controller 1k-50 transmits and receives signals through the baseband processor 1k-20 and the RF processor 1k-10, or the communicator 1k-30. The controller 1k-50 records and reads data on or from the storage 1k-40. To this end, the controller 1k-50 may include at least one processor. At least one element of the TRP may be implemented as a chip.

The disclosure provides a method of operating bearers of radio nodes and processing data in the NR or 5G communication system supporting wireless backhauls, and a method of recovering data loss that may occur due to disconnection or congestion of wireless links in the radio nodes.

In detail, the disclosure provides a method and process, and various embodiments thereof, the method and process being for retransmitting lost data, based on PDCP status reports from PDCP layers of two end radio nodes of a wireless backhaul network.

In the NR or 5G communication system, gNBs with various configurations are available, and various wireless connection technologies may coexist. In particular, in a network supporting wireless backhauls or an integrated access backhaul (IAB), there is a need for a method of recovering a plurality of items of data lost due to disconnection or congestion of a wireless link in each radio node (an IAB node or an IAB donor).

According to some embodiments of the disclosure, a lossless data transfer may be supported by providing a method of recovering a plurality of items of data lost due to disconnection or congestion of a wireless link in each radio node (an IAB node or an IAB donor) in a network supporting wireless backhauls or IABs in the NR or 5G communication system. Hereinafter, various embodiments of the disclosure will now be described in detail, and further technical contents are proposed.

Figure 2A:
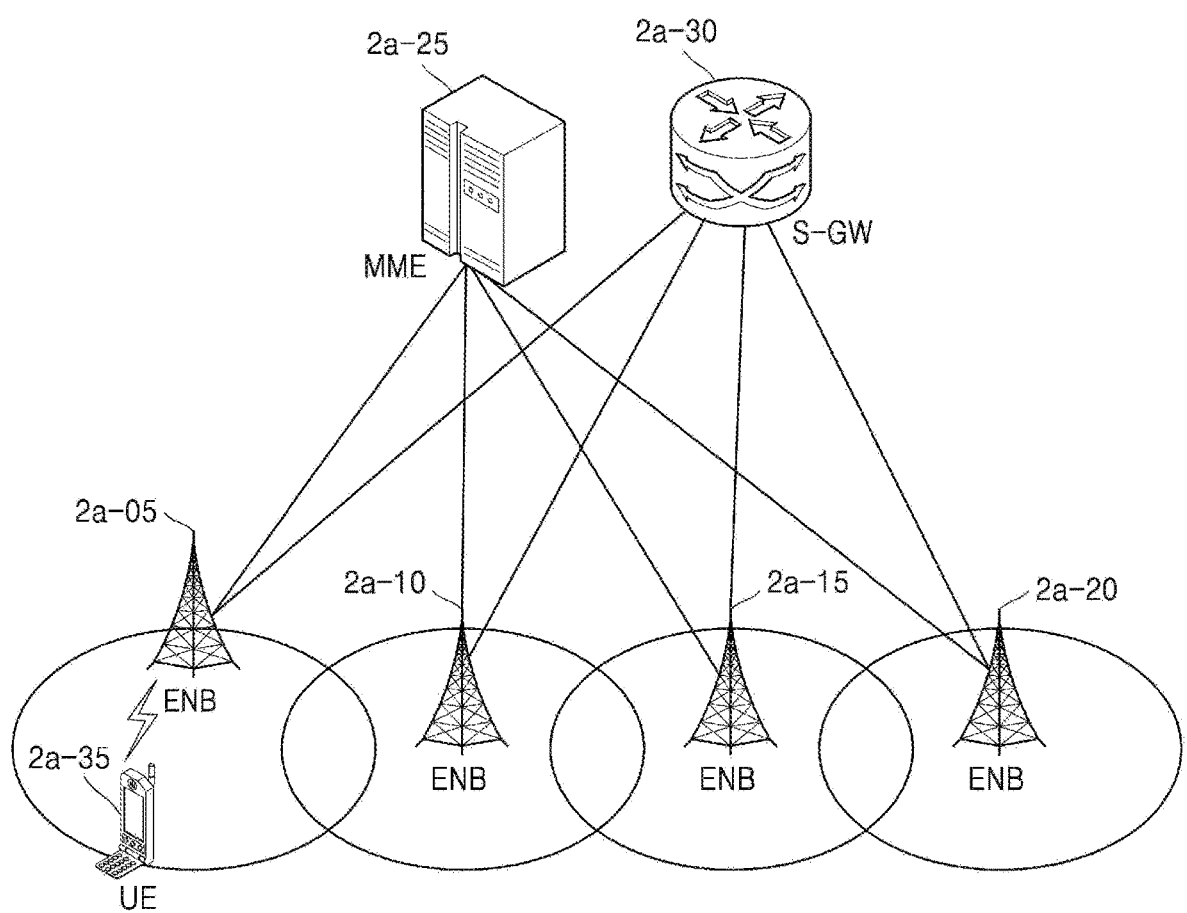
FIG. 2A illustrates a diagram of a configuration of an LTE system, according to some embodiments of the disclosure.

FIG. 2A illustrates a diagram of a configuration of an LTE system to which the disclosure is applicable, according to some embodiments of the disclosure.

Referring to FIG. 2A, a RAN of the LTE system includes a plurality of eNBs (or nodes B or base stations) 2a-05, 2a-10, 2a-15, and 2a-20, an MME 2a-25, and a S-GW 2a-30. A UE (or a terminal) 2a-35 may access an external network via the eNB 2a-05, 2a-10, 2a-15, or 2a-20 and the S-GW 2a-30.

In FIG. 2A, the eNB 2a-05, 2a-10, 2a-15, or 2a-20 may correspond to an existing node B of a UMTS. The eNB 2a-05, 2a-10, 2a-15, or 2a-20 may be connected to the UE 2a-35 through wireless channels and may perform complex functions compared to the existing node B. All user traffic data including real-time services such as VoIP may be serviced through shared channels in the LTE system, and thus an entity for collating status information, e.g., buffer status information, available transmission power status information, and channel state information, of UEs and performing scheduling may be required and the eNB 2a-05, 2a-10, 2a-15, or 2a-20 may operate as such an entity. One eNB generally controls a plurality of cells. For example, the LTE system may use radio access technology such as OFDM at a bandwidth of 20 MHz to achieve a data rate of 100 Mbps. The eNB may also use AMC to determine a modulation scheme and a channel coding rate in accordance with a channel state of the UE 2a-35. The S-GW 2a-30 is an entity for providing data bearers and may establish and release the data bearers by the control of the MME 2a-25. The MME 2a-25 is an entity for performing a mobility management function and various control functions on the UE 2a-35 and is connected to the plurality of eNBs 2a-05, 2a-10, 2a-15, and 2a-20.

Figure 2B:
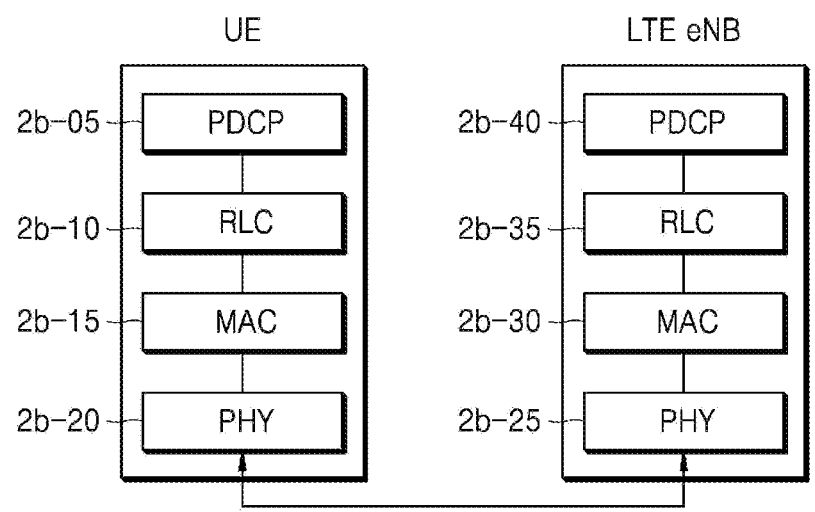
FIG. 2B illustrates a diagram of a radio protocol architecture of an LTE system, according to some embodiments of the disclosure.

FIG. 2B illustrates a diagram of a radio protocol architecture of an LTE system, according to some embodiments of the disclosure.

Referring to FIG. 2B, the radio protocol architecture of the LTE system may include PDCP layers 2b-05 and 2b-40, RLC layers 2b-10 and 2b-35, and MAC layers 2b-15 and 2b-30 respectively for a UE and an eNB. The PDCP layer 2b-05 or 2b-40 may perform, for example, IP header compression/decompression. Main functions of the PDCP layer 2b-05 or 2b-40 are summarized as shown below. However, the functions thereof are not limited thereto.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 2b-10 or 2b-35 may perform an ARQ operation by reconfiguring PDCP PDUs to appropriate sizes. Main functions of the RLC layer 2b-10 or 2b-35 may be summarized as shown below. However, the functions thereof are not limited thereto.

Transfer of upper layer PDUs
Error correction through ARQ (only for AM data transfer)
Concatenation, segmentation and reassembly of RLC SDUs (only for UM and AM data transfer)

Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 2b-15 or 2b-30 may be connected to a plurality of RLC layers configured for one UE and may multiplex RLC PDUs into a MAC PDU and may demultiplex the RLC PDUs from the MAC PDU. Main functions of the MAC layer 2b-15 or 2b-30 may be summarized as shown below. However, the functions thereof are not limited thereto.

Mapping between logical channels and transport channels
Multiplexing/demultiplexing of MAC SDUs belonging to one or different logical channels into/from TBs delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A PHY layer 2b-20 or 2b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 2C:
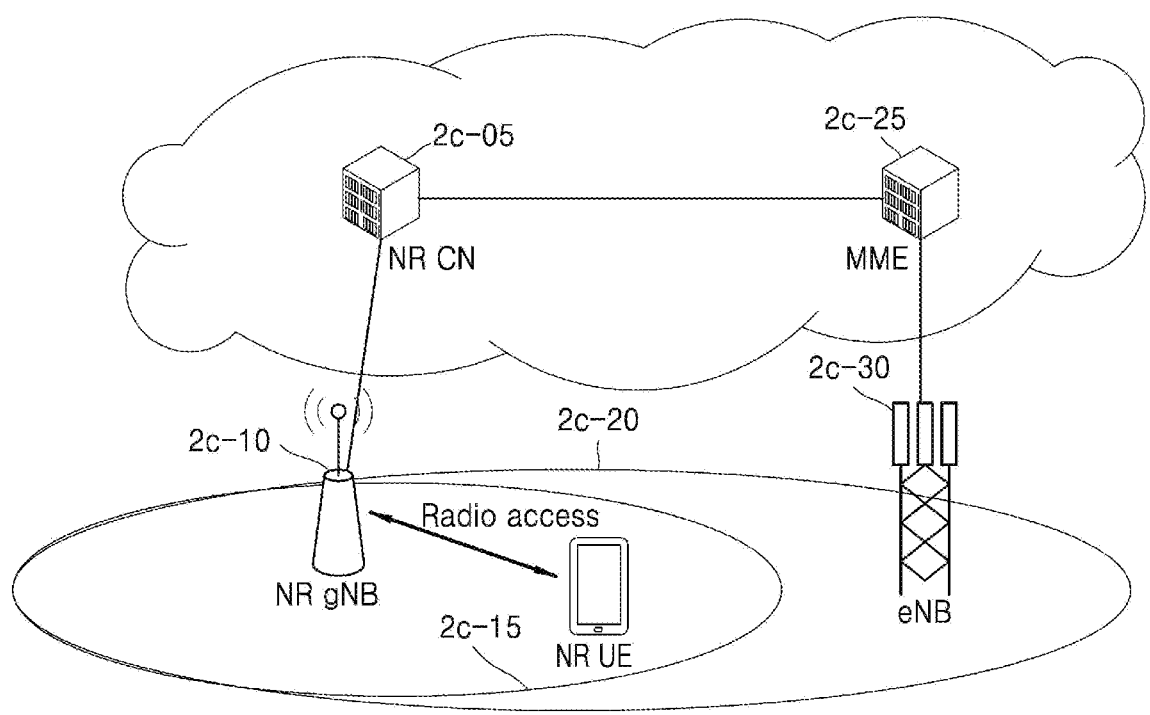
FIG. 2C illustrates a diagram of a next-generation mobile communication system, according to some embodiments of the disclosure.

FIG. 2C illustrates a diagram of a next-generation mobile communication system, according to some embodiments of the disclosure.

Referring to FIG. 2C, as illustrated, a radio access network of the next-generation mobile communication system (hereinafter, referred to as the NR or 5G system) includes a NR node B (NR gNB, NR NB, or gNB) 2c-10 and a NR CN 2c-05. A NR UE (or terminal) 2c-15 may access an external network via the NR gNB 2c-10 and the NR CN 2c-05.

In FIG. 2C, the NR gNB 2c-10 may correspond to an existing eNB of an LTE system. The NR gNB 2c-10 may be connected to the NR UE 2c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 2c-10 may operate as such an entity. One NR gNB generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology.

According to some embodiments of the disclosure, the NR gNB 2c-10 may use AMC to determine a modulation scheme and a channel coding rate in accordance with a channel state of the NR UE 2c-15. The NR CN 2c-05 may perform functions such as mobility support, bearer configuration, and QoS configuration. The NR CN 2c-05 is an entity for performing a mobility management function and various control functions on the NR UE 2c-15 and is connected to a plurality of base stations. The NR or 5G mobile communication system may cooperate with the existing LTE system, and the NR CN 2c-05 may be connected to an MME 2c-25 through a network interface. The MME 2c-25 may be connected to an existing eNB 2c-30.

Figure 2D:
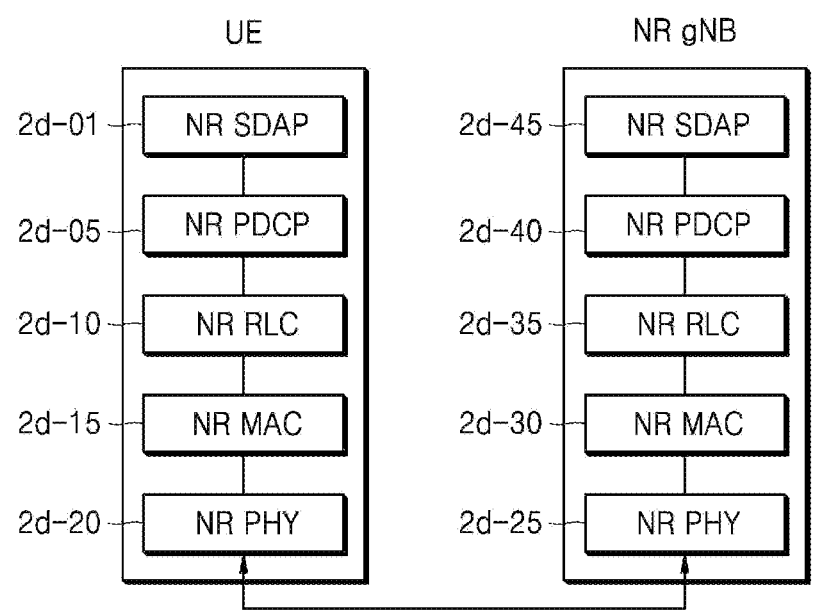
FIG. 2D illustrates a diagram of a radio protocol architecture of an NR or 5G mobile communication system, according to some embodiments of the disclosure.

FIG. 2D illustrates a diagram of a radio protocol architecture of the NR or 5G mobile communication system to which the disclosure is applicable, according to some embodiments of the disclosure.

Referring to FIG. 2D, the radio protocol architecture of the NR or 5G mobile communication system may include NR SDAP layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

According to some embodiments of the disclosure, main functions of the NR SDAP entity 2d-01 or 2d-45 may include some of the following functions. However, the functions thereof are not limited thereto.

Transfer of user plane data
Mapping between a QoS flow and a DRB for both DL and UL
Marking QoS flow ID in both DL and UL packets
Reflective QoS flow to DRB mapping for the UL SDAP PDUs With regard to a SDAP layer, information about whether to use a header of the SDAP layer or to use functions of the SDAP layer may be configured for the UE by using an RRC message per PDCP layer, per bearer, or per logical channel. When the SDAP header of the SDAP layer is configured, the UE may direct to update or reconfigure UL and DL QoS flow and data bearer mapping information by using a 1-bit NAS reflective QoS indicator and a 1-bit AS reflective QoS indicator of the SDAP header. According to some embodiments of the disclosure, the SDAP header may include QoS flow ID information indicating QoS. According to some embodiments of the disclosure, QoS information may be used as data processing priority information or scheduling information for appropriately supporting a service.

According to some embodiments of the disclosure, main functions of the NR PDCP layer 2d-05 or 2d-40 may include some of the following functions. However, the functions thereof are not limited thereto.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink According to some embodiments of the disclosure, the reordering function of the NR PDCP layer 2d-05 or 2d-40 may include at least one of a function of reordering PDCP PDUs received from a lower layer, on a PDCP SN basis, a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

According to some embodiments of the disclosure, main functions of the NR RLC layer 2d-10 or 2d-35 may include some of the following functions. However, the functions thereof are not limited thereto.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to some embodiments of the disclosure, the in-sequence delivery function of the NR RLC layer 2d-10 or 2d-35 may include at least one of a function of delivering RLC SDUs received from a lower layer, to an upper layer in order, a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires The NR RLC layer 2d-10 or 2d-35 may process the RLC PDUs in order of reception and deliver the RLC PDUs to the NR PDCP layer 2d-05 or 2d-40 regardless of SNs (out-of-sequence delivery), and when a segment is received, the NR RLC layer 2d-10 or 2d-35 may reassemble the segment with other segments stored in a buffer or subsequently received, into a whole RLC PDU and may deliver the RLC PDU to the NR PDCP layer 2d-05 or 2d-40. According to some embodiments of the disclosure, the NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

The out-of-sequence delivery function of the NR RLC layer 2d-10 or 2d-35 may include at least one of a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

According to some embodiments of the disclosure, the NR MAC layer 2d-15 or 2d-30 may be connected to a plurality of NR RLC layers configured for one UE, and main functions of the NR MAC layer 2d-15 or 2d-30 may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 2d-20 or 2d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer. However, the functions thereof are not limited thereto. An ADAP layer of a radio node proposed in the disclosure may be referred to using different names such as a multi-hop adaptation protocol (MAP) layer or a backhaul adaptation protocol (BAP) layer, and the like, but only the names are different, and functions of the layers may operate in a same manner.

Figure 2E:
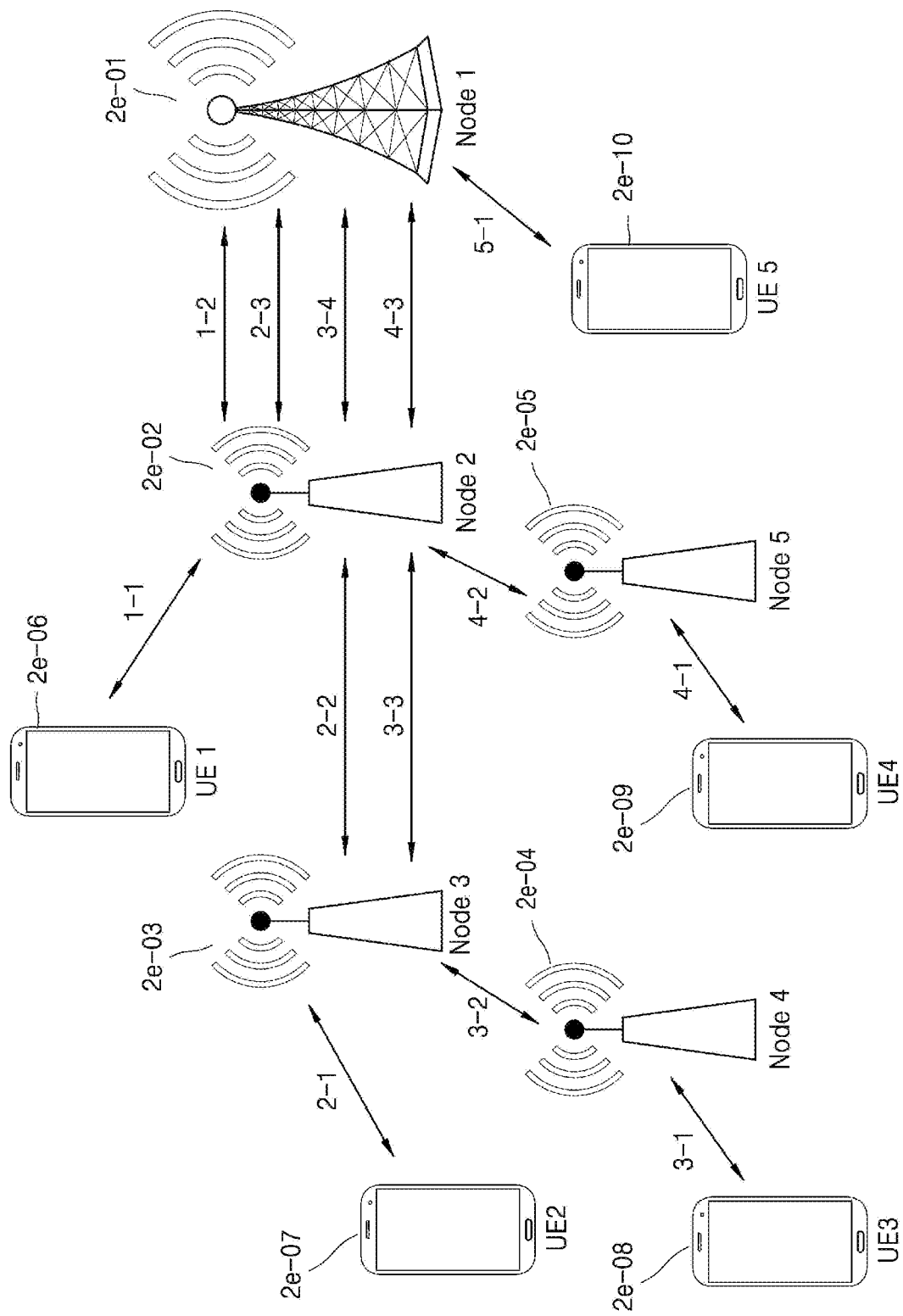
FIG. 2E illustrates a diagram of a network structure supporting wireless backhauls, the network structure being considered in the NR or 5G communication system, according to some embodiments of the disclosure.

FIG. 2E illustrates a diagram of a network structure supporting wireless backhauls, the network structure being considered in the NR or 5G communication system, according to some embodiments of the disclosure.

As illustrated in FIG. 2E, a wireless backhaul network (also referred to as an IAB network) may consist of a plurality of radio nodes (e.g., IAB nodes or IAB donors), and a UE in the IAB network may establish RRC connection by accessing a random radio node, and may transmit and receive data. Each radio node, as a child IAB node, may consider another radio node as a parent IAB node, may establish RRC connection with the parent IAB node, and may transmit and receive data. That is, the child IAB node may indicate the UE or an IAB node, may receive, from the parent IAB node or the IAB donor, wireless connection access configuration, RRC configuration information, bearer configuration information, and configuration information of a PDCP layer, a RLC layer, a MAC layer, or a PHY layer, and may indicate a radio node to which the information is applied.

The parent IAB node may indicate an IAB node or the IAB donor, and may indicate a radio node for configuring the wireless connection access configuration, the RRC configuration information, the bearer configuration information, and the configuration information of a PDCP layer, a RLC layer, a MAC layer, or a PHY layer to the child IAB node.

In FIG. 2E, the IAB donor may indicate a radio node (e.g., a Node1 2e-01) that is connected to a core network so as to transfer data to an upper layer, and an IAB node may indicate each of radio nodes (e.g., a Node 2 2e-02, a Node 3 2e-03, a Node 4 2e-04, and a Node 5 2e-05) that each perform as an entity for relaying data so as to support data transmission and reception between the UE and an end of the IAB donor. Also, UEs 2e-06, 2e-07, 2e-08, and 2e-09 may establish RRC connection by accessing radio nodes (e.g. the IAB nodes or the IAB donor), and may transmit and receive data.

For example, the UE 2 2e-07 may establish RRC connection by accessing the Node 3 2e-03 and may transmit and receive data. The Node 3 2e-03 may receive data from the UE 2 2e-07 and may transmit the data to the Node 2 2e-02 that is a parent IAB node, or may receive, from the Node 2 2e-02, data to be transmitted to the UE 2 2e-07, and may transmit the data to the UE 2 2e-07. Alternatively, the Node 2 2e-02 may receive data from the Node 3 2e-03 and may transmit the data to the Node1 2e-01 that is a parent IAB node (the IAB donor), or may receive, from the Node1 2e-01, data to be transmitted to the Node 3 2e-03, and may transmit the data to the Node 3 2e-03. As another example, the UE 1 2e-06 may establish RRC connection by connecting to the Node 2 2e-02, and may transmit and receive data. The Node 2 2e-02 may receive data from the UE 1 2e-06 and may transmit the data to the Node 1 2e-01 that is a parent IAB node, or may receive, from the Node 1 2e-01, data to be transmitted to the UE 1 2e-06, and may transmit the data to the UE 1 2e-06).

As described above, a UE may establish RRC connection by accessing a radio node having strongest signal intensity and may transmit and receive data, and the IAB network according to the disclosure may support multi-hop data transmission through intermediate radio nodes so as to allow the UE to transmit data to a radio node connected to a core network and to receive data from the radio node connected to the core network.

FIG. 2F illustrates a procedure in which RRC connection configuration is performed when a UE establishes connection with a radio node (an IAB node or an IAB donor) or a child IAB node establishes connection with a parent IAB node (an IAB node or the IAB donor, in the IAB network in the NR or 5G communication system, according to some embodiments of the disclosure.

Referring to FIG. 2F, when the UE or the child IAB node which transmits and receives data in an RRC connected mode does not transmit nor receive data due to a predefined cause or for a predefined time, the parent IAB node may transmit an RRCConnectionRelease message to the UE or the child IAB node so as to control the UE or the child IAB node to transit to an RRC idle mode or anRRC inactive mode (2f-01). Afterward, when the UE or the child IAB node which is not currently configured for connection (hereinafter, also referred to as the idle-mode UE) has data to be transmitted, the UE or the child IAB node may perform an RRC connection establishment process on the parent IAB node, and in a case of the RRC inactive mode, the UE or the child IAB node may perform an RRC connection resume process on the parent IAB node.

The UE or the child IAB node establishes inverse direction transmission synchronization with the parent IAB node via a random access process, and transmits an RRC Connection Request message (or an RRC Resume Request) to the parent IAB node (2f-05). The RRC Connection Request message (or the RRC Resume Request) may include an identifier of the UE or the child IAB node, and an establishment cause, or the like.

The parent IAB node transmits an RRCConnectionSetup message (or an RRCResume message) to allow the UE or the child IAB node to establish RRC connection (2f-10). The RRCConnectionSetup message (or the RRCResume message) may include at least one of configuration information of each logical channel, configuration information of each bearer, configuration information of an RLC layer, or configuration information of a MAC layer.

The RRCConnectionSetup message (or the RRCResume message) may include an indicator indicating whether to retransmit pre-configured RRC messages to a target parent IAB node or a target cell, when the UE or the child IAB node performs handover.

For example, the parent IAB node may indicate the UE or the child IAB node to retransmit RRC messages transmitted few seconds ago, before the UE or the child IAB node receives a handover indication message, performs handover, or receives an RRC message. The indicator indicating retransmission may indicate retransmission with respect to each of the pre-configured RRC messages. That is, a plurality of indicators may indicate whether to retransmit respective RRC messages. Alternatively, indication of retransmission may be performed in the form of a bitmap indicating each RRC message.

The RRCConnectionSetup message (or the RRCResume message) may include PDCP configuration information including an indicator indicating to perform a PDCP data recovery process. Also, the RRCConnectionSetup message may include bearer configuration information including an indicator indicating whether to perform a PDCP data recovery process on an SRB or a DRB. Also, the RRCConnectionSetup message may include bearer configuration information including an indicator indicating, with respect to the SRB or the DRB, whether to discard residual data in the PDCP layer.

The RRCConnectionSetup message (or the RRCResume message) may include bearer configuration information including an indicator indicating whether to perform accumulated retransmission or selective retransmission on an AM DRB when a PDCP re-establishment process is performed.

The RRCConnectionSetup message (or the RRCResume message) may include an indicator indicating which ARQ function is to be used in the child IAB node, and may indicate, by using an indicator indicating which ARQ function is to be used, whether the parent IAB node is to use a hop-by-hop ARQ function or an end-to-end ARQ function. When the end-to-end ARQ function is configured, whether the parent IAB node is to perform a function of segmenting or changelessly transferring received RLC layer data or whether the child IAB node, as an end, is to perform an ARQ function may be indicated.

As a default function, which ARC function is to be used by the parent IAB node may be indicated. In addition, when the RRCConnectionSetup message does not configure an ARQ function, it may be predefined that the hop-by-hop ARQ function or the end-to-end ARQ function is to be used as the default function. Also, the RRCConnectionSetup message may include information indicating whether the child IAB node is to use a data segmentation function, and may indicate whether respective functions of RLC layers are to be activated (or to be used), the functions being described with reference to FIG. 1D or 2B.

The RRCConnectionSetup message (or the RRCResume message) may include an indicator indicating whether an adaptation layer is to use a data concatenation function. Also, the RRCConnectionSetup message (or the RRCResume message) may include an indicator indicating whether a header of the adaptation layer is to be configured, and may indicate a type of the header.

For example, the RRCConnectionSetup message (or the RRCResume message) may include information configuring which information from among a UE identifier, a UE bearer identifier, a QoS identifier, a radio node identifier, a radio node address, and QoS information is to be included in the header. Obviously, omission of the header may be configured to decrease overhead.

The RRCConnectionSetup message (or the RRCResume message) may include information configuring an RLC channel to be used between an adaptation (ADAP) layer of a transmitter and an ADAP layer of a receiver, between the child IAB node and the parent IAB node, or between the UE and an IAB node. In detail, the RRCConnectionSetup message (or the RRCResume message) may include an available number of RLC channels, identifiers of available RLC channels, or mapping information (e.g., a UE identifier, a UE bearer identifier, QoS information, or QoS identifier mapping information) about a plurality of items of data mapped to the RLC channels. An RLC channel may be defined as a channel for delivering data according to QoS by grouping, based on QoS information, a plurality of items of data of several UEs, or may be defined as a channel for delivering data by grouping data of each UE.

The RRCConnectionSetup message (or the RRCResume message) may include information that defines an indicator indicating whether configuration information (pdcp-config) of a PDCP layer is to perform PDCP status report-based retransmission, and configures and indicates to perform the PDCP status report-based retransmission.

For example, when a value of the indicator indicating whether to perform the PDCP status report-based retransmission is configured as 0, the PDCP layer that received a PDCP status report may check data corresponding to NACK information of the PDCP status report and may discard only data corresponding to ACK information. However, when the value of the indicator indicating whether to perform the PDCP status report-based retransmission is configured as 1, the PDCP layer that received the PDCP status report may discard data corresponding to ACK information of the PDCP status report and may retransmit data corresponding to NACK information.

Alternatively, the RRCConnectionSetup message (or the RRCResume message) may indicate whether the ADAP layer is to define an ADAP status report and to perform ADAP status report-based retransmission. An ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

To indicate to perform the PDCP status report-based retransmission, the RRCConnectionSetup message (or the RRCResume message) may trigger a PDCP data recovery processing procedure by configuring, in the configuration information (pdcp-config) of the PDCP layer, a PDCP data recovery indicator (recoverPDCP), and may transmit the PDCP status report. When retransmission is performed during the PDCP data recovery process, the PDCP layer may perform selective retransmission based on the PDCP status report, not based on whether transmission is successful from a lower layer (e.g., an RLC layer). That is, the PDCP layer may retransmit only data indicated, in the PDCP status report, as NACK data for which successful transmission is not acknowledged.

Alternatively, the RRCConnectionSetup message (or the RRCResume message) may indicate whether the ADAP layer is to define the ADAP status report and an ADAP data recovery processing procedure and to perform the ADAP status report-based retransmission. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The RRCConnectionSetup message may include an indicator and information for configuring a period or a timer value, the indicator indicating periodic transmission of the PDCP status report so as to allow the configuration information (pdcp-config) of the PDCP layer to periodically transmit the PDCP status report. When the PDCP layer receives the period or the timer value, the PDCP layer may transmit the PDCP status report by triggering the PDCP status report according to the period or whenever the timer value is expired.

Alternatively, the RRCConnectionSetup message may indicate that the ADAP layer is to define the ADAP status report and to periodically perform the ADAP status report. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The RRCConnectionSetup message may include an indicator and information for configuring a timer value, the indicator indicating transmission of the PDCP status report so as to allow the configuration information (pdcp-config) of the PDCP layer to trigger and transmit the PDCP status report. When the PDCP layer receives configuration of the UE, the PDCP layer may trigger a timer having a timer value whenever a gap of a PDCP SN occurs, and when, until the timer expires, the gap of the PDCP SN is not filled nor data corresponding to the PDCP SN assumed to be lost is not received, the PDCP layer may trigger, configure, and transmit the PDCP status report when the timer expires. When, before the timer expires, the gap of the PDCP SN is filled or the data corresponding to the PDCP SN assumed to be lost is received, the PDCP layer may stop and reset the timer. A PDCP reordering timer may be used as the timer, and a new timer having a smaller or greater value than the PDCP reordering timer may be defined. The aforementioned timer may be defined and configured in the ADAP layer.

The RRCConnectionSetup message may include configuration about a PDCP status report prohibit timer to prevent the configuration information (pdcp-config) of the PDCP layer from frequently triggering the PDCP status report. When the PDCP status report prohibit timer is configured, the PDCP layer may trigger or configure and transmit the PDCP status report, and may trigger the PDCP status report prohibit timer. The PDCP layer may prevent an additional PDCP status report from being transmitted while the PDCP status report prohibit timer operates, and after the PDCP status report prohibit timer expires, the PDCP layer may allow transmission of a PDCP status report. The aforementioned timer may also be defined and configured in the ADAP layer.

The RRCConnectionSetup message (or a newly defined separate RRC message) may include information about the parent IAB node or the child IAB node, the information being useful for an IAB node and including a congestion level, a queuing delay, a one-hop air latency, or the like, and information about each hop. Also, the RRCConnectionSetup message (or the newly defined separate RRC message) may indicate a radio hop number from an IAB node receiving an RRC message to an uppermost IAB node (the IAB donor). The RRCConnectionSetup message (or the newly defined separate RRC message) may notify a hop number that is increased by 1 to a next child IAB node of the IAB node having received a hop number through the RRC message.

The RRCConnectionSetup message (or the newly defined separate RRC message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the RRC message. The in-sequence delivery function indicates that RLC SNs of RLC PDUs or RLC SDUs received by the RLC layer are sequentially ordered and data is transferred to the PDCP layer in ascending order of the RLC SNs. When a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs. Also, the RRCConnectionSetup message (or a newly defined separate RRC message) may be configured with respect to whether to use, by the ADAP layer, a retransmission function or a re-routing function or to trigger the retransmission function or the re-routing function. The retransmission function or the re-routing function may be configured as a default function available in the ADAP layer. Also, the retransmission function or the re-routing function may be applied to the ADAP layer through implementation. In the above descriptions, the retransmission function or the re-routing function of the ADAP layer may be triggered by an upper layer (e.g., an RRC layer). For example, when the RRC layer receives, from the RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a Radio Link Failure (RLF), and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

The UE or the child IAB node which established the RRC connection transmits an RRCConnetionSetupComplete message (or an RRCResumeComplete message) to the parent IAB node (2f-15). The RRCConnetionSetupComplete message may include a control message of SERVICE REQUEST by which the UE or the child IAB node requests an Access and Mobility Management Function (AMF) or an MME for bearer configuration. The parent IAB node transmits the SERVICE REQUEST message included in the RRCConnetionSetupComplete message to the AMF or the MME. The AMF or the MME may determine whether to provide a service requested by the UE or the child IAB node.

As a result of the determination, when the AMF or the MME determines to provide the service requested by the UE or the child IAB node, the AMF or the MME transmits an INITIAL CONTEXT SETUP REQUEST message to the parent IAB node. The INITIAL CONTEXT SETUP REQUEST message may include information such as QoS information to be applied to DRB configuration, security-related information (e.g., a security key, a security algorithm, etc.) to be applied to a DRB, or the like.

The parent IAB node and the UE or the child IAB node exchange a SecurityModeCommand message (2f-20) and a SecurityModeComplete message (2f-25) so as to configure security. When the configuration of security is completed, the parent IAB node transmits an RRCConnectionReconfiguration message to the UE or the child IAB node (2f-30).

The RRCConnectionReconfiguration message may include an indicator indicating whether to retransmit pre-configured RRC messages to a target parent IAB node or a target cell, when the UE or the child IAB node performs handover. For example, the parent IAB node may indicate the UE or the child IAB node to retransmit RRC messages transmitted few seconds ago, before the UE or the child IAB node receives a handover indication message, performs handover, or receives an RRC message. The indicator indicating retransmission may indicate retransmission with respect to each of the pre-configured RRC messages. That is, a plurality of indicators may indicate whether to retransmit respective RRC messages. Alternatively, indication of retransmission may be performed in the form of a bitmap indicating each RRC message.

The RRCConnectionReconfiguration message may include PDCP configuration information including an indicator indicating to perform a PDCP data recovery process. Also, the RRCConnectionReconfiguration message may include bearer configuration information including an indicator indicating whether to perform a PDCP data recovery process on an SRB or a DRB. Also, the RRCConnection-Reconfiguration message may include bearer configuration information including an indicator indicating, with respect to the SRB or the DRB, whether to discard a plurality of items of residual data in the PDCP layer.

The RRCConnectionReconfiguration message may include bearer configuration information including an indicator indicating whether to perform accumulated retransmission or selective retransmission on an AM DRB when a PDCP re-establishment process is performed.

The RRCConnectionReconfiguration message may include an indicator indicating which ARQ function is to be used in the child IAB node, and may indicate, by using an indicator indicating which ARQ function is to be used, whether the parent IAB node is to use a hop-by-hop ARQ function or an end-to-end ARQ function. When the end-to-end ARQ function is configured, the RRCConnectionReconfiguration message may indicate whether the parent IAB node is to perform a function of segmenting or changelessly transferring received RLC layer data or whether the child IAB node, as an end, is to perform an ARQ function.

The RRCConnectionReconfiguration message may indicate which ARC function, as a default function, is to be used by the parent IAB node, and when the RRCConnectionReconfiguration message does not configure an ARQ function, it may be predefined that the hop-by-hop ARQ function or the end-to-end ARQ function is to be used as the default function. Also, the RRCConnectionReconfiguration message may indicate whether the child IAB node is to use a data segmentation function, and may indicate whether respective functions of RLC layers are to be activated (or to be used), the functions being described with reference to FIG. 1D or 2B.

The RRCConnectionReconfiguration message may include an indicator indicating whether the Adaptation layer is to use a data concatenation function. The RRCConnectionReconfiguration message may include an indicator indicating whether a header of the Adaptation layer is to be configured, and may indicate a type of the header.

For example, the RRCConnectionReconfiguration message may include information configuring which information from among a UE identifier, a UE bearer identifier, a QoS identifier, a radio node identifier, a radio node address, and QoS information is to be included in the header. Obviously, omission of the header may be configured to decrease overhead.

The RRCConnectionReconfiguration message may include information configuring an RLC channel to be used between an Adaptation layer of a transmitter and an Adaptation layer of a receiver, between the child IAB node and the parent IAB node, or between the UE and an IAB node. In detail, the RRCConnectionReconfiguration message may include an available number of RLC channels, identifiers of available RLC channels, or mapping information (e.g., a UE identifier, a UE bearer identifier, QoS information, or QoS identifier mapping information) about a plurality of items of data mapped to the RLC channels. An RLC channel may be defined as a channel for delivering data according to QoS by grouping, based on QoS information, a plurality of items of data of several UEs, or may be defined as a channel for delivering data by grouping data of each UE.

The RRCConnectionReconfiguration message includes information that defines an indicator indicating whether configuration information (pdcp-config) of the PDCP layer is to perform PDCP status report-based retransmission, and configures and indicates to perform the PDCP status report-based retransmission.

For example, when a value of the indicator indicating whether to perform the PDCP status report-based retransmission is configured as 0, the PDCP layer that received a PDCP status report may check data corresponding to NACK information of the PDCP status report and may discard only data corresponding to ACK information. However, when the value of the indicator indicating whether to perform the PDCP status report-based retransmission is configured as 1, the PDCP layer that received the PDCP status report may discard data corresponding to ACK information of the PDCP status report and may retransmit data corresponding to NACK information.

Alternatively, the RRCConnectionReconfiguration message may indicate whether the ADAP layer is to define an ADAP status report and to perform ADAP status report-based retransmission. An ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

To indicate to perform the PDCP status report-based retransmission, the RRCConnectionReconfiguration message may trigger a PDCP data recovery processing procedure by PDCP data recovery indicator in the configuration information (pdcp-config) of the PDCP layer, a PDCP data recovery indicator (recoverPDCP), and may transmit the PDCP status report.

When retransmission is performed during the PDCP data recovery process, the PDCP layer may perform selective retransmission based on the PDCP status report, not based on whether transmission is successful from a lower layer (e.g., the RLC layer). That is, the PDCP layer may retransmit only data indicated, in the PDCP status report, as NACK data for which successful transmission is not acknowledged.

Alternatively, the RRCConnectionReconfiguration message may indicate whether the ADAP layer is to define the ADAP status report and an ADAP data recovery processing procedure and to perform the ADAP status report-based retransmission. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The RRCConnectionReconfiguration message may include an indicator and information for configuring a period or a timer value, the indicator indicating periodic transmission of the PDCP status report so as to allow the configuration information (pdcp-config) of the PDCP layer to periodically transmit the PDCP status report. When the PDCP layer receives the period or the timer value, the PDCP layer may transmit the PDCP status report by triggering the PDCP status report according to the period or whenever the timer value is expired.

Alternatively, the RRCConnectionReconfiguration message may indicate that the ADAP layer is to define the ADAP status report and to periodically perform the ADAP status report. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The RRCConnectionReconfiguration message may include an indicator and information for configuring a timer value, the indicator indicating transmission of the PDCP status report so as to allow the configuration information (pdcp-config) of the PDCP layer to trigger and transmit the PDCP status report. When the PDCP layer receives configuration about the indicator and the timer value, the PDCP layer may trigger the timer value whenever a gap of a PDCP SN occurs, and when the timer expires, the PDCP layer may trigger, configure, and transmit the PDCP status report. A PDCP reordering timer may be used as the timer, and a new timer having a smaller or greater value than the PDCP reordering timer may be defined. The aforementioned timer may be defined and configured in the ADAP layer.

The RRCConnectionReconfiguration message may include configuration about a PDCP status report prohibit timer to prevent the configuration information (pdcp-config) of the PDCP layer from frequently triggering the PDCP status report. When the PDCP status report prohibit timer is configured, the PDCP layer may trigger or configure and transmit the PDCP status report, and may trigger the PDCP status report prohibit timer. The PDCP layer may prevent an additional PDCP status report from being transmitted while the PDCP status report prohibit timer operates, and after the PDCP status report prohibit timer expires, the PDCP layer may allow transmission of a PDCP status report. The aforementioned timer may also be defined and configured in the ADAP layer.

The RRCConnectionReconfiguration message (or a newly defined separate RRC message) may include information about the parent IAB node or the child IAB node, the information being useful for an IAB node and including a congestion level, a queuing delay, a one-hop air latency, or the like, and information about each hop. Also, the RRCConnectionReconfiguration message (or the newly defined separate RRC message) may indicate a radio hop number from an IAB node receiving an RRC message to an uppermost IAB node (the IAB donor). The RRCConnectionReconfiguration message (or the newly defined separate RRC message) may notify a hop number that is increased by 1 to a next child IAB node of the IAB node having received a hop number through the RRC message.

The RRCConnectionReconfiguration message (or the newly defined separate RRC message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the RRC message. The in-sequence delivery function indicates that RLC SNs of RLC PDUs or RLC SDUs received by the RLC layer are sequentially ordered and data is transferred to the PDCP layer in ascending order of the RLC SNs. When a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs. Also, the RRCConnectionReconfiguration message (or a newly defined separate RRC message) may be configured with respect to whether to use, by the ADAP layer, a retransmission function or a re-routing function or to trigger the retransmission function or the re-routing function. The retransmission function or the re-routing function may be configured as a default function available in the ADAP layer. Also, the retransmission function or the re-routing function may be applied to the ADAP layer through implementation. In the above descriptions, the retransmission function or the re-routing function of the ADAP layer may be triggered by an upper layer (e.g., the RRC layer). For example, when the RRC layer receives, from the RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

Also, the RRCConnectionReconfiguration message may include configuration information of a DRB by which user data is to be processed, and the UE or the child IAB node configures the DRB by using the configuration information and transmits an RRCConnectionReconfigurationComplete message to the parent IAB node (2f-35). After the parent IAB node completes DRB configuration with respect to the UE or the child IAB node, the parent IAB node may transmit an INITIAL CONTEXT SETUP COMPLETE message to the AMF or the MME and may complete connection.

When the aforementioned procedure is completed, the UE or the child IAB node transmits and receives data to and from the parent IAB node through the core network (2f-40). According to some embodiments of the disclosure, a data transmission procedure broadly consists of 3 steps that are RRC connection configuration, security configuration, and DRB configuration. Also, the parent IAB node may transmit an RRCConnectionReconfiguration message to newly allocate, add, or change configuration with respect to the UE or the child IAB node (2f-45).

In the disclosure, a bearer may include an SRB and a DRB, wherein the SRB indicates a Signaling Radio Bearer and the DRB indicates a Data Radio Bearer. A UM DRB indicates a DRB configured to use an RLC layer operating in an Unacknowledged Mode, and an AM DRB indicates a DRB configured to use an RLC layer operating in an Acknowledged Mode.

Figure 2G:
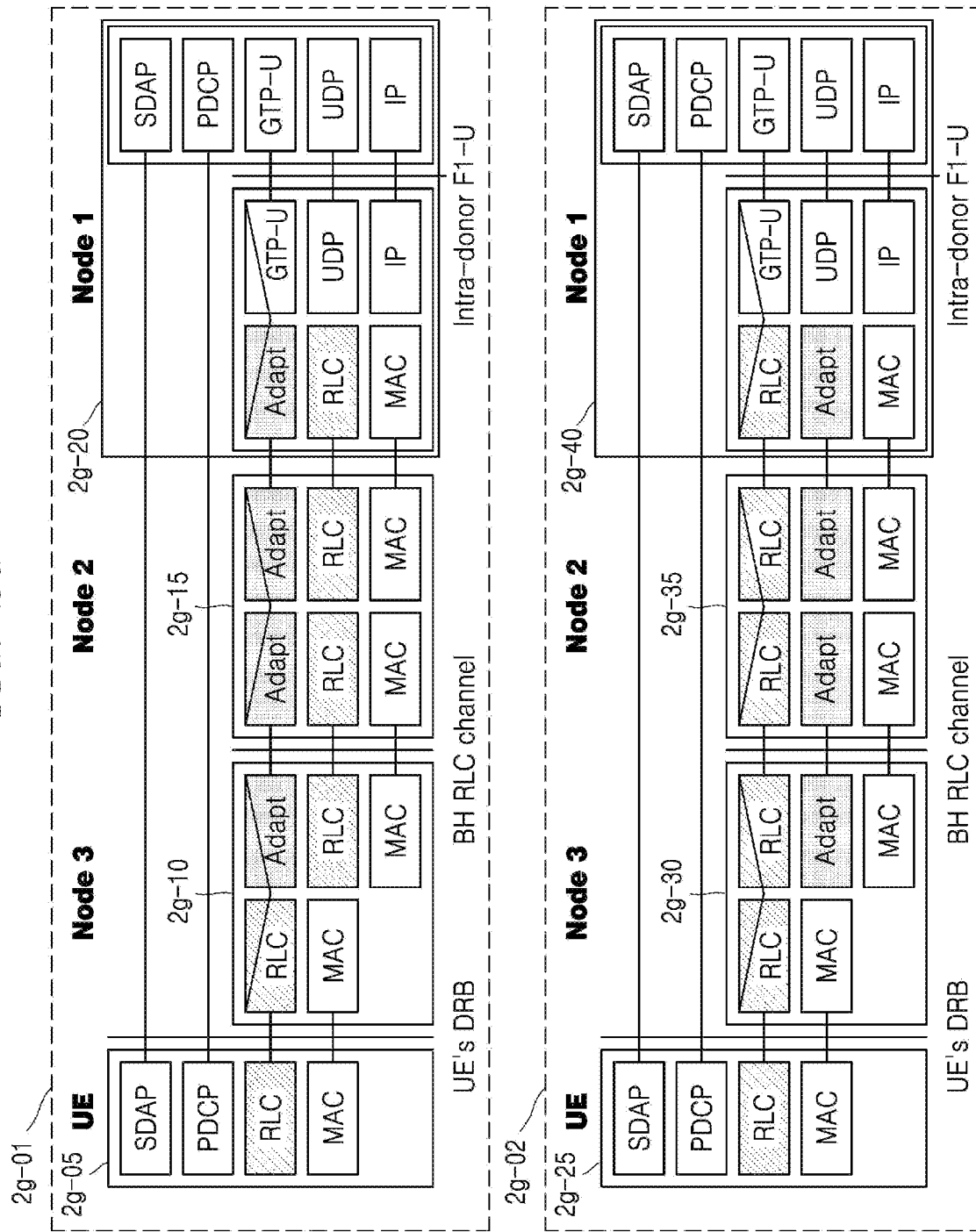
FIG. 2G illustrates a diagram of a protocol layer that each radio node may have in the NR or 5G communication system supporting wireless backhaul, according to some embodiments of the disclosure.

FIG. 2G illustrates a diagram of a protocol layer that each radio node may have in the NR or 5G communication system supporting wireless backhaul, according to some embodiments of the disclosure.

Referring to FIG. 2G, protocol layer configurations of radio nodes supporting wireless backhaul are broadly divided to two types. The two types may be based on positions of an ADAP layer. According to some embodiments of the disclosure, the radio nodes supporting wireless backhaul may have a protocol layer configuration 2g-01 in which the ADAP layer operates above an RLC layer and a protocol layer configuration 2g-02 in which the ADAP layer operates below the RLC layer.

Referring to FIG. 2G, a UE 2g-05 may drive, as the protocol layer, all of a PHY layer, a MAC layer, a RLC layer, a PDCP layer, and a SDAP layer, the radio nodes (e.g., Node3 2g-10 and Node2 2g-15 that perform a wireless backhaul function by receiving and transferring data between the UE 2g-05 and an IAB donor) may each drive a PHY layer, a MAC layer, a RLC layer, and an ADAP layer, and an uppermost radio node (e.g., an uppermost node that is the IAB donor (Node1 2g-20)) that is connected to a core network and thus supports wireless backhaul transferring data) may drive all of a PHY layer, a MAC layer, a RLC layer, a PDCP layer, and a SDAP layer and may be configured of a central unit (CU) and a distributed unit (DU) that are connected in a wired manner. The CU may drive the SDAP layer and the PDCP layer, and the DU may drive the RLC layer, the MAC layer, and the PHY layer.

The ADAP layer may identify a plurality of bearers of a plurality of UEs and may map the bearers to RLC channels. Also, when the ADAP layer identifies the plurality of bearers of the plurality of UEs, the ADAP layer may group a plurality of items of data according to a UE or a QoS, may map the grouped data to one RLC channel, and may allow the grouped data to be processed. When the ADAP layer groups the plurality of items of data to be mapped to one RLC channel, the ADAP layer may use a data concatenation function and thus may decrease overhead. The data concatenation function may involve configuring one header or a small number of headers for the plurality of items of data, making each data identified by indicating a header field indicating concatenated data, and preventing a header from being unnecessarily configured in each data, thereby decreasing overhead. Also, the ADAP layer may read PDCP SNs of a plurality of items of received data and may calculate COUNT values. Therefore, the ADAP layer may request retransmission based on a COUNT value of lost data, and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message.

In the protocol layer configuration 2g-01 as shown in FIG. 2G, the Node3 2g-10 may drive first RLC layers equal to first RLC layers corresponding to data bearers of the UE 2g-05 so as to process data received from the UE 2g-05, and an ADAP layer of the Node3 2g-10 may process a plurality of items of data received from a plurality of RLC layers and map the plurality of items of data to a new RLC channel and second RLC layers corresponding thereto. Then, the ADAP layer may identify a plurality of bearers of a plurality of UEs and may map the bearers to RLC channels. When the ADAP layer identifies the plurality of bearers of the plurality of UEs, the ADAP layer may group a plurality of items of data according to a UE or a QoS, may map the grouped data to one RLC channel, and may allow the second RLC layers to process the grouped data. An RLC channel may be defined as a channel to transfer data grouped based on QoS information, or may be defined as a channel to transfer data grouped based on each UE.

The Node3 2g-10 may perform a process of distributing a UL transmission resource received from a parent IAB node, according to QoS information, a priority order, or a transmittable data amount (e.g., a data mount or tokens, which is allowed for the UL transmission resource) of the RLC channel (or the second RLC layer), or an amount of data with respect to the RLC channel (or the second RLC layer), the data being stored in a buffer. Then, the Node3 2g-10 may perform data transmission on the parent IAB node by using a segmentation function or a concatenation function, the data transmission being with respect to data of each RLC channel.

The first RLC layer indicates a RLC layer that processes a plurality of items of data corresponding to bearers, equally to a RLC layer corresponding to each bearer of the UE 2g-05, and the second RLC layer indicates a RLC layer processing a plurality of items of data that are mapped, by the ADAP layer, based on the UE 2g-05, QoS, or mapping information configured by the parent IAB node.

In the protocol layer configuration 2g-01 as shown in FIG. 2G, the Node2 2g-15 may drive second RLC layers corresponding to second RLC layers of a child IAB node (the Node3 2g-10), and may process data according to an RLC channel.

In the protocol layer configuration 2g-01 as shown in FIG. 2G, the Node1 2g-20 that is the uppermost radio node may drive second RLC layers corresponding to the second RLC layers of a child IAB node (the Node2 2g-15), and may process data according to an RLC channel. The ADAP layer may map a plurality of items of data, which are processed with respect to each RLC channel, to PDCP layers matched with respective bearers of each UE. Then, a PDCP layer of an uppermost radio node corresponding to each bearer of each UE may process a plurality of items of received data, and may transfer the processed data to a SDAP layer, and the SDAP layer may process and transmit the data to the core network.

In the protocol layer configuration 2g-02 as shown in FIG. 2G, a Node3 2g-30 may drive first RLC layers equal to first RLC layers corresponding to data bearers of a UE 2g-25 so as to process data received from the UE 2g-25, and may process a plurality of items of data, which are received from a plurality of RLC layers, by driving the first RLC layers as described above, and an ADAP layer of the Node3 2g-30 may process the plurality of items of data that are processed by the first RLC layers and may map the plurality of items of data to new RLC channels. Then, the ADAP layer may identify a plurality of bearers of a plurality of UEs and may map the bearers to RLC channels. When the ADAP layer identifies the plurality of bearers of the plurality of UEs, the ADAP layer may group a plurality of items of data according to a UE or a QoS, may map the grouped data to one RLC channel, and may allow the first RLC layers to process the grouped data.

An RLC channel may be defined as a channel to transfer data grouped based on QoS information, or may be defined as a channel to transfer data grouped based on each UE. The Node3 2g-30 may perform a process of distributing a UL transmission resource received from a parent IAB node, according to QoS information, a priority order, or a transmittable data amount (e.g., a data mount or tokens, which is allowed for the UL transmission resource) of the RLC channel, or an amount of data with respect to the RLC channel, the data being stored in a buffer. Then, the Node3 2g-30 may perform data transmission on the parent IAB node by using a segmentation function or a concatenation function, the data transmission being with respect to data of each RLC channel.

In the protocol layer configuration 2g-02 as shown in FIG. 2G, a Node2 2g-35 may process received data according to an RLC channel corresponding to an RLC channel of a child IAB node (the Node3 2g-30). The ADAP layer may map a plurality of items of data, which are received with respect to the RLC channel, to first RLC layers matched with respective bearers of each UE. A first RLC layer of a radio node which corresponds to each bearer of each UE processes a plurality of items of received data, and transfers the data to a first RLC layer of a receiver, and the first RLC layer of the receiver processes the data and transfers back to the ADAP layer. The ADAP layer may map, to the RLC channels, a plurality of items of data received from the plurality of RLC layers, and may perform data transmission to transmit the data to a next parent IAB node, according to distribution of the UL transmission resource.

In the protocol layer configuration 2g-02 as shown in FIG. 2G, a Node1 2g-40 that is the uppermost radio node may process data according to an RLC channel, the data being received with respect to the RLC channel of a child IAB node (the Node2 2g-35). The ADAP layer may map a plurality of items of data, which are received with respect to each RLC channel, to first RLC layers corresponding to respective bearers of each UE. A radio node may drive first RLC layers corresponding to respective bearers of each UE, may process a plurality of items of received data, and may transfer the data to PDCP layers corresponding to respective bearers of each UE, and a PDCP layer of an uppermost radio node corresponding to each bearer of each UE may process a plurality of items of received data, and may transfer the processed data to a SDAP layer, and the SDAP layer may process and transmit the data to the core network.

Figure 2H:
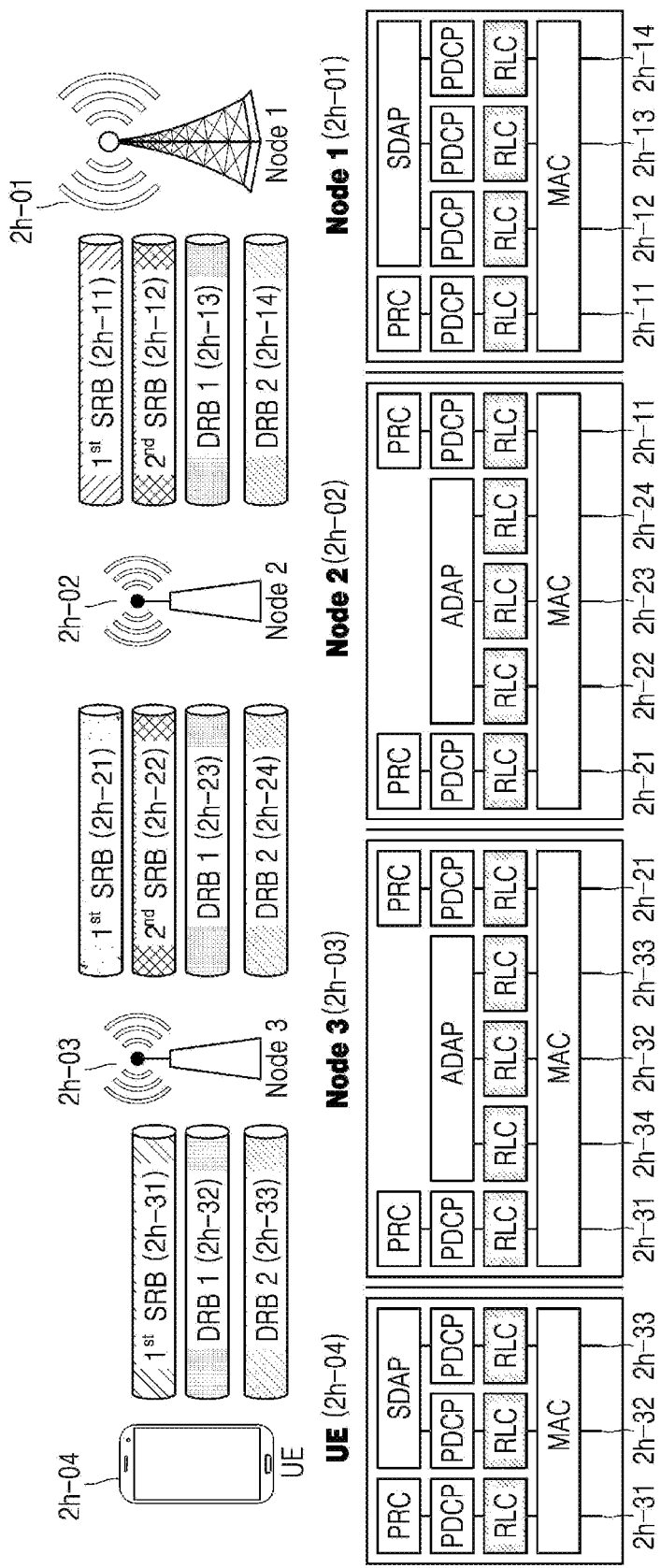
FIG. 2H illustrates a diagram of a method of managing and processing bearers of radio nodes, the method being performed in the NR or 5G mobile communication system supporting wireless backhaul, according to some embodiments of the disclosure.

FIG. 2H illustrates a diagram of a method of managing and processing bearers of radio nodes, the method being performed in the NR or 5G mobile communication system supporting wireless backhaul, according to some embodiments of the disclosure.

As shown in FIG. 2H, a radio node (e.g., a UE 2h-04) may transmit and receive data to and from an uppermost radio node (e.g., an IAB donor 2h-01) through a Node3 (e.g., an intermediate radio node or an IAB node 2h-03) and a Node2 (e.g., a radio node or an IAB node 2h-02), the IAB donor 2h-01 being connected to a core network.

Some embodiments of the disclosure provide that, in a wireless backhaul network, each radio node configures a first SRB (an SRB 2h-31, 2h-21, or 2h-11) to establish RRC connection with a parent IAB node. In the intermediate radio node, the first SRB may be connected with a PHY layer, a MAC layer, and an RLC layer, and may be directly connected with a PDCP layer without being connected with an ADAP layer. The first SRB may be used in exchanging an RRC message between two radio nodes connected to one radio link, and the connected PDCP layer may separately perform ciphering and deciphering or integrity protection and integrity verification.

Some embodiments of the disclosure provide that, in the wireless backhaul network, the Node3 (e.g., a UE accessed IAB node, the Node 3, or the IAB node 2h-03) to which the UE 2h-04 accesses configures a second SRB (an SRB 2h-34, 2h-22, or 2h-11) to transmit and receive a NAS message through the uppermost radio node (e.g., the Node1 2h-01), the NAS message being for network structure with respect to the UE 2h-04.

The Node3 2h-03 to which the UE 2h-04 accesses may check an RRC message received through the first SRB, and data may be transmitted to the Node2 2h-02 through the second SRB, the data being requested to be transmitted as the NAS message to the core network. The Node2 2h-02 may transmit the data to the uppermost radio node (e.g., the Node1 2h-01) through the second SRB. The uppermost radio node (e.g., the Node1 2h-01) that received the data transmits the data to the core network, and when the uppermost radio node (e.g., the Node1 2h-01) receives response data from the core network, the uppermost radio node (e.g., the Node1 2h-01) transmits the response data to the Node3 2h-03. The Node3 2h-03 may transmit the response data to the UE 2h-04 through the first SRB. In intermediate radio nodes (e.g., the Node2 2h-02 or the Node3 2h-03), the second SRB may be connected with the PHY layer, the MAC layer, the RLC layer, and the ADAP layer. That is, unlike the first SRB, the second SRB may be mapped to a new RLC layer through the ADAP layer and thus may be transferred to a next radio node.

According to some embodiments of the disclosure, in the wireless backhaul network, the Node3 (e.g., the UE accessed IAB node, the Node 3, or the IAB node 2h-03) to which the UE 2h-04 accesses may generate and manage DRBs to process data received from the UE 2h-04, and DRBs 2h-13, 2h-14, 2h-23, 2h-24, 2h-32, and 2h-3 may be connected with the PHY layer, the MAC layer, the RLC layer, and the ADAP layer. Therefore, the Node3 2h-03 to which the UE 2h-04 accesses may map a plurality of items of data corresponding to a DRB to a new RLC layer through the ADAP layer, and may transmit the data to a next radio node.

To process the plurality of items of data received through the RLC channel from the Node3 2h-03 that is a child IAB node, the intermediate radio node that is the Node2 2h-02 may be connected with the PHY layer, the MAC layer, the RLC layer, and the ADAP layer, thereby transmitting and receiving data.

According to the method of managing and processing bearers of radio nodes according to some embodiments of the disclosure, each radio node may perform, by the ADAP layer, a data concatenation function on a plurality of items of data corresponding to DRBs of a UE, and because first SRBs are not connected with the ADAP layer, each radio node may not perform the data concatenation function on data corresponding to the first SRBs.

According to the method of managing and processing bearers of radio nodes according to some embodiments of the disclosure, a security key used in performing a ciphering and integrity protection process on data with respect to the first SRBs may be determined by a parent IAB node of each radio link. That is, the SRBs 2h-11, 2h-21, and 2h-31 may share a same security key, but to enhance security, parent IAB nodes may respectively configure security keys (e.g., the Node3 2h-03 may determine a security key for the SRB 2h-31, and the Node2 2h-02 may determine a security key for the SRB 2h-21).

Also, each intermediate radio node may not separately perform ciphering and integrity protection on the second SRB, except for ciphering and integrity protection applied to a NAS message. Also, each intermediate radio node may perform ciphering and integrity protection on the first SRB, as described above, but may not separately perform ciphering and integrity protection on DRBs other than the first SRB.

The method of managing and processing bearers of radio nodes according to some embodiments of the disclosure may also define and use a third SRB. The third SRB may be used as a control bearer to transmit and receive a control message between each radio node and an uppermost radio node. That is, the bearer for transmitting and receiving a message (e.g., an RRC message or an interface message of an upper layer) may be defined and used, the message being used by the uppermost radio node to directly control each radio node.

For example, the uppermost radio node (e.g., the Node1 2h-01) and the Node2 2h-02 may configure a third SRB and thus may exchange a control message, and the uppermost radio node (e.g., the Node1 2h-01) and the Node3 2h-03 may configure a third SRB and thus may exchange a control message, wherein the Node2 2h-02 may relay data between the uppermost radio node (e.g., the Node1 2h-01) and the Node3 2h-03, the data corresponding to the third SRB.

Hereinafter, provided is a method of losslessly transmitting data through a radio link of the NR or 5G communication system supporting wireless backhaul.

Figure 2I:
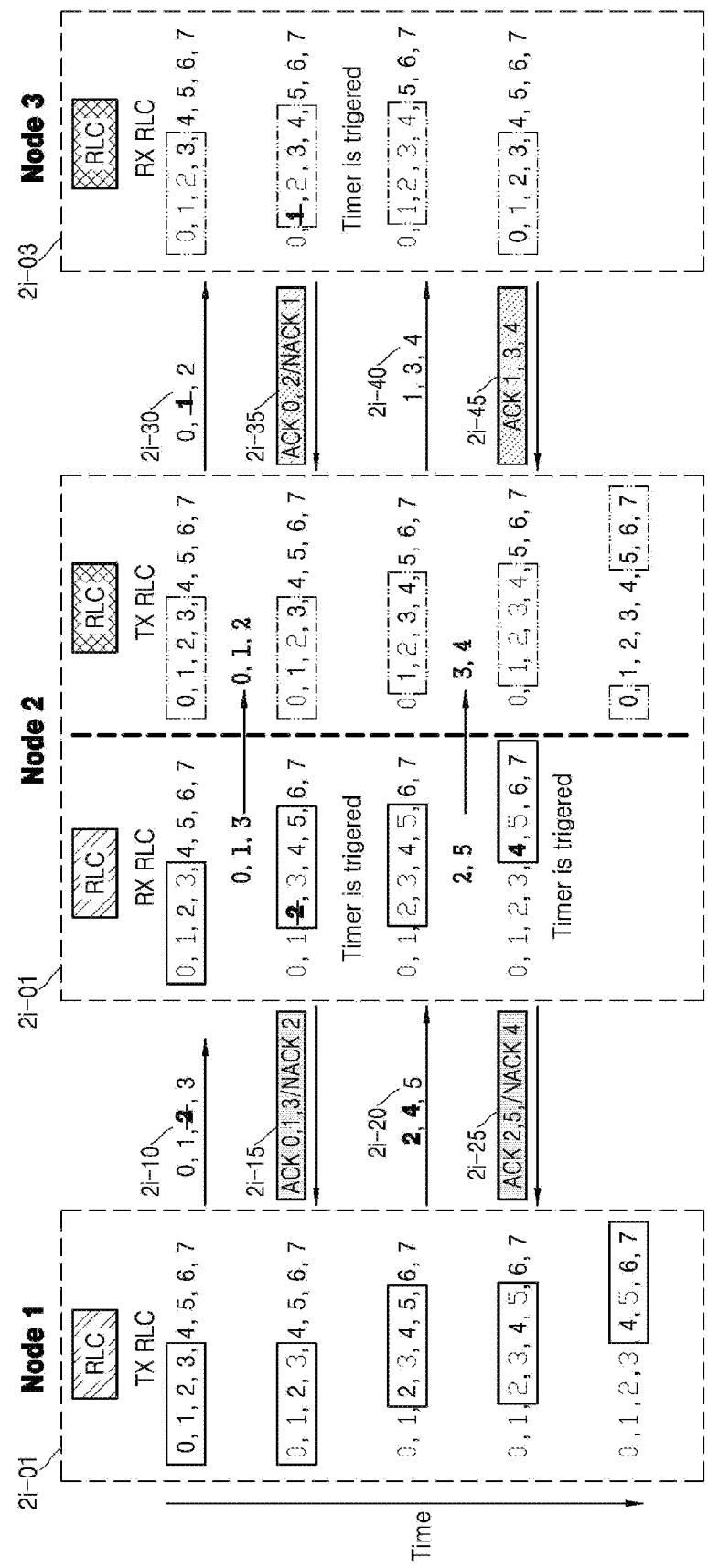
FIG. 2I illustrates a diagram of a hop-by-hop automatic repeat request (ARQ) method for losslessly transmitting data through a radio link of the NR or 5G communication system supporting wireless backhaul, the hop-by-hop ARQ method being with respect to a data between radio link control (RLC) layers, according to some embodiments of the disclosure, wherein FIG. 2I particularly illustrates a scenario in which data is transmitted from a RLC layer of a radio node that is Node1 to a radio node that is Node3.

FIG. 2I illustrates a diagram of a hop-by-hop ARQ method for losslessly transmitting data through a radio link of the NR or 5G communication system supporting wireless backhaul, the hop-by-hop ARQ method being with respect to a data level between RLC layers, according to some embodiments of the disclosure; FIG. 2I particularly illustrates a scenario in which data is transmitted from a RLC layer of a radio node that is Node1 to a radio node that is Node3.

The hop-by-hop ARQ method involves independently driving an ARQ function in a radio link between two radio nodes (e.g., two radio nodes from among a UE, an IAB node, and an IAB donor). For example, as shown in FIG. 2I, when it is assumed that the Node1 (e.g., a UE 2i-01) transmits data to the Node3 (e.g., an IAB donor 2i-03) through a Node2 (e.g., an IAB node 2i-02), there are three radio nodes and two radio links are established. In this regard, each of two radio nodes independently drives an ARQ function with respect to each of the two radio links. That is, with respect to a radio link between the Node1 and the Node2, the Node1 may drive a transmission RLC window, may allocate independent RLC SNs, may transmit data, and may perform a polling function, a segmentation function, or the like. The Node1 may receive an RLC status report (an RLC status PDU), and thus may operate the transmission RLC window, based on RLC ACK of the RLC status report.

Also, with respect to the radio link between the Node1 and the Node2, the Node2 may drive a reception RLC window, may check the RLC SNs of the received data, may perform a loss detection function, may drive a timer when a gap occurs in the RLC SNs, may configure and transmit a RLC status report when the timer expires, may configure a RLC status report corresponding to polling when the polling is checked by a RLC header, may indicate whether transmission is successful, and thus may request a transmission RLC layer for retransmission and a slide of a transmission window.

Also, with respect to a radio link between the Node2 (e.g., the IAB node 2i-02) and the Node3 (e.g., the IAB donor 2i-03), the Node2 may drive a transmission RLC window, may allocate independent RLC SNs, may transmit data, and may perform a polling function, a segmentation function, or the like. The Node2 may receive an RLC status report (an RLC status PDU), and thus may operate the transmission RLC window, based on RLC ACK of the RLC status report.

Also, with respect to the radio link between the Node2 and the Node3, the Node3 may drive a reception RLC window, may check the RLC SNs of the received data, may perform a loss detection function, may drive a timer when a gap occurs in the RLC SNs, may configure and transmit a RLC status report when the timer expires, may configure a RLC status report corresponding to polling when the polling is checked by a RLC header, may indicate whether transmission is successful, and thus may request a transmission RLC layer for retransmission and a slide of a transmission window.

The Node2 (e.g., the IAB node 2i-02) is connected with the Node1 (e.g., the UE 2i-01) through a radio link, and is connected with the Node3 (e.g., the IAB donor 2i-03) through a radio link. Therefore, the Node2 processes data of an RLC layer, the data being received from the Node 1. In particular, the Node2 may read and analyze an RLC header and then may generate data of the transmission RLC layer by allocating new RLC SNs and newly configuring a new RLC header, and may transmit the data to a reception RLC layer of the Node3.

Also, the Node2 may process data of an RLC layer, the data being received from the Node3. In particular, the Node2 may read and analyze an RLC header and then may generate data of the transmission RLC layer by allocating new RLC SNs and newly configuring a new RLC header, and may transmit the data to a reception RLC layer of the Node1. That is, when the hop-by-hop ARQ method is used, intermediate radio nodes that receive data in the middle may receive and reconfigure data of an RLC layer, and may transmit the data. When the intermediate radio nodes reconfigure the data, the intermediate radio nodes may discard a received RLC header, may generate a new RLC header, may reconfigure the data by using the generated new RLC header, and may transmit the data. The intermediate radio nodes may manage and maintain a mapping table to record mapping information of RLC SNs of the discarded RLC header and RLC SNs of the generated new RLC header.

Therefore, the hop-by-hop ARQ method proposed in the disclosure is characterized in performances below.

1. With respect to each radio link, a radio node transmitting data and a radio node receiving data independently drive an ARQ function.

2. With respect to each radio link, independent RLC SNs are allocated and used.

3. With respect to each radio link, a reception RLC layer of the radio node receiving data generates and transmits an independent RLC status report, and a transmission RLC layer of the radio node transmitting data receives the RLC status report, and performs retransmission and a slide of a transmission window 4. With respect to each radio link, a function of retransmitting data is driven.

5. Radio nodes that transmit data from one radio link to another radio link may receive and reconfigure data of an RLC layer, and may transmit the data. When the radio nodes reconfigure the data, the radio nodes may discard a received RLC header, may generate a new RLC header, may reconfigure the data by using the generated new RLC header, and may transmit the data. The radio nodes may manage and maintain a mapping table to record mapping information of RLC SNs of the discarded RLC header and RLC SNs of the generated new RLC header.

6. When a data segmentation function is requested based on a UL transmission resource, the radio nodes may update an RLC header field value of the generated new RLC header, or may newly configure an RLC header by inserting an additional field, according to the data segmentation function.

With reference to FIG. 2I, an embodiment of the hop-by-hop ARQ method which is a first embodiment of the disclosure will now be described in detail.

Hereinafter, for convenience of description, it may be assumed that radio nodes use RLC SNs, each having a 3-bit length, in a network supporting wireless backhaul. That is, as the RLC SNs, 0, 1, 2, 3, 4, 5, 6, and 7 may be allocated and used, and 4 that is a half of a length of the RLC SNs may be used as a size of an RLC window. Obviously, the disclosure is not limited to the example.

First, a transmission RLC layer of the Node1 2i-01 may allocate respective RLC SNs to a plurality of items of data received from an upper layer. Then, the transmission RLC layer of the Node1 2i-01 may transmit a plurality of items of data corresponding to RLC SNs of 0, 1, 2, and 3 to the Node2 2i-02 that is a parent IAB node through a radio link 2i-10.

In this regard, data corresponding to the RLC SN of 2 may be lost in the radio link 2i-10. Then, a reception RLC layer of the parent IAB node may receive the plurality of items of data corresponding to the RLC SNs of 0, 1, and 3, may determine a probability that the data of the RLC SN of 2 is lost, and may trigger a timer. When the data of the RLC SN of 2 is not received until the timer expires, the reception RLC layer of the parent IAB node configures and transmits an RLC status report to the transmission RLC layer of the Node1 2i-01.

The RLC status report may include ACK information indicating that the RLC SNs of 0, 1, and 3 are successfully received, and NACK information indicating that the data of the RLC SN of 2 is not successfully received. When the Node1 2i-01 receives the RLC status report, the Node1 2i-01 slides a transmission RLC window, based on information about the RLC SNs for which successful transmission is acknowledged, and retransmits data corresponding to an RLC SN for which successful transmission is not acknowledged. That is, the data corresponding to the RLC SN of 2 is retransmitted (2i-15).

Then, the data corresponding to the RLC SN of 2 for retransmission and data corresponding to RLC SNs of 4 and 5 for new transmission may be transmitted through a radio link 2i-20. In this transmission, the data corresponding to the RLC SN of 4 may be lost. Then, an RLC layer of the Node2 2i-02 may trigger a timer, assuming that the RLC SN of 4 is lost, and when the timer expires, the RLC layer of the Node2 2i-02 may transmit an RLC status report and thus may continuously perform a process of the ARQ function.

When the Node2 2i-02 receives the data corresponding to the RLC SNs of 0, 1, and 3 from the Node1 2i-01, the Node2 2i-02 may read and discard the RLC header, may newly configuring a RLC header by allocating new RLC SNs of 0, 1, and 2 for a radio link between the Node2 2i-02 and the Node3 2i-03, may configure the new RLC header with the data, and may transmit the data together with the new RLC header to the Node3 2i-03. Then, the ARQ function described to be driven between the Node1 2i-01 and the Node2 2i-02 may be independently driven in each of radio links 2i-30, 2i-35, 2i-40, and 2i-45 between the Node2 2i-02 and the Node3 2i-03.

FIG. 2J is a diagram for describing data loss that may occur in a radio node of the NR or 5G communication system supporting wireless backhaul proposed by the disclosure.

As illustrated in FIG. 2J, a radio node (e.g., a UE 2j-04) may transmit and receive data to and from an uppermost radio node (e.g., an IAB donor 2j-01) through a Node3 (e.g., an intermediate radio node or an IAB node 2j-03) and a Node2 (e.g., a radio node or an IAB node 2j-02), the uppermost radio node being connected with a core network.

When a radio link is disconnected due to a barrier between the Node3 2j-03 and the Node2 2j-02 or a radio link is disconnected due to an excess of a maximum retransmission number, data loss may occur. Also, data may be lost due to occurrence of a buffer overflow due to data congestion of the Node3 2j-03 or the Node2 2j-02.

Even when the hop-by-hop ARQ method proposed with reference to FIG. 2I is used, data loss cannot be prevented.

Because even when the UE 2j-04 received a RLC status report acknowledging successful transmission from the Node3 2j-03 that is a parent IAB node, data may be lost due to the data congestion problem and the buffer overflow of the Node3 2j-03, or data loss may occur due to disconnection of a radio link 2j-10.

The disclosure proposes introduction of a separate control message (e.g., an RRC message) for requesting a data loss recovery process when data congestion or a buffer overflow occurs in a radio node, a parent IAB node is changed, or connection of a radio link is disconnected. That is, when the aforementioned problems occur, a radio node may inform a parent IAB node, a child IAB node, an uppermost radio node, or a UE of occurrence of the aforementioned problems or occurrence of data loss, by using a newly introduced control message. Also, the radio node may indicate a highest COUNT value with respect to a plurality of items of data that are sequentially and successfully received so far, by using a control message, so as to make the data loss recovered. Then, when a transmission end receives the control message, the transmission end may perform retransmission at the COUNT value.

Also, the radio node may define a predefined field of an ADAP header or a predefined field of an RLC header, thereby informing another radio node of occurrence of congestion or disconnection with respect to a radio link. For example, the radio node may define the predefined field of the ADAP header or the predefined field of the RLC header, thereby indicating a source radio node causing a high traffic of data to perform a congestion control (e.g., to reduce data transmission) because congestion occurred. The source radio node may define another predefined field of the ADAP header or another predefined field of the RLC header, thereby informing that the congestion control is performed (the data transmission is reduced) or an indication about occurrence of the congestion is received. Also, the radio node may configure a predefined field of an Internet Protocol (IP) header, thereby informing the source radio node of occurrence of the congestion, and may configure a predefined field of a Transmission Control Protocol (TCP) header, thereby indicating the source radio node to perform the congestion control. Then, the source radio node may indicate that it performed the congestion control, by using a predefined field of the TCP header.

Also, the disclosure proposes introduction of a TimeTo-Live (TTL) field to an ADAP header so as to prevent congestion that may occur in a network. Then, for a service such as a RLC UM mode in which data loss is allowed, an ADAP layer may configure a TTL field value in a header of the ADAP layer, such that, when hops that are greater than a predefined number are passed or a predefined time is lapsed, data may be discarded in an IAB node.

Also, for a service such as a RLC AM mode that does not allow data loss, the ADAP layer may not configure a TTL field value in a header of the ADAP layer, and when the ADAP layer configures the TTL field value, the ADAP layer may set a value of 0 or an infinite value, thereby indicating the IAB node not to discard data. That is, the ADAP layer may or may not configure a TTL field value of the header of the ADAP layer, based on QoS of a service corresponding to data, an RLC mode, or a degree of a transmission allowance delay.

Also, the ADAP layer may differently configure a TTL field value of the header of the ADAP layer, based on QoS of a service corresponding to data, an RLC mode, or a degree of a transmission allowance delay. Also, the ADAP layer may differently configure a TTL field value by distinguishing data to be transmitted in an RLC UM mode from data to be transmitted in an RLC AM mode. Also, the disclosure may inform the IAB node of occurrence of congestion, by using a newly defined MAC control element (CE).

The disclosure now proposes methods of recovering data loss when a problem of the data loss occurred as shown in FIG. 2J.

The disclosure proposes a method of recovering lost data by using a PDCP layer between ends so as to recover data loss that may occur in radio nodes of the NR or 5G communication system supporting wireless backhaul. The method of recovering lost data by using a PDCP layer may be applied to a NR or 5G communication system that does not support wireless backhaul, an LTE system, or a NR system.

Also, because an ADAP layer of a radio node may read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, and may allow retransmission to be performed based on the definition. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

As a first embodiment for recovering data loss, the disclosure proposes a PDCP data recovery process.

According to the first embodiment of the disclosure, when a radio node (a parent IAB node or an uppermost radio node) receives a report on occurrence of data loss or detects the data loss, the radio node may indicate retransmission by introducing an indicator into PDCP configuration information (e.g., pdcp-config) of a control message (e.g., an RRC message or an upper layer message), the indicator indicating to perform retransmission based on a PDCP status report, and may configure an indicator (recoverPDCP) indicating to perform the PDCP data recovery process.

A PDCP layer of the radio node may configure, generate, and transmit PDCP status information to a UE. When the UE receives the control message, a PDCP layer of the UE which corresponds to the PDCP configuration information may perform the PDCP data recovery process. Because the control message indicates to perform retransmission based on the PDCP status report, when the UE performs the PDCP data recovery process, the UE may not selectively retransmit a plurality of items of data in an ascending order of COUNT values, wherein successful transmission with respect to the data is not acknowledged by a lower layer, but may selectively retransmit a plurality of items of data in an ascending order of COUNT values, wherein the data is indicated, in the PDCP status report, as data for which successful transmission is not acknowledged.

According to the first embodiment of the disclosure, in a scenario as shown in FIG. 2J, the PDCP layer of the UE performs retransmission and thus, even when data in a data level of an RLC layer of an intermediate radio node is lost, the data may be recovered. That is, even in a case where the intermediate radio node indicates, through an RLC status report, successful transmission by the RLC layer but data is lost, the PDCP layer may perform retransmission and thus the lost data may be recovered.

Because an ADAP layer of the radio node may also read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, and may allow retransmission to be performed based on the definition.

Also, the ADAP layer may read PDCP SNs of a plurality of items of read data and may calculate COUNT values. Therefore, the ADAP layer may request retransmission based on a COUNT value of lost data, and may report a highest COUNT value with respect to a plurality of items of data that are sequentially and successfully received so far.

For example, the ADAP layer may indicate the retransmission request or the successfully received COUNT value through an ADAP status report, an ADAP control PDU, or an RRC message. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization is failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

As a second embodiment for recovering data loss, the disclosure proposes a PDCP data recovery process.

According to the second embodiment of the disclosure, when a radio node (a parent IAB node or an uppermost radio node) receives a report on occurrence of data loss or detects the data loss, the radio node may configure an indicator (recoverPDCP) indicating to perform the PDCP data recovery process, through PDCP configuration information (e.g., pdcp-config) of a control message (e.g., an RRC message or an upper layer message). Then, a PDCP layer of the radio node may configure, generate, and transmit PDCP status information to a UE.

The second embodiment of the disclosure proposes a PDCP data recovery process below.

[The Proposed PDCP Data Recovery Process]

When a PDCP status report is not received, a PDCP layer selectively retransmits only a plurality of items of PDCP data in an ascending order of COUNT values, wherein successful transmission with respect to the PDCP data from among a plurality of items of PDCP data (e.g., PDCP PDUs or PDCP SDUs) that were transmitted to a reconnected or disconnected RLC layer is not acknowledged by a lower layer.

When a PDCP status report is received, the PDCP layer selectively retransmits only a plurality of items of PDCP data in an ascending order of COUNT values, wherein successful transmission with respect to the PDCP data from among a plurality of items of PDCP data (e.g., PDCP PDUs or PDCP SDUs) that were transmitted to a reconnected or disconnected RLC layer is not acknowledged in the PDCP status report. Then, the PDCP layer discards a plurality of items of PDCP data for which successful transmission is acknowledged in the PDCP status report.

When the UE receives a control message, a PDCP layer of the UE which corresponds to PDCP configuration information may perform the PDCP data recovery process, and because the PDCP status report is received, when the UE performs the PDCP data recovery process, the UE may not selectively retransmit a plurality of items of data in an ascending order of COUNT values, wherein successful transmission with respect to the data is not acknowledged by a lower layer, but may selectively retransmit a plurality of items of data in an ascending order of COUNT values, wherein the data is indicated, in the PDCP status report, as data for which successful transmission is not acknowledged.

According to the first embodiment of the disclosure, in a scenario as shown in FIG. 2J, the PDCP layer of the UE performs retransmission and thus, even when data in a data level of an RLC layer of an intermediate radio node is lost, the data may be recovered. That is, even in a case where the intermediate radio node indicates, through an RLC status report, successful transmission by the RLC layer but data is lost, the PDCP layer may perform retransmission and thus the lost data may be recovered.

Because an ADAP layer of the radio node may also read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, and may allow retransmission to be performed based on the definition.

Also, the ADAP layer may read PDCP SNs of a plurality of items of read data and may calculate COUNT values. Therefore, the ADAP layer may request retransmission based on a COUNT value of lost data, and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

As a third embodiment for recovering data loss, the disclosure proposes a PDCP status report-based retransmission process.

The third embodiment of the disclosure proposes a process of defining and using a 1-bit ReTX field as a new field by using a reserved field (R field) in a PDCP status report format.

When the ReTX field is set as a particular value (e.g., 1) from among 0 or 1, the ReTX field may indicate to perform a retransmission process. That is, when the UE receives the PDCP status report in which the ReTX field is set as the particular value (e.g., 1), the UE may selectively retransmit a plurality of items of data in an ascending order of COUNT values, wherein successful transmission with respect to the data is not acknowledged (NACK) in the PDCP status report. Then, the UE may perform a data discard process on a plurality of items of data for which successful transmission is acknowledged (ACK) in the PDCP status report.

When the ReTX field is set as a particular value (e.g., 0) from among 0 or 1, the ReTX field may indicate not to perform a retransmission process based on the PDCP status report. That is, when the UE receives the PDCP status report in which the ReTX field is set as the particular value (e.g., 0), the UE may perform a data discard process on a plurality of items of data for which successful transmission is acknowledged (ACK) in the PDCP status report.

Because an ADAP layer of a radio node may also read a PDCP SN of received data and may derive a COUNT value, as performed by the PDCP layer, a method of recovering lost data by using the PDCP layer may be extensively applied to the ADAP layer of the radio node. That is, the radio node may define an ADAP control PDU or an ADAP status report, and may allow retransmission to be performed based on the definition.

Also, the ADAP layer may read PDCP SNs of a plurality of items of read data and may calculate COUNT values. Therefore, the ADAP layer may request retransmission based on a COUNT value of lost data, and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. Also, the radio node may define a poll bit in a header of the PDCP layer or a header of the ADAP layer and thus may trigger the PDCP status report or an ADAP status report. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

As a fourth embodiment for recovering data loss, the disclosure proposes a PDCP status report-based retransmission process.

The fourth embodiment of the disclosure proposes a process of defining and using a first PDCP status report and a second PDCP status report. The two PDCP status reports may be distinguished from each other by using different values in respective PDU type fields.

When a UE receives the first PDCP status report, the UE may not perform a retransmission process based on a PDCP status report. That is, when the UE receives the first PDCP status report, the UE may perform a data discard process on a plurality of items of data for which successful transmission is acknowledged (ACK) in the PDCP status report.

When the UE receives the second PDCP status report, the UE may perform a retransmission process based on a PDCP status report. That is, when the UE receives the second PDCP status report, the UE may selectively retransmit a plurality of items of data in an ascending order of COUNT values, wherein successful transmission with respect to the data is not acknowledged (NACK) in the PDCP status report. Then, the UE may perform a data discard process on a plurality of items of data for which successful transmission is acknowledged (ACK) in the PDCP status report.

Because an ADAP layer of a radio node may also read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, and may allow retransmission to be performed based on the definition.

Also, the ADAP layer may read PDCP SNs of a plurality of items of read data and may calculate COUNT values. Therefore, the ADAP layer may request retransmission based on a COUNT value of lost data, and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. Also, the radio node may define a poll bit in a header of the PDCP layer or a header of the ADAP layer and thus may trigger the PDCP status report or an ADAP status report. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

To allow end radio nodes to periodically check whether there is data lost in the middle, the end radio nodes being in the NR or 5G communication system supporting wireless backhaul, the disclosure proposes a method of periodically transmitting a PDCP status report, or configuring, generating, and transmitting a PDCP status report whenever a gap of a PDCP SN occurs and a timer expires. Also, the radio node may request retransmission by using the PDCP status report-based retransmission process proposed in the disclosure.

A fifth embodiment of the disclosure proposes a process of configuring, in configuration information (pdcp-config) of a PDCP layer in an RRC message as shown in FIG. 2F, an indicator, a period, or a timer value so as to allow the PDCP layer to periodically transmit a PDCP status report, the indicator indicating to periodically transmit a PDCP status report. When the UE receives configuration of the period or the timer value, the UE may trigger and transmit a PDCP status report according to the period or whenever the timer value is expired.

Because an ADAP layer of the radio node may also read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, may define a timer in the ADAP layer, and may apply the method thereto. Also, the radio node may define a poll bit in a header of the PDCP layer or a header of the ADAP layer and thus may trigger the PDCP status report or an ADAP status report. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

In a sixth embodiment of the disclosure, an indicator or a timer value may be configured in configuration information (pdcp-config) of a PDCP layer so as to allow the PDCP layer to trigger and transmit a PDCP status report, the indicator indicating to transmit a PDCP status report. After receiving configuration of a UE, the PDCP layer triggers a timer having the timer value whenever a gap of a PDCP SN occurs. When the gap of the PDCP SN is not filled nor data corresponding to the PDCP SN, the data being assumed to have been lost, is not received until the timer expires, the PDCP layer may trigger, configure, and transmit a PDCP status report when the timer expires. When the gap of the PDCP SN is filled or the data corresponding to the PDCP SN, the data being assumed to have been lost, is received until the timer expires, the PDCP layer may stop and reset the timer.

The timer proposed in the disclosure may be a PDCP reordering timer, and a new timer having a value greater or smaller than that of the PDCP reordering timer may be defined. For example, when the gap of the PDCP SN occurs, a new timer having a value smaller than that of the PDCP reordering timer may be defined, and the PDCP reordering timer may also start. When the new timer having the smaller value expires, the PDCP layer may configure and transmit a PDCP status report, and then may wait to receive a plurality of items of data to be retransmitted, until the PDCP reordering timer expires.

In a seventh embodiment of the disclosure, a PDCP status report prohibit timer may be configured in configuration information (pdcp-config) of a PDCP layer so as to prevent a PDCP status report from being frequently triggered. When the PDCP status report prohibit timer is configured, the PDCP layer may trigger or configure and transmit the PDCP status report, and may trigger the PDCP status report prohibit timer. While the PDCP status report prohibit timer is being driven, an additional PDCP status report may not be transmitted, and after the PDCP status report prohibit timer expires, a PDCP status report may be transmitted.

Because an ADAP layer of a radio node may also read a PDCP SN of received data and may derive a COUNT value, as performed by the PDCP layer, the method of recovering lost data by using a PDCP layer may be extensively applied to the ADAP layer of the radio node. That is, the radio node may define an ADAP control PDU or an ADAP status report, may define a timer in the ADAP layer, and may apply the method thereto. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

Figure 2K:
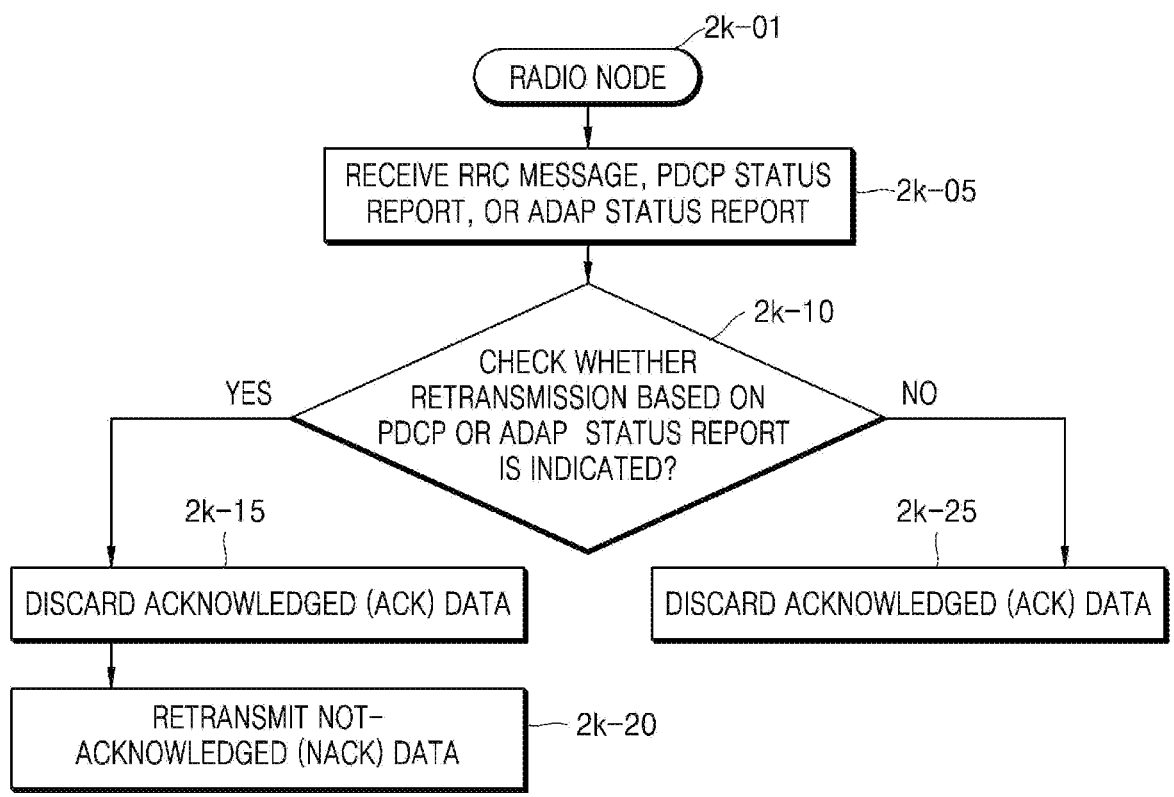
FIG. 2K illustrates a diagram of operations of a radio node performing retransmission based on a Packet Data Convergence Protocol (PDCP) status report or an ADAP status report, according to some embodiments of the disclosure.

FIG. 2K illustrates a diagram of operations of a radio node performing retransmission based on a PDCP status report or an ADAP status report, according to some embodiments of the disclosure.

Referring to FIG. 2K, when a radio node 2k-01 (e.g., a UE, an intermediate radio node, or an uppermost radio node) receives an RRC message, a PDCP status report in a PDCP control PDU, or an ADAP status report in an ADAP control PDU (2k-05), the radio node 2k-01 may check the RRC message, the PDCP control PDU or the ADAP control PDU which is received.

When retransmission based on the PDCP status report or the ADAP status report is indicated (2k-10), a corresponding PDCP layer or a corresponding ADAP layer of the radio node 2k-01 reads and analyzes the PDCP status report or the ADAP status report, and then performs a discard process on a plurality of items of data for which successful transmission is acknowledged (ACK) (2k-15), and retransmits a plurality of items of data in an ascending order of PDCP SNs or COUNT values, wherein successful transmission with respect to the data is not acknowledged (NACK) (2k-20). When retransmission based on the PDCP status report or the ADAP status report is not indicated (2k-10), the corresponding PDCP layer or the corresponding ADAP layer of the radio node 2k-01 reads and analyzes the PDCP status report or the ADAP status report, and performs a discard process on a plurality of items of data for which successful transmission is acknowledged (ACK) (2k-25). The operations of the radio node 2k-01 may be applied to the first embodiment, the second embodiment, the third embodiment, or the fourth embodiment.

When the PDCP layer or the ADAP layer receives, from the PDCP control PDU, the ADAP control PDU, or an ADAP header, a highest COUNT value with respect to a plurality of items of data that are sequentially and successfully received, the PDCP layer or the ADAP layer may perform retransmission at the greatest COUNT value. Because successful transmission with respect to a plurality of items of data having a COUNT value smaller than the greatest COUNT value is acknowledged, the plurality of items of data may be discarded.

The PDCP layer or ADAP layer-based retransmission and the method of configuring and transmitting a PDCP status report, which are proposed in the disclosure, may also be applied not only to an AM bearer but also to a UM bearer.

In the disclosure, a PDCP layer may drive a PDCP reordering timer. The PDCP reordering timer is driven when a gap of a PDCP SN occurs in a reception PDCP layer. When data corresponding to the gap of the PDCP SN is not received until the PDCP reordering timer expires, the PDCP layer transfers, to an upper layer, a plurality of items of data in order of PDCP SNs or an ascending order of COUNT values, and slides a reception window.

Therefore, when the data corresponding to the gap of the PDCP SN is received after the PDCP reordering timer expires, the data is not data in the reception window and thus is discarded such that data loss occurs. Therefore, the radio node 2k-01 (e.g., a PDCP layer of the uppermost radio node) that transmitted an RRC message or a PDCP status report to trigger the PDCP layer or ADAP layer-based retransmission (e.g., PDCP status report-based retransmission) proposed in the disclosure may not stop nor reset a PDCP reordering timer of a reception PDCP layer nor slide a reception window so as to normally receive a plurality of items of retransmitted data within the reception window, until the plurality of items of data are received. For example, even when the PDCP status report-based retransmission is triggered through the RRC message, the reception PDCP layer may not stop nor reset the PDCP reordering timer nor slide the reception window until the plurality of items of retransmitted data are received.

The disclosure proposes methods of extensively applying the aforementioned embodiments so as to prevent data loss that may occur when a UE performs handover in the NR or 5G communication system supporting a wireless backhaul network (IAB).

In a case where the UE confirms successful data transmission (ACK) through an RLC status report from a radio node connected with the UE, when the UE performs handover, the UE does not retransmit, to a newly connected radio node, data for which successful transmission is acknowledged. However, when the previously connected radio node cannot successfully transmit the data to an uppermost radio node, due to congestion or failure in a radio link, data loss occurs.

Therefore, in a case where a base station (or the uppermost radio node or a radio node) indicates handover to the UE, when the base station performs at least one of the third embodiment, the fourth embodiment, or the fifth embodiment, data loss may be prevented by performing the PDCP status report-based retransmission.

As another method, an eighth embodiment of the disclosure proposes a PDCP re-establishment process below. In the eighth embodiment of the disclosure, when a base station (or a radio node) indicates handover to a UE, the base station may indicate the UE to perform PDCP status report-based retransmission. That is, the base station may allow the UE to discard data (e.g., a PDCP SDU or a PDCP PDU) for which successful transmission is acknowledged (ACK) in a PDCP status report, and to retransmit data for which successful transmission is not acknowledged (NACK).

[A Proposed PDCP Re-Establishment Process]

When the PDCP status report-based retransmission is not indicated, the UE transmits or retransmits all data (or PDCP SDUs) starting from first data (e.g., a PDCP SDU) for which successful transmission is not acknowledged by lower layers with respect to an AM DRB in an ascending order of COUNT values that are configured before PDCP re-establishment. In detail, the UE operates as below.

When a header compression process is configured, the UE performs header compression on data (or a PDCP SDU) to be transmitted or retransmitted.

When integrity protection is configured, the UE performs the integrity protection, and performs encryption.

The UE transmits, as the PDCP PDU, a PDCP header and the data to a lower layer.

When the PDCP status report-based retransmission is indicated, the UE discards a plurality of items of data (e.g., PDCP SDUs or PDCP PDUs) for which successful transmission is acknowledged in a PDCP status report received with respect to an AM DRB, and retransmits data for which successful transmission is not acknowledged (NACK). In this regard, the UE transmits or retransmits the data (or PDCP SDUs) in an ascending order of COUNT values that are configured before PDCP re-establishment. In detail, the UE operates as below.

When a header compression process is configured, the UE performs header compression on data (or a PDCP SDU) to be transmitted or retransmitted.

When integrity protection is configured, the UE performs the integrity protection, and performs encryption.

The UE transmits, as the PDCP PDU, a PDCP header and the data to a lower layer.

In a case where the base station indicates handover in the NR or 5G communication system supporting the wireless backhaul network, when the base station indicates the PDCP re-establishment process proposed in the eighth embodiment, data loss may be prevented.

Because an ADAP layer of the radio node may also read a PDCP SN of received data and may derive a COUNT value, as performed by the PDCP layer, the data recovery method using a PDCP layer in handover may be extensively applied to the ADAP layer of the radio node. That is, the radio node may define an ADAP control PDU or an ADAP status report, and may allow retransmission to be performed based on the definition.

Also, the ADAP layer may read PDCP SNs of a plurality of items of read data and may calculate COUNT values. Therefore, the ADAP layer may request retransmission based on a COUNT value of lost data, and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message. Also, information requesting retransmission or information about the received data (e.g., successful transmission information or failure transmission information (ACK/NACK information) such as a highest COUNT value with respect to a plurality of items of data that are sequentially and successfully received or a status report) may be indicated by the header of the ADAP layer. By extending the aforementioned embodiment of the disclosure, as another method, the radio node may apply a retransmission function or a re-routing function to the ADAP layer of the radio node so as to prevent data loss. The retransmission function or the re-routing function of the ADAP layer may be triggered by an upper layer (e.g., an RRC layer). For example, when the RRC layer receives, from a RLC layer of the radio node, an indication indicating excess of a largest retransmission number, or receives, from a lower layer (e.g., a MAC layer or a PHY layer), an indication indicating that signal synchronization has failed or strength of a signal is equal to or smaller than a predefined threshold value, the RRC layer may declare a RLF, and may perform an RRC connection re-establishment procedure to re-establish connection. Then, when the connection to a previous parent radio node or a new parent radio node is successfully established, the upper layer (e.g., the RRC layer) may transmit, to the ADAP layer, an indicator indicating to perform the retransmission function or the re-routing function, and when the ADAP layer receives the indication from the upper layer, the ADAP layer may perform the retransmission function or the re-routing function. Alternatively, when the RRC layer detects an RLF, the RRC layer may transfer an indication to the ADAP layer, the indication indicating to perform the retransmission function or the re-routing function. The previous parent radio node or the new parent radio node that re-establishes connection after the RLF may include an indicator in an RRC message (e.g., an RRC connection re-establishment message, an RRCSetup message, an RRCResume message, or an RRCReconfiguration message), the indicator triggering the retransmission function or the re-routing function to the ADAP layer of the child radio node, and may transmit the RRC message to the child radio node. When the ADAP layer receives the indicator triggering the retransmission function or the re-routing function, the ADAP layer may perform, on the newly connected parent radio node, retransmission or re-routing with respect to a plurality of items of data that have not yet been transferred to a lower layer (the RLC layer) or a plurality of items of data for which successful transmission has not yet been checked (i.e., the plurality of items of data for which successful transmission is not acknowledged in an ADAP layer status report or a RLC layer status report), such that data transmission without data loss may be supported. The ADAP layer may newly configure and transmit a plurality of items of existing data as a plurality of items of data to be retransmitted or re-routed. For example, the ADAP layer may newly configure the plurality of items of existing data according to connection configuration information (e.g., RLC channel identifier information, a destination address, a source address, QoS information, or security key information) received from the newly connected parent radio node, and may perform retransmission or re-routing on the plurality of items of newly-configured data.

A ninth embodiment of the disclosure which is proposed to solve a problem of occurrence of data loss will now be described below.

A network may indicate, to a first SRB or a second SRB of the disclosure, a control message (or a newly defined separate RRC message) including an indicator indicating to perform an in-sequence delivery function, instead of an out-of-order delivery function of an NR RLC layer. That is, the NR RLC layer performs the out-of-order delivery function as a default but may be allowed to perform the in-sequence delivery function, in response to the indicator of the RRC message. The in-sequence delivery function involves transmitting data to a PDCP layer in an ascending order of RLC SNs by sequentially aligning the RLC SNs of RLC PDUs or RLC SDUs received by the NR RLC layer.

When a RLC SN gap occurs and thus a RLC SN is lost, the RLC layer configures and transmits a RLC status report about the lost RCL SN so as to request retransmission, and even when the RLC layer receives a RLC SDU or a RLC PDU having RLC SN greater than the lost RCL SN, the RLC layer does not transfer the RLC SDU or the RLC PDU to a PDCP layer but stores the RLC SDU or the RLC PDU in a buffer, and then when the RLC layer receives the lost RCL SN, the RLC layer may transfer data to the PDCP layer in an ascending order of RLC SNs.

As described in the ninth embodiment of the disclosure, when a RLC layer of an end radio node performs the in-sequence delivery function, it is possible to prevent a problem in which, when a window is slid due to expiration of a timer of a PDCP layer and then data is received late, the data is recognized to be outside the window and thus is discarded and lost. For example, in FIG. 2J, RLC layers of the UE 2*j*-04 and the uppermost node 2*j*-01 may use the in-sequence delivery function, and RLC layers of intermediate radio nodes may use the out-of-order delivery function to decrease a transmission delay. As another example, in FIG. 2J, RLC layers of the uppermost node 2*j*-01 and the radio node 2*j*-03 connected with the UE 2*j*-04 may use the in-sequence delivery function, and RLC layers of residual radio nodes may use the out-of-order delivery function to decrease a transmission delay.

Also, when radio nodes in the wireless backhaul network proposed in the disclosure receive, transmit, and transfer data, the radio nodes read a header of a plurality of items of RLC data, and when data to be transmitted is a RLC status report, the radio nodes do not apply a segmenting operation and thus may prevent a part of the RLC status report from being lost or received late. That is, the radio nodes give highest priority to the RLC status report and allow the RLC status report to be included in a transmission resource, thereby preventing segmentation of the RLC status report.

The embodiments proposed in the disclosure may be performed by a UE, a radio node, an intermediate node, or an uppermost node. When the UE performs the embodiments of the disclosure, a radio node connected with the UE may trigger the embodiments of the disclosure, and when a child radio node performs the embodiments of the disclosure, a parent radio node connected with the child radio node may trigger the embodiments of the disclosure.

Figure 2L:
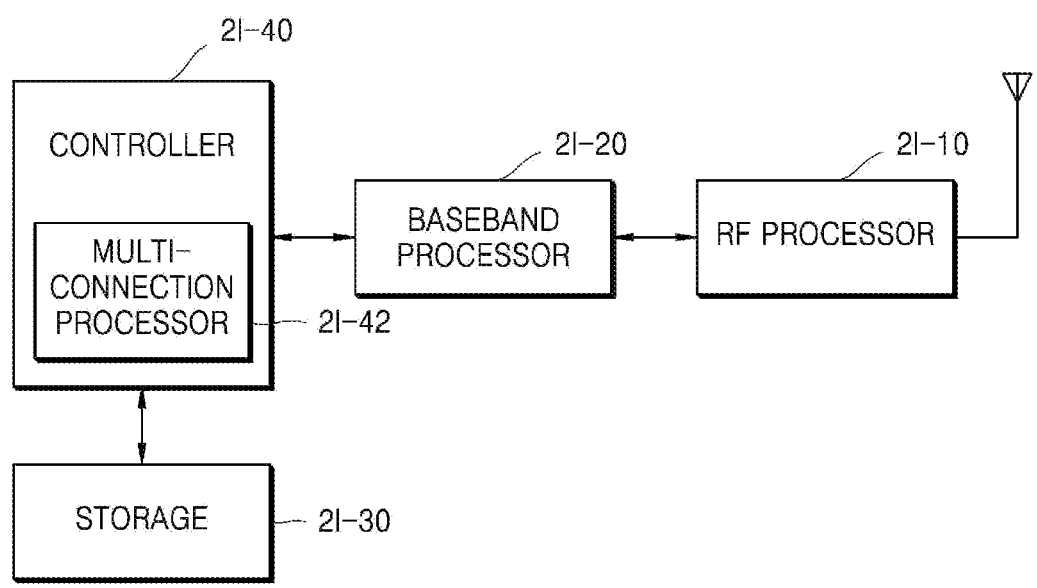
FIG. 2L illustrates a configuration of a UE or a radio node; according to some embodiments of the disclosure.

FIG. 2L illustrates a configuration of a UE or a radio node to which an embodiment of the disclosure is applicable. The embodiment of the disclosure shown in FIG. 2L will now be described with reference to the UE.

Referring to FIG. 2L, the UE includes an RF processor 2*l*-10, a baseband processor 2*l*-20, a storage 2*l*-30, and a controller 2*l*-40. However, the UE is not limited thereto and may include more or less elements compared to the elements illustrated in FIG. 2L.

The RF processor 2*l*-10 may perform functions for transmitting and receiving signals through wireless channels, e.g., band conversion and amplification of the signals. That is, the RF processor 2*l*-10 may up-convert a baseband signal provided from the baseband processor 2*l*-10, into an RF band signal and then may transmit the RF band signal through an antenna, and may down-convert an RF band signal received through the antenna, into a baseband signal. For example, the RF processor 2*l*-10 may include a transmit filter, a receive filter, an amplifier, a mixer, an oscillator, a digital-to-analog convertor (DAC), an analog-to-digital convertor (ADC), or the like. Although only one antenna is illustrated in FIG. 2L, the UE may include a plurality of antennas. The RF processor 2*l*-10 may include a plurality of RF chains. The RF processor 2*l*-10 may perform beamforming. For beamforming, the RF processor 2*l*-10 may adjust phases and intensities of signals to be transmitted or received through a plurality of antennas or antenna elements. The RF processor 2*l*-10 may perform a MIMO operation and may receive data of a plurality of layers in the MIMO operation. The RF processor 2*l*-10 may perform received beam sweeping by appropriately configuring a plurality of antennas or antenna elements, or may adjust a direction and a beam width of a received beam to coordinate with a transmit beam, by the control of the controller 2*l*-40.

The baseband processor 2*l*-20 may convert between a baseband signal and a bitstream based on physical layer specifications of a system. For example, for data transmission, the baseband processor 2*l*-20 generates complex symbols by encoding and modulating a transmit bitstream. For data reception, the baseband processor 2*l*-20 may reconstruct a received bitstream by demodulating and decoding a baseband signal provided from the RF processor 2*l*-10. For example, according to an OFDM scheme, for data transmission, the baseband processor 2*l*-20 may generate complex symbols by encoding and modulating a transmit bitstream, may map the complex symbols to subcarriers, and then may configure OFDM symbols by performing inverse fast Fourier transformation (IFFT) and cyclic prefix (CP) insertion. For data reception, the baseband processor 2*l*-20 may segment a baseband signal provided from the RF processor 2*l*-10, into OFDM symbol units, may reconstruct signals mapped to subcarriers by performing fast Fourier transformation (FFT), and then may reconstruct a received bitstream by demodulating and decoding the signals.

The baseband processor 2*l*-20 and the RF processor 2*l*-10 transmit and receive signals as described above. Accordingly, the baseband processor 2*l*-20 and the RF processor 2*l*-10 may also be called a transmitter, a receiver, a transceiver, or a communicator. At least one of the baseband processor 2*l*-20 or the RF processor 2*l*-10 may include a plurality of communication modules to support a plurality of different radio access technologies. At least one of the baseband processor 2*l*-20 or the RF processor 2*l*-10 may include different communication modules to process signals of different frequency bands. For example, the different radio access technologies may include an LTE network, an NR network, or the like. The different frequency bands may include a super-high frequency (SHF) (e.g., 2.2 GHz, 2 GHz) band and a millimeter wave (mmWave) (e.g., 60 GHz) band. The UE may transmit and receive signals to and from a base station by using the baseband processor $2l$-20 and the RF processor $2l$-10, and the signals may include control information and data.

The storage $2l$-30 stores basic programs, application programs, and data, e.g., configuration information, for operations of the UE. The storage $2l$-3 0 may provide the stored data upon request by the controller $2l$-40. The storage $2l$-30 may include any or a combination of storage media such as read-only memory (ROM), random access memory (RAM), a hard disk, a compact disc (CD)-ROM, and a digital versatile disc (DVD). The storage $2l$-30 may include a plurality of memories.

The controller $2l$-40 controls overall operations of the UE. The controller $2l$-40 may include a multiple connection processor $2l$-42. For example, the controller $2l$-40 transmits and receives signals through the baseband processor $2l$-20 and the RF processor $2l$-10. The controller $2l$-40 records and reads data on or from the storage $2l$-30. In this regard, the controller $2l$-40 may include at least one processor. For example, the controller $2l$-40 may include a communication processor (CP) for controlling communications and an application processor (AP) for controlling an upper layer such as an application program.

Figure 2M:
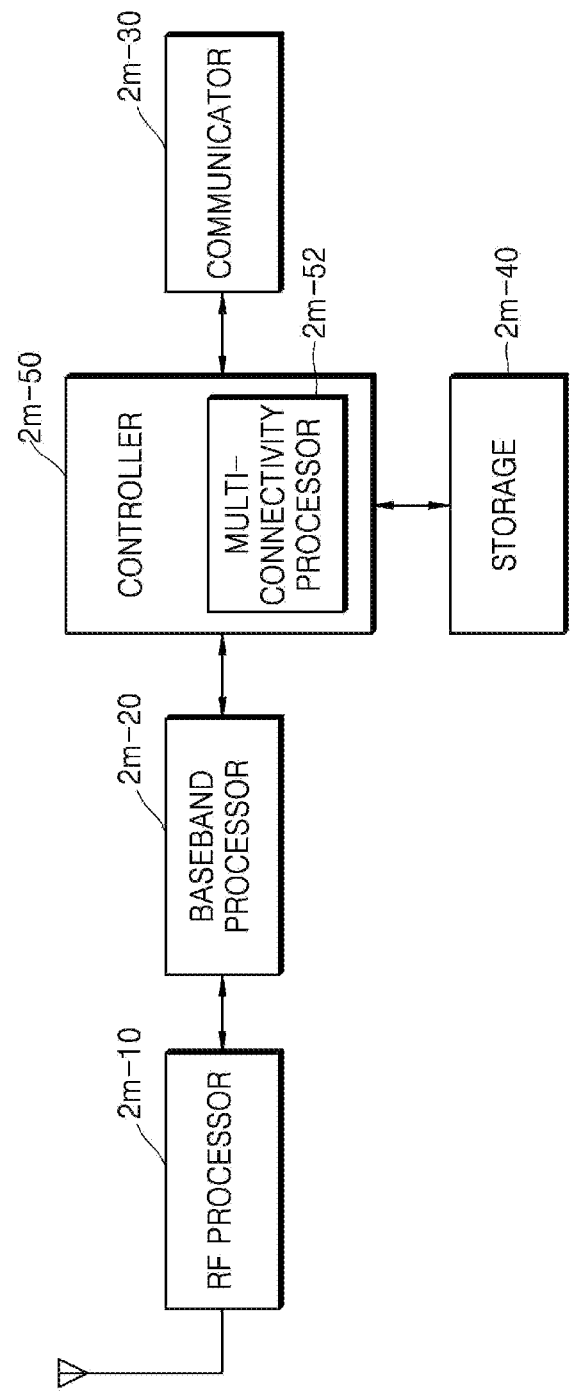
FIG. 2M illustrates a block diagram of a TRP or a radio node in a wireless communication system, according to some embodiments of the disclosure.

FIG. 2M illustrates a block diagram of a TRP or a radio node in a wireless communication system to which an embodiment of the disclosure is applicable.

Referring to FIG. 2M, the TRP may include an RF processor $2m$-10, a baseband processor $2m$-20, a communicator $2m$-30, a storage $2m$-40, and a controller $2m$-50. However, the TRP is not limited thereto and may include more or less elements compared to the elements illustrated in FIG. 2M.

The RF processor $2m$-10 may perform functions for transmitting and receiving signals through wireless channels, e.g., band conversion and amplification of the signals. The RF processor $2m$-10 may up-convert a baseband signal provided from the baseband processor $2m$-20, into an RF band signal and then may transmit the RF band signal through an antenna, and may down-convert an RF band signal received through an antenna, into a baseband signal. For example, the RF processor $2m$-10 may include a transmit filter, a receive filter, an amplifier, a mixer, an oscillator, a DAC, an ADC, or the like. Although only one antenna is illustrated in FIG. 2M, the RF processor $2m$-10 may include a plurality of antennas. The RF processor $2m$-10 may include a plurality of RF chains. In addition, the RF processor $2m$-10 may perform beamforming. For beamforming, the RF processor $2m$-10 may adjust phases and intensities of signals to be transmitted or received through a plurality of antennas or antenna elements. The RF processor $2m$-10 may perform a DL MIMO operation by transmitting data of one or more layers The baseband processor $2m$-20 may convert between a baseband signal and a bitstream based on physical layer specifications of a first radio access technology. For example, for data transmission, the baseband processor $2m$-20 may generate complex symbols by encoding and modulating a transmit bitstream. For data reception, the baseband processor $2m$-20 may reconstruct a received bitstream by demodulating and decoding a baseband signal provided from the RF processor $2m$-10. For example, according to an OFDM scheme, for data transmission, the baseband processor $2m$-20 may generate complex symbols by encoding and modulating a transmit bitstream, may map the complex symbols to subcarriers, and then may configure OFDM symbols by performing IFFT and CP insertion. For data reception, the baseband processor $2m$-20 may segment a baseband signal provided from the RF processor $2m$-10, into OFDM symbol units, may reconstruct signals mapped to subcarriers by performing FFT, and then may reconstruct a received bitstream by demodulating and decoding the signals. The baseband processor $2m$-20 and the RF processor $2m$-10 may transmit and receive signals as described above. As such, the baseband processor $2m$-20 and the RF processor $2m$-10 may also be called a transmitter, a receiver, a transceiver, a communicator, or a wireless communicator. The TRP may transmit and receive signals to and from the UE by using the baseband processor $2m$-20 and the RF processor $2m$-10, and the signals may include control information and data.

The communicator $2m$-30 may provide an interface for communicating with other nodes in a network. According to some embodiments of the disclosure, the communicator $2m$-30 may be a backhaul communicator.

The storage $2m$-40 stores basic programs, application programs, and data, e.g., configuration information, for operations of the TRP. In particular, the storage $2m$-40 may store, for example, information about bearers assigned for a connected UE and measurement results reported from the connected UE. The storage $2m$-40 may store criteria information used to determine whether to provide or release dual connectivity to or from the UE. The storage $2m$-40 provides the stored data upon request by the controller $2m$-50. The storage $2m$-40 may include any or a combination of storage media such as ROM, RAM, a hard disk, a CD-ROM, and a DVD. The storage $2m$-40 may include a plurality of memories.

The controller $2m$-50 controls overall operations of the NR gNB. For example, the controller $2m$-50 transmits and receives signals through the baseband processor $2m$-20 and the RF processor $2m$-10, or the communicator $2m$-30. The controller $2m$-50 records and reads data on or from the storage $2m$-40. To this end, the controller $2m$-50 may include at least one processor. At least one element of the TRP may be implemented as a chip.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

The embodiments of the disclosure provide a method and apparatus for efficiently providing a service in a mobile communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving a radio resource control (RRC) release message including suspend-configuration information, from a base station;
   based on the suspend-configuration information:
      resetting a medium access control (MAC);
      re-establishing a radio link control (RLC) entity for an signaling radio bearer (SRB) 1;
      suspending bearers including at least one data radio bearer (DRB) and at least one SRB, except an SRB0; and
      indicating a packet data convergence protocol (PDCP) suspend of the at least one DRB;
   to resume an RRC connection, re-establishing a PDCP entity for the SRB1, resuming the SRB1, and transmitting an RRC resume request message; and
   in response to transmitting the RRC resume request message, receiving an RRC resume message through the SRB1.

2. The method of claim 1, further comprising:
   based on the receiving of the RRC resume message, re-establishing a PDCP entity of another SRB among the at least one SRB and a PDCP entity of the at least one DRB.

3. The method of claim 1, further comprising:
   based on an indication of the PDCP suspend, setting a transmission state variable to an initial value and discarding stored PDCP protocol data units (PDUs) at a transmitting PDCP entity of the terminal.

4. The method of claim 1, further comprising:
   based on an indication of the PDCP suspend, stopping and resetting a running reorder timer at a receiving PDCP entity of the terminal.

5. The method of claim 1, further comprising:
   based on an indication of the PDCP suspend, setting at least one reception state variable to an initial value at a receiving PDCP entity of the terminal.

6. The method of claim 1, further comprising:
   based on the suspend-configuration information, entering an RRC inactive mode.

7. A method performed by a base station in a wireless communication system, the method comprising:
   transmitting, to a terminal, a radio resource control (RRC) release message including suspend-configuration information, wherein, based on the suspend-configuration information: a medium access control (MAC) is reset at the terminal, a radio link control (RLC) entity for an signaling radio bearer (SRB)1 is re-established at the terminal, bearers including at least one data radio bearer (DRB) and at least one SRB, except an SRB0 are suspended at the terminal, and a packet data convergence protocol (PDCP) suspend of the at least one DRB is indicated at the terminal;
   receiving an RRC resume request message from the terminal, wherein the terminal re-establishes a PDCP entity for the SRB1 and resumes the SRB1 to resume an RRC connection; and
   in response to receiving the RRC resume request message, transmitting an RRC resume message through the SRB1.

8. The method of claim 7, wherein, based on the transmitting of the RRC resume message, a PDCP entity of another SRB among the at least one SRB and a PDCP entity of the at least one DRB are re-established at the terminal.

9. The method of claim 7, further comprising:
   based on an indication of the PDCP suspend at the terminal, a transmission state variable is set to an initial value at a transmitting PDCP entity of the terminal.

10. A terminal in a wireless communication system, the terminal comprising:
    a transceiver; and
    at least one processor coupled with the transceiver and configured to:
       receive a radio resource control (RRC) release message including suspend-configuration information, from a base station;
       based on the suspend-configuration information:
          reset a medium access control (MAC);
          re-establish a radio link control (RLC) entity for an signaling radio bearer (SRB)1;
          suspend bearers including at least one data radio bearer (DRB) and at least one SRB, except an SRB0; and
          indicate a packet data convergence protocol (PDCP) suspend of the at least one DRB;
       to resume an RRC connection, re-establish a PDCP entity for the SRB1, resume the SRB1, and transmit an RRC resume request message; and
       in response to the RRC resume request message, receive an RRC resume message through the SRB1.

11. The terminal of claim 10, wherein the at least one processor is further configured to:
    based on the receiving of the RRC resume message, re-establish a PDCP entity of another SRB among the at least one SRB and a PDCP entity of the at least one DRB.

12. The terminal of claim 10, wherein the at least one processor is further configured to:
    based on an indication of the PDCP suspend, set a transmission state variable to an initial value and discard stored PDCP protocol data units (PDUs) at a transmitting PDCP entity of the terminal.

13. The terminal of claim 10, wherein the at least one processor is further configured to:
based on an indication of the PDCP suspend, stop and reset a running reorder timer at a receiving PDCP entity of the terminal.

14. The terminal of claim 10, wherein the at least one processor is further configured to:
based on an indication of the PDCP suspend, set at least one reception state variable to an initial value at a receiving PDCP entity of the terminal.

15. The terminal of claim 10, wherein the at least one processor is further configured to:
based on the suspend-configuration information, enter an RRC inactive mode.

16. A base station in a wireless communication system, the base station comprising:
a transceiver; and
at least one processor coupled with the transceiver and configured to:
transmit, to a terminal, a radio resource control (RRC) release message including suspend-configuration information, wherein, based on the suspend-configuration information: a medium access control (MAC) is reset at the terminal, a radio link control (RLC) entity for an signaling radio bearer (SRB)1 is re-established at the terminal, bearers including at least one data radio bearer (DRB) and at least one SRB, except an SRB0 are suspended at the terminal, and a packet data convergence protocol (PDCP) suspend of the at least one DRB is indicated at the terminal;
receive an RRC resume request message from the terminal, wherein the terminal re-establishes a PDCP entity for the SRB1 and resumes the SRB1 to resume an RRC connection; and
in response to the RRC resume request message, transmit an RRC resume message through the SRB1.

17. The base station of claim 16, wherein based on the transmitting of the RRC resume message, a PDCP entity of another SRB among the at least one SRB and a PDCP entity of the at least one DRB are re-established at the terminal.

18. The base station of claim 16, wherein the at least one processor is further configured to:
based on an indication of the PDCP suspend at the terminal, a transmission state variable is set to an initial value at a transmitting PDCP entity of the terminal.

* * * * *